United States Patent
Xu et al.

(10) Patent No.: US 11,990,993 B2
(45) Date of Patent: May 21, 2024

(54) RATE MATCHING BETWEEN UPLINK AND DOWNLINK

(71) Applicant: QUALCOMM Incorporated, San Diego, CA (US)

(72) Inventors: Huilin Xu, Temecula, CA (US); Wanshi Chen, San Diego, CA (US); Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 17/185,782

(22) Filed: Feb. 25, 2021

(65) Prior Publication Data
US 2021/0273742 A1    Sep. 2, 2021

Related U.S. Application Data

(60) Provisional application No. 62/984,102, filed on Mar. 2, 2020.

(51) Int. Cl.
*H04L 1/00* (2006.01)
*H04L 5/00* (2006.01)
*H04W 72/1263* (2023.01)

(52) U.S. Cl.
CPC .......... *H04L 1/0013* (2013.01); *H04L 5/0048* (2013.01); *H04W 72/1263* (2013.01)

(58) Field of Classification Search
None
See application file for complete search history.

(56) References Cited

U.S. PATENT DOCUMENTS

| 2016/0174213 A1* | 6/2016 | Webb | H04W 52/146 |
| | | | 370/336 |
| 2016/0270039 A1* | 9/2016 | Abe | H04L 5/0053 |
| 2016/0330011 A1* | 11/2016 | Lee | H04W 52/10 |

(Continued)

OTHER PUBLICATIONS

Partial International Search Report—PCT/US2021/020076—ISA/EPO—dated Jun. 21, 2021 (202460WO).

(Continued)

*Primary Examiner* — Phirin Sam
(74) *Attorney, Agent, or Firm* — Arun Swain

(57) ABSTRACT

Methods, systems, and devices for wireless communications are described. For example, a method for wireless communications at a wireless device may include determining a rate matching configuration for a first channel (e.g., an uplink channel) associated with a second channel (e.g., a downlink channel). A wireless device may determine rate matching resources of an uplink channel based on the rate matching configuration. The wireless device may determine rate matching resources of a downlink channel based on the rate matching configuration. The wireless device may transmit a first message on the uplink channel or the downlink channel, respectively, where the transmitted channel includes the rate matching resources. The wireless device may receive a reference signal on one or more resources of the downlink channel or the uplink channel, respectively, where the one or more resources of the respective channel correspond to the rate matching resources on the transmitted channel.

68 Claims, 29 Drawing Sheets

(56) References Cited

U.S. PATENT DOCUMENTS

| | | | |
|---|---|---|---|
| 2018/0145818 A1* | 5/2018 | Choi | H04L 5/023 |
| 2018/0227939 A1* | 8/2018 | Bagheri | H04L 5/0094 |
| 2018/0242320 A1* | 8/2018 | Wong | H04L 1/08 |
| 2019/0045490 A1 | 2/2019 | Davydov et al. | |
| 2019/0223191 A1* | 7/2019 | Kim | H04L 5/00 |
| 2020/0280390 A1 | 9/2020 | Bagheri et al. | |
| 2020/0337064 A1* | 10/2020 | Kim | H04W 72/23 |
| 2021/0185702 A1* | 6/2021 | Kim | H04L 5/00 |
| 2021/0212063 A1* | 7/2021 | Kwak | H04W 72/0453 |
| 2021/0400722 A1* | 12/2021 | Grant | H04W 74/002 |
| 2022/0123912 A1* | 4/2022 | Fang | H04L 5/0053 |
| 2023/0016295 A1* | 1/2023 | Sadeghi | H04W 72/0453 |

OTHER PUBLICATIONS

International Search Report and Written Opinion—PCT/US2021/020076—ISA/EPO—dated Aug. 25, 2021 (202460WO).

* cited by examiner

RATE MATCHING BETWEEN UPLINK AND DOWNLINK

CROSS REFERENCE

The present application for patent claims the benefit of U.S. Provisional Patent Application No. 62/984,102 by Xu et al., entitled "RATE MATCHING BETWEEN UPLINK AND DOWNLINK," filed Mar. 2, 2020, assigned to the assignee hereof, and expressly incorporated by reference in its entirety herein.

FIELD OF TECHNOLOGY

The following relates generally to wireless communications and more specifically to rate matching between uplink and downlink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support devices that are capable of full-duplex communications, where a full-duplex device, such as a UE or base station, may transmit messages to another device while concurrently receiving messages from one or more other devices. However, a transmitting device may be affected by self-interference when a signal transmission of the device interferes with the reception of another signal at the same device.

SUMMARY

The described techniques relate to improved methods, systems, devices, and apparatuses that support rate matching between uplink and downlink. Generally, the described techniques provide for channel estimation and interference measurements at a wireless device that transmits and receives channels within a threshold separation or overlapping in time and frequency of one another. The wireless device may be a user equipment (UE) or a base station, and the wireless device may use rate matching techniques. Rate matching may refer to matching a number of bits in a transport block (TB) from the medium access control (MAC) layer to a number of bits that may be transmitted in the given resource allocation of the physical channel. For instance, rate matching may include sub-block interleaving, bit collection, and pruning. In some cases, a device may allocate resources of a channel to be excluded from, or not be a part of, the rate matching, which may be referred to as rate matching around a resource. For example, a device may configure resources to remain empty (e.g., have a zero transmit power) when rate matching information onto a channel. These empty resources may be referred to as rate matched resources, rate matching resources, rate matched resource elements (REs), rate matching REs, or other terminology.

As described herein, a UE or base station may determine a rate matching configuration for one or more of an uplink channel (e.g., physical uplink shared channel (PUSCH)) or a downlink channel (e.g., physical downlink channel (PDSCH)). The downlink channel may at least partially overlap the uplink channel in time and frequency, or the downlink and uplink channel may be near each other in either the frequency or time domain (e.g., the channels may be within a threshold separation of one another, may share boundaries, or the like). The UE or base station may also determine a set of first rate matching resources of the uplink channel to be left empty during transmission by the UE. The UE or base station may also determine a set of second rate matching resources of the downlink channel to be left empty by the base station during reception at the UE. The UE may then transmit, to the base station, a first message on the uplink channel excluding the set of first rate matching resources, and the UE may receive, from the base station, a second message on the downlink channel that excludes the second set of rate matching resources. At least one of the first or second messages may be transmitted with an associated reference signal (e.g., a demodulation reference signal (DMRS)).

A rate matching configuration for one or both of the PUSCH and PDSCH may be indicated (e.g., by a base station to a UE). For example, the configuration may indicate which resources will be rate matched around, the location of the DMRS, and the like. In some examples, the UE and base station may be preconfigured with a rate matching configuration or may dynamically receive a rate matching configuration from downlink control information.

The described techniques may support reference signal collision resolution. For example, when an uplink channel and a downlink channel overlap (e.g., in a full-duplex system) the DMRS of each respective channel may be scheduled to overlap. The network, however, may determine that a collision may occur in the scheduled resources and resolve the collision by adjusting the resource allocation or channel coding for one or both of the DMRSs. The collision may be resolved in a way that rate matched REs of a transmission may correspond (e.g., overlap in time and frequency) to the resources on which the DMRS is received. The described techniques improve the rate matching for nearby or overlapping downlink channel and uplink channels by improving channel estimation.

A method of wireless communications at a UE is described. The method may include determining a rate matching configuration for one or more of an uplink channel or a downlink channel, determining a set of first rate matching resources of the uplink channel, a set of second rate matching resources of the downlink channel, or a combination thereof, based on the rate matching configuration, transmitting a first message on the uplink channel, where the uplink channel excludes the set of first rate matching resources, and receiving a second message on the downlink channel, where the downlink channel excludes the set of second of rate matching resources, and where a reference signal is received on one or more resources of the downlink channel.

An apparatus for wireless communications at a UE is described. The apparatus may include a processor, memory coupled with the processor, and instructions stored in the memory. The instructions may be executable by the processor to cause the apparatus to determine a rate matching configuration for one or more of an uplink channel or a downlink channel, determine a set of first rate matching resources of the uplink channel, a set of second rate matching resources of the downlink channel, or a combination thereof, based on the rate matching configuration, transmit a first message on the uplink channel, where the uplink channel excludes the set of first rate matching resources, and receive a second message on the downlink channel, where the downlink channel excludes the set of second of rate matching resources, and where a reference signal is received on one or more resources of the downlink channel.

Another apparatus for wireless communications at a UE is described. The apparatus may include means for determining a rate matching configuration for one or more of an uplink channel or a downlink channel, determining a set of first rate matching resources of the uplink channel, a set of second rate matching resources of the downlink channel, or a combination thereof, based on the rate matching configuration, transmitting a first message on the uplink channel, where the uplink channel excludes the set of first rate matching resources, and receiving a second message on the downlink channel, where the downlink channel excludes the set of second of rate matching resources, and where a reference signal is received on one or more resources of the downlink channel.

A non-transitory computer-readable medium storing code for wireless communications at a UE is described. The code may include instructions executable by a processor to determine a rate matching configuration for one or more of an uplink channel or a downlink channel, determine a set of first rate matching resources of the uplink channel, a set of second rate matching resources of the downlink channel, or a combination thereof, based on the rate matching configuration, transmit a first message on the uplink channel, where the uplink channel excludes the set of first rate matching resources, and receive a second message on the downlink channel, where the downlink channel excludes the set of second of rate matching resources, and where a reference signal is received on one or more resources of the downlink channel.

In some examples of the method, apparatuses, and non-transitory computer-readable medium described herein, determining the rate matching configuration may include operations, features, means, or instructions for receiving an indication of the rate matching configuration, and determining the rate matching configuration based on the indication.

Some examples of the method, apparatuses, and non-transitory computer-readable medium described herein may further include operations, features, means, or instructions for receiving downlink control information (DCI) including the indication of the rate matching configuration, where the DCI dynamically schedules the uplink channel and the downlink channel.

In some examples of the method, apparatuses, and non-transitory computer-readable medium described herein, determining the rate matching configuration may include operations, features, means, or instructions for receiving DCI including the indication of the rate matching configuration and one or more transmission parameters, where the DCI dynamically schedules the uplink channel or the downlink channel. In some examples of the method, apparatuses, and non-transitory computer-readable medium described herein, the one or more transmission parameters are associated with the downlink channel when the DCI schedules the uplink channel. In some examples of the method, apparatuses, and non-transitory computer-readable medium described herein, the one or more transmission parameters are associated with the uplink channel when the DCI schedules the downlink channel.

In some examples of the method, apparatuses, and non-transitory computer-readable medium described herein, the one or more transmission parameters include a frequency domain resource assignment, a time domain resource assignment, antenna port information, or a combination thereof.

Some examples of the method, apparatuses, and non-transitory computer-readable medium described herein may further include operations, features, means, or instructions for determining the set of first rate matching resources of the uplink channel, or the set of second rate matching resources of the downlink channel, or a combination thereof, for a channel bandwidth and over a set of antenna ports based on the rate matching configuration, where the one or more transmission parameters include the time domain resource assignment.

Some examples of the method, apparatuses, and non-transitory computer-readable medium described herein may further include operations, features, means, or instructions for determining the set of first rate matching resources of the uplink channel, or the set of second rate matching resources of the downlink channel, or a combination thereof, for a channel duration and over a set of antenna ports based on the rate matching configuration, where the one or more transmission parameters include the frequency domain resource assignment.

In some examples of the method, apparatuses, and non-transitory computer-readable medium described herein, the indication includes a scheduling indication of whether the downlink channel overlaps with the uplink channel, a number of scheduling DCI, or a combination thereof.

Some examples of the method, apparatuses, and non-transitory computer-readable medium described herein may further include operations, features, means, or instructions for identifying a preconfigured time domain resource assignment and a frequency domain resource assignment of the uplink channel, or the downlink channel, or a combination thereof, and determining the set of first rate matching resources of the uplink channel, or the set of second rate matching resources of the downlink channel, or a combination thereof based on the preconfigured time domain resource assignment and the frequency domain resource assignment, where transmitting the first message on the uplink channel and receiving the second message on the downlink channel may be based on the preconfigured time domain resource assignment and the frequency domain resource assignment.

In some examples of the method, apparatuses, and non-transitory computer-readable medium described herein, the preconfigured time domain resource assignment and the frequency domain resource assignment may be for configured grant transmissions when the preconfigured time domain resource assignment and the frequency domain resource assignment may be for the uplink channel, and where the preconfigured time domain resource assignment and the frequency domain resource assignment may be for semi-persistently scheduled transmissions when the preconfigured time domain resource assignment and the frequency domain resource assignment may be for the downlink channel.

Some examples of the method, apparatuses, and non-transitory computer-readable medium described herein may further include operations, features, means, or instructions for receiving a compact DCI indicating that data may be configured to be received on the downlink channel based on the preconfigured time domain resource assignment and the frequency domain resource assignment for the downlink channel or indicating that data may be configured to be transmitted on the uplink channel based on the preconfigured time domain resource assignment and the frequency domain resource assignment for the uplink channel.

Some examples of the method, apparatuses, and non-transitory computer-readable medium described herein may further include operations, features, means, or instructions for receiving radio resource control signaling including the preconfigured time domain resource assignment and the frequency domain resource assignment.

In some examples of the method, apparatuses, and non-transitory computer-readable medium described herein, one or more rate matching resources of the set of first rate matching resources of the uplink channel or of the set of second rate matching resources of the downlink channel may be beyond an overlapping portion of the uplink channel and the downlink channel.

In some examples of the method, apparatuses, and non-transitory computer-readable medium described herein, the uplink channel at least partially overlaps in time and frequency with the downlink channel, and where the reference signal may be received on the one or more resources of the downlink channel that correspond to the set of first rate matching resources excluded from the uplink channel.

Some examples of the method, apparatuses, and non-transitory computer-readable medium described herein may further include operations, features, means, or instructions for transmitting a second reference signal on one or more resources of the uplink channel, where the one or more resources of the uplink channel correspond to the set of second rate matching resources excluded from the downlink channel.

Some examples of the method, apparatuses, and non-transitory computer-readable medium described herein may further include operations, features, means, or instructions for transmitting control information or data on one or more resources of the uplink channel, where the one or more resources of the uplink channel correspond to the set of second rate matching resources excluded from the downlink channel.

In some examples of the method, apparatuses, and non-transitory computer-readable medium described herein, the uplink channel and the downlink channel may be within a threshold separation in time or frequency.

In some examples of the method, apparatuses, and non-transitory computer-readable medium described herein, the threshold separation in time or frequency may be zero.

Some examples of the method, apparatuses, and non-transitory computer-readable medium described herein may further include operations, features, means, or instructions for transmitting, to a network, a rate matching configuration preference.

In some examples of the method, apparatuses, and non-transitory computer-readable medium described herein, the UE may be configured for full-duplex communications.

A method of wireless communications at a base station is described. The method may include determining a rate matching configuration for one or more of an uplink channel or a downlink channel, determining a set of first rate matching resources of the uplink channel, a set of second rate matching resources of the downlink channel, or a combination thereof, based on the rate matching configuration, receiving a first message on the uplink channel, where the uplink channel excludes the set of first rate matching resources, and transmitting a second message on the downlink channel, where the downlink channel excludes the set of second of rate matching resources, and where a reference signal is transmitted on one or more resources of the downlink channel.

An apparatus for wireless communications at a base station is described. The apparatus may include a processor, memory coupled with the processor, and instructions stored in the memory. The instructions may be executable by the processor to cause the apparatus to determine a rate matching configuration for one or more of an uplink channel or a downlink channel, determine a set of first rate matching resources of the uplink channel, a set of second rate matching resources of the downlink channel, or a combination thereof, based on the rate matching configuration, receive a first message on the uplink channel, where the uplink channel excludes the set of first rate matching resources, and transmit a second message on the downlink channel, where the downlink channel excludes the set of second of rate matching resources, and where a reference signal is transmitted on one or more resources of the downlink channel.

Another apparatus for wireless communications at a base station is described. The apparatus may include means for determining a rate matching configuration for one or more of an uplink channel or a downlink channel, determining a set of first rate matching resources of the uplink channel, a set of second rate matching resources of the downlink channel, or a combination thereof, based on the rate matching configuration, receiving a first message on the uplink channel, where the uplink channel excludes the set of first rate matching resources, and transmitting a second message on the downlink channel, where the downlink channel excludes the set of second of rate matching resources, and where a reference signal is transmitted on one or more resources of the downlink channel.

A non-transitory computer-readable medium storing code for wireless communications at a base station is described. The code may include instructions executable by a processor to determine a rate matching configuration for one or more of an uplink channel or a downlink channel, determine a set of first rate matching resources of the uplink channel, a set of second rate matching resources of the downlink channel, or a combination thereof, based on the rate matching configuration, receive a first message on the uplink channel, where the uplink channel excludes the set of first rate matching resources, and transmit a second message on the downlink channel, where the downlink channel excludes the set of second of rate matching resources, and where a reference signal is transmitted on one or more resources of the downlink channel.

Some examples of the method, apparatuses, and non-transitory computer-readable medium described herein may further include operations, features, means, or instructions for transmitting, to a UE, an indication of the rate matching configuration.

In some examples of the method, apparatuses, and non-transitory computer-readable medium described herein, transmitting the indication may include operations, features, means, or instructions for transmitting DCI including the indication of the rate matching configuration, where the DCI dynamically schedules the downlink channel and the uplink channel.

In some examples of the method, apparatuses, and non-transitory computer-readable medium described herein, transmitting the indication may include operations, features, means, or instructions for transmitting DCI including the indication of the rate matching configuration and one or more transmission parameters, where the DCI dynamically schedules the uplink channel or the downlink channel. In some examples of the method, apparatuses, and non-transitory computer-readable medium described herein, the one or more transmission parameters are associated with the downlink channel when the DCI schedules the uplink channel. In some examples of the method, apparatuses, and non-transitory computer-readable medium described herein, the one or more transmission parameters are associated with the uplink channel when the DCI schedules the downlink channel.

In some examples of the method, apparatuses, and non-transitory computer-readable medium described herein, the one or more transmission parameters include a frequency domain resource assignment, a time domain resource assignment, antenna port information, or a combination thereof.

In some examples of the method, apparatuses, and non-transitory computer-readable medium described herein, the indication includes a scheduling indication of whether the downlink channel overlaps with the uplink channel, a number of scheduling DCI, or a combination thereof.

Some examples of the method, apparatuses, and non-transitory computer-readable medium described herein may further include operations, features, means, or instructions for transmitting radio resource control signaling including a preconfigured time domain resource assignment and a frequency domain resource assignment of the uplink channel, or the downlink channel, or a combination thereof, where receiving the first message on the uplink channel and transmitting the second message on the downlink channel may be based on the preconfigured time domain resource assignment and the frequency domain resource assignment.

Some examples of the method, apparatuses, and non-transitory computer-readable medium described herein may further include operations, features, means, or instructions for transmitting a compact DCI indicating that data may be configured to be transmitted on the downlink channel based on the preconfigured time domain resource assignment and the frequency domain resource assignment for the downlink channel or indicating that data may be configured to be received on the uplink channel based on the preconfigured time domain resource assignment and the frequency domain resource assignment for the uplink channel.

In some examples of the method, apparatuses, and non-transitory computer-readable medium described herein, the preconfigured time domain resource assignment and the frequency domain resource assignment may be for configured grant transmissions when the preconfigured time domain resource assignment and the frequency domain resource assignment may be for the uplink channel, and where the preconfigured time domain resource assignment and the frequency domain resource assignment may be for semi-persistently scheduled transmissions when the preconfigured time domain resource assignment and the frequency domain resource assignment may be for the downlink channel.

In some examples of the method, apparatuses, and non-transitory computer-readable medium described herein, the uplink channel at least partially overlaps in time and frequency with the downlink channel, and where the reference signal may be received on the one or more resources of the downlink channel that correspond to the set of first rate matching resources excluded from the uplink channel.

Some examples of the method, apparatuses, and non-transitory computer-readable medium described herein may further include operations, features, means, or instructions for transmitting a second reference signal on one or more resources of the uplink channel, where the one or more resources of the uplink channel correspond to the set of second rate matching resources excluded from the downlink channel.

Some examples of the method, apparatuses, and non-transitory computer-readable medium described herein may further include operations, features, means, or instructions for transmitting control information or data on one or more resources of the uplink channel, where the one or more resources of the uplink channel correspond to the set of second rate matching resources excluded from the downlink channel.

In some examples of the method, apparatuses, and non-transitory computer-readable medium described herein, the uplink channel and the downlink channel may be within a threshold separation in time or frequency. In some examples of the method, apparatuses, and non-transitory computer-readable medium described herein, the threshold separation in time or frequency may be zero. Some examples of the method, apparatuses, and non-transitory computer-readable medium described herein may further include operations, features, means, or instructions for receiving, from a UE, a rate matching configuration preference.

A method of wireless communications is described. The method may include determining a reference signal collision between a first reference signal on a first channel and a second reference signal on a second channel, where the first channel is at least partially overlapping in time and frequency with the second channel, modifying at least one of the first reference signal or the second reference signal to avoid the reference signal collision based on determining the reference signal collision, transmitting the first reference signal on the first channel based on the modifying, and receiving the second reference signal on the second channel based on the modifying.

An apparatus for wireless communications is described. The apparatus may include a processor, memory coupled with the processor, and instructions stored in the memory. The instructions may be executable by the processor to cause the apparatus to determine a reference signal collision between a first reference signal on a first channel and a second reference signal on a second channel, where the first channel is at least partially overlapping in time and frequency with the second channel, modify at least one of the first reference signal or the second reference signal to avoid the reference signal collision based on determining the reference signal collision, transmit the first reference signal on the first channel based on the modifying, and receive the second reference signal on the second channel based on the modifying.

Another apparatus for wireless communications is described. The apparatus may include means for determining a reference signal collision between a first reference signal on a first channel and a second reference signal on a second channel, where the first channel is at least partially overlapping in time and frequency with the second channel, modifying at least one of the first reference signal or the second reference signal to avoid the reference signal collision based on determining the reference signal collision, transmitting the first reference signal on the first channel based on the modifying, and receiving the second reference signal on the second channel based on the modifying.

A non-transitory computer-readable medium storing code for wireless communications is described. The code may include instructions executable by a processor to determine a reference signal collision between a first reference signal on a first channel and a second reference signal on a second channel, where the first channel is at least partially overlapping in time and frequency with the second channel, modify at least one of the first reference signal or the second reference signal to avoid the reference signal collision based on determining the reference signal collision, transmit the first reference signal on the first channel based on the modifying, and receive the second reference signal on the second channel based on the modifying.

In some examples of the method, apparatuses, and non-transitory computer-readable medium described herein, modifying at least one of the first reference signal or the second reference signal further may include operations, features, means, or instructions for allocating the first reference signal or the second reference signal to different frequency resources.

In some examples of the method, apparatuses, and non-transitory computer-readable medium described herein, the first reference signal may be in a first code division multiplexing group and the second reference signal may be in a second code division multiplexing group.

In some examples of the method, apparatuses, and non-transitory computer-readable medium described herein, modifying at least one of the first reference signal or the second reference signal further may include operations, features, means, or instructions for selecting a first coding scheme for the first reference signal orthogonal to a second coding scheme for the second reference signal.

In some examples of the method, apparatuses, and non-transitory computer-readable medium described herein, the first reference signal and the second reference signal may be in a same code division multiplexing group.

In some examples of the method, apparatuses, and non-transitory computer-readable medium described herein, modifying at least one of the first reference signal or the second reference signal further may include operations, features, means, or instructions for allocating the first reference signal or the second reference signal to different time resources.

DETAILED DESCRIPTION

Figure 1:
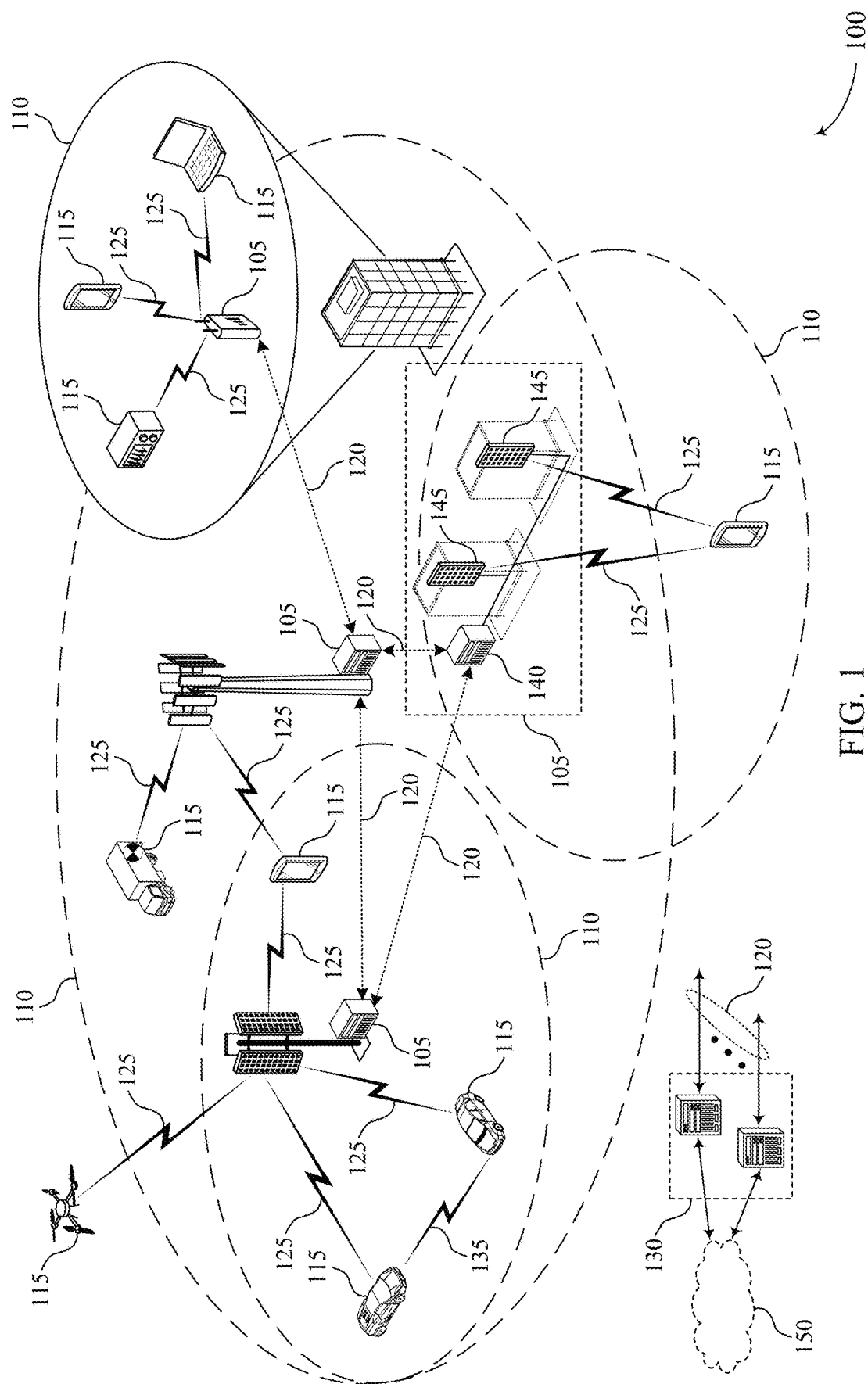
FIG. 1 illustrates an example of a wireless communications system in accordance with aspects of the present disclosure.

A user equipment (UE) and a base station may be configured for half-duplex communication (e.g., one-way communication at a time) or full-duplex communication (e.g., concurrent two-way communication). In a full-duplex system, the UE or base station may cause self-interference by simultaneously transmitting and receiving at the same device. In some cases, a device in a half-duplex system or full-duplex system may rate match transmissions from the device to ensure that a receiving device is likely to receive the message transmitted (e.g., without error). In some cases, rate matching designs may be limited in that such techniques do not account for overlapping or nearby uplink and downlink channels, such as in a full-duplex system. Thus, some rate matching techniques may not allow for a wireless device (e.g., UE or base station) to efficiently measure received reference signals in addition to measuring self-interference.

According to the techniques described herein, a wireless device may rate match its transmission (e.g., data) on a physical channel (e.g., a physical downlink shared channel (PDSCH) or a physical uplink shared channel (PUSCH)) around the reference signal (e.g., demodulation reference signal (DMRS)) of a received physical channel. For example, a UE may rate match its transmission on a PUSCH around the DMRS of a PDSCH from a base station. Additionally or alternatively, a base station may rate match its transmission on a PDSCH around the DMRS of a PUSCH from a UE. Further, a rate matching configuration for one or more channels may be shared among devices. In some examples, a rate matching configuration may include or indicate the location of DMRS to be received such that the device may rate match its own transmission based on the reception of the DMRS. A rate matching configuration may be implicitly or explicitly indicated by a scheduling downlink control information (DCI) that indicates which resources to leave empty (e.g., corresponding to a location of rate matching resource elements (REs)) during a transmission corresponding to the resources used for DMRS reception. The scheduling DCI may allow for dynamic rate matching configurations at both the BS and UE. In some cases, the rate matching configuration for a receiving device may include an indication of which resources on the received channel (e.g., from the transmitting device) will be left empty and may be used for self-interference measurements at the receiving device. For example, the base station may indicate to the UE which resources will be empty in the PDSCH such that the UE may measure its own PUSCH transmission during the empty PDSCH resources. For non-overlapping portions of channels, resources may be left empty to measure interference leakage from a received channel within a threshold separation of a transmitted channel. The described rate matching techniques may allow for improved channel estimation and interference measurements based on DMRS (e.g., half-duplex DMRS).

Additionally, the number of signaling collisions may increase as full-duplex communications increase. Specifically, the collisions between uplink DMRS and downlink DMRS in a full-duplex system may increase; however, this collision of reference signals should be avoided to accurately estimate channels and interference. The techniques described herein enable a network to resolve reference signal collisions in the same resources such that both the reception and transmission of DMRS are efficiently used for reference signal measurements by at least the receiving device. For example, a network may configure resources carrying reference signals (e.g., a first reference signal that overlaps with a second reference signal) to avoid collision by adjusting the frequency resource allocation of the DMRS, the time resource allocation of the DMRS, or channel coding such that the first and second reference signals are orthogonal to one another. It is noted that the techniques described herein may apply to half-duplex and full-duplex systems.

Aspects of the disclosure are initially described in the context of wireless communications systems. Examples are also provided that describe channel configurations and process flows. Aspects of the disclosure are further illustrated by and described with reference to apparatus diagrams, system diagrams, and flowcharts that relate to rate matching between uplink and downlink.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In wireless communications system 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 and a base station 105 may be configured for half-duplex communication (e.g., one-way communication at a time) or full-duplex communication (e.g., concurrent two-way communication) communication over a communication link 125. The techniques described herein may apply to half-duplex and full-duplex systems. In a full-duplex system, the UE 115 or base station 105 may cause self-interference by concurrently or contiguously transmitting and receiving over a communication link 125. In some cases, a device (e.g., UE 115 or base station 105) in a half-duplex system or full-duplex system may rate match a channel transmitted from the device to ensure that a receiving device (e.g., UE 115 or base station 105) is likely to receive the correct message.

According to the techniques described herein, a wireless device (e.g., UE 115 or base station 105) in wireless communications system 100 may rate match its transmission (e.g., data) on a physical channel (e.g., a PDSCH or a PUSCH) around the reference signal (e.g., DMRS) of a received physical channel. For example, a UE 115 may rate match its transmission on a PUSCH around the DMRS of a PDSCH from a base station 105. Additionally or alternatively, a base station 105 may rate match its transmission on a PDSCH around the DMRS of a PUSCH from a UE 115. Further, a rate matching configuration for one or more channels may be shared among devices. In some examples, a rate matching configuration may include the location of DMRS to be received such that a device may rate match its transmission based on the reception of the DMRS.

A rate matching configuration may be implicitly or explicitly indicated by a scheduling DCI that indicates which resources to leave empty (e.g., rate matching REs) during a transmission corresponding to the resources used for DMRS reception. The scheduling DCI may allow for dynamic rate matching configuration at both the base station 105 and the UE 115. In some cases, the rate matching configuration for a receiving device (e.g., UE 115 or base station 105) may include which resources the received channel from the transmitting device (e.g., UE 115 or base station 105) will be left empty and may be used for self-interference measurements at the receiving device. For example, the base station 105 may indicate to the UE 115 which resources will be empty in the PDSCH such that the UE 115 may measure its own PUSCH transmission during that empty PDSCH resource. For non-overlapping portions of channels, resources may be left empty to measure interference leakage from a received channel within a threshold separation of a transmitted channel. The described rate matching techniques may allow for improved channel estimation and interference measurements based on DMRS (e.g., half-duplex DMRS).

The techniques described herein may allow a base station 105 to resolve reference signal collisions in the same resources such that both the reception and transmission of DMRS are efficiently used for reference signal measurements by at least the receiving device (e.g., UE 115). For example, a base station 105 may configure a first reference signal overlapping with a second reference signal to avoid collision by adjusting the frequency resource allocation of the DMRS, the time resource allocation of the DMRS, or channel coding such that the first and second reference signals are orthogonal to one another.

Figure 2:
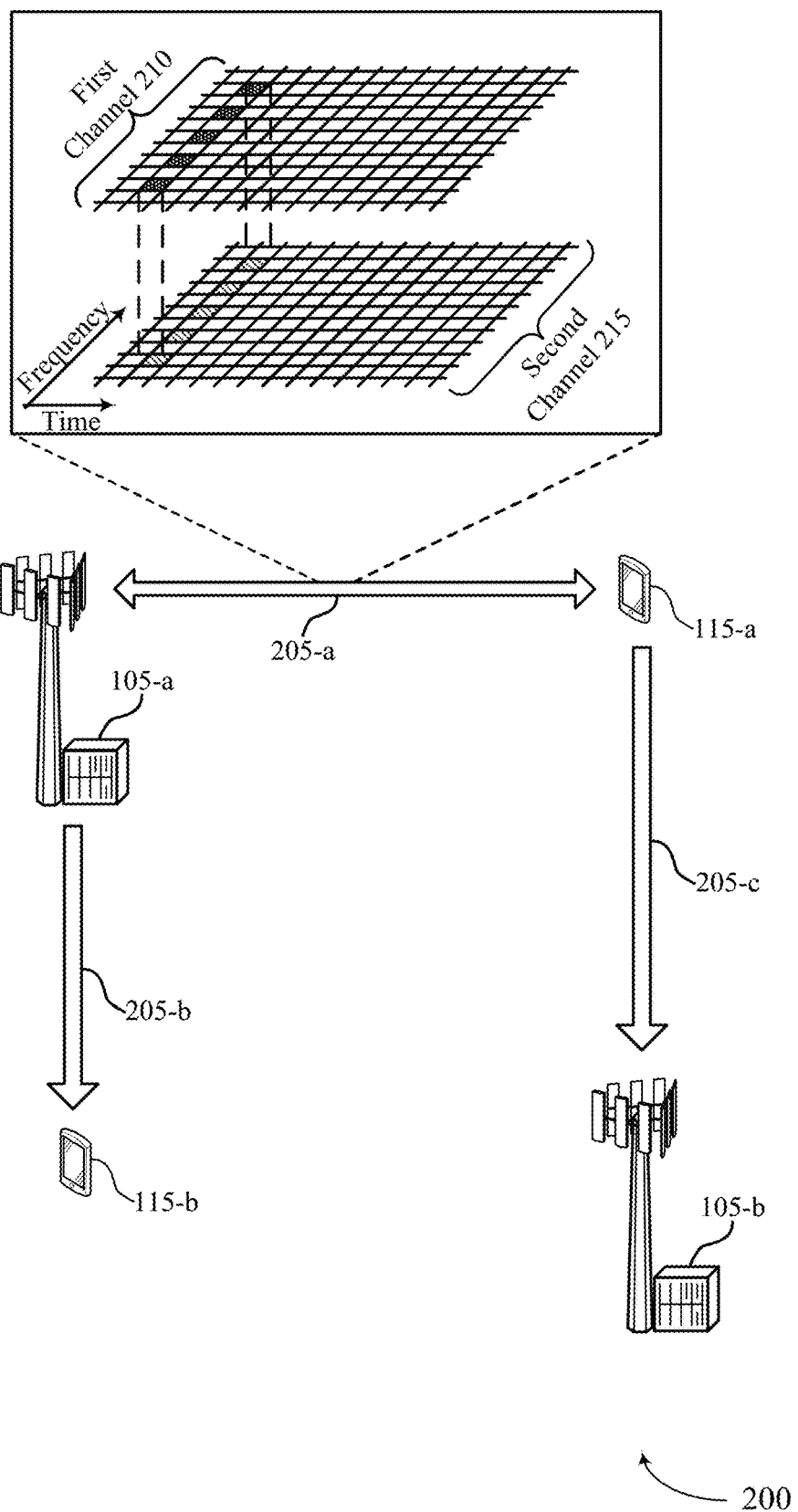
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100. Wireless communications system 200 may include UEs 115-a and 115-b, which may be examples of a UE 115, as described with reference to FIG. 1. UEs 115-a and 115-b may support rate matching configurations between a first channel 210 and a second channel 215 (e.g., uplink and downlink channels).

In wireless communications system 200, UE 115-a may be configured for full-duplex communications with base station 105-a and configured for half-duplex communications with base station 105-b. Base station 105-a may be configured for full-duplex communications with UE 115-a and configured for half-duplex communications with UE 115-b. Communications between base station 105-a and UE 115-a may undergo rate matching before transmission such that the transmitting device of the second channel 215, which may be PDSCH or PUSCH, may rate match data around DMRS 220 of the first channel, which may be PUSCH or PDSCH, resulting in empty rate matched REs 225 (e.g., rate matching resources) overlapping in time and frequency with DMRS 220. For example, the first channel 210 may be a PDSCH and the second channel 215 may be a PUSCH. In another example, the first channel 210 may be a PUSCH and the second channel 215 may be a PDSCH. In some cases, the second channel 215 may also be associated with (or transmitted with) a DMRS that the first channel 210 may be rate matched around.

By configuring the rate matching of the second channel 215 based on the time and frequency location of DMRS on the first channel 210, the receiving device (e.g., UE 115-a or base station 105-a) may perform efficient channel estimation by reducing self-interference during the DMRS 220 reception by not transmitting in the rate matched REs 225. The receiving device (e.g., UE 115-a or base station 105-a) may measure the inter-device interference based on half-duplexed DMRS 220. In some cases, the transmitting device (e.g., UE 115-a or base station 105-a) may indicate the location of DMRS 220 of the first channel 210 to the receiving device (e.g., UE 115-a or base station 105-a) such that the receiving device may determine what resources to leave empty as rate matched REs 225. In some examples, the receiving device (e.g., UE 115-a or base station 105-a) may indicate the location of rate matched REs 225 of the second channel 215 to the transmitting device (e.g., UE 115-a or base station 105-a) such that the transmitting device may determine what resources to use for DMRS 220. Additionally or alternatively, this indication may allow the network, via base station 105-a, to avoid a collision between DMRS 220 of the first channel 210 with DMRS in the second channel 215 (not shown).

In some cases, the rate matching configuration indication between UE 115-a and base station 105-a may be dynamic due to the dynamic scheduling of the uplink or downlink channel using DCI. In this case, the frequency and time location of the rate matched REs 225 may dynamically change (e.g., change on a symbol or slot basis). The techniques described herein may avoid cases where the PDSCH is not correctly rate matched because uplink scheduling DCI is not detected, as well as avoiding cases of PUSCH not being correctly rate matched because downlink scheduling DCI is not detected. In these cases, the PDSCH or PUSCH may not be correctly decoded, but at least the device (e.g., UE 115-a or base station 105-a) may abandon transmitting or receiving the channel given that the rate matching may not be done correctly based on the scheduling DCI not being detected.

Multiple schemes are described for the network to indicate whether the base station 105-a, or UE 115-a, or both, is to perform rate matching in the second channel 215. In one example, a single DCI that schedules both the first channel 210 and second channel 215 (e.g., uplink and downlink) may indicate the rate matching configuration. For example, the UE 115-a determines whether rate matching may be performed based on the scheduling DCI. For a PDSCH, if PUSCH is scheduled in an overlapping resource or nearby non-overlapping resources, the base station 105-a may rate match the PDSCH. Additionally or alternatively, the UE 115-a may rate match the PUSCH. Otherwise, the UE 115-a and base station 105-a may not perform rate matching. This scheduling DCI may take on a format that supports scheduling both the uplink and downlink channels in the same DCI. In another example, one scheduling DCI, scheduling uplink or downlink channels, may contain transmission parameters for the other channel that is not scheduled by the scheduling DCI. For example, a DCI scheduling an uplink channel may include information about the downlink channel that is scheduled by another DCI.

The transmission parameters information may include at least one of a frequency domain resource assignment (FDRA), a time domain resource assignment (TDRA), and port information from the other scheduling DCI for transmission in the other direction (e.g., uplink or downlink). When the scheduling DCI format does not contain one or more of the TDRA, FDRA, or port information from the other scheduling DCI, the UE 115-a may rate match one channel based on the known transmission parameter. For example, if the transmission parameter includes the FDRA, then the UE 115-a may rate match in the entire frequency bandwidth of the bandwidth part over all ports of the other channel. In another example, if the transmission parameter includes the TDRA, then the UE 115-a may rate match in the entire channel duration of the bandwidth part over all ports of the other channel.

In some cases, the scheduling DCI of one channel may include an indication of whether, and how many, scheduling DCIs schedule overlapping (e.g., full-duplexed) or nearby (e.g., within a threshold separation) transmissions in the other direction (e.g., the second channel 215) colliding with the first channel 210. A device may support one PDSCH overlapping with one PUSCH (e.g., only one PUSCH), and the indication from the DCI may inform the UE 115-a whether rate matching may be used or not.

In another example, a time and frequency resource assignment for each channel may be pre-configured (e.g., via RRC signaling) such that the resource is determined for a possible future transmission (e.g., a semi-persistently scheduled (SPS) transmission for PDSCH or a configured grant (CG) transmission for PUSCH). In some cases, the UE 115-a and base station 105-a may rate match their respective transmission channels assuming data in the other direction will be transmitted in the pre-configured resource assignment. In other cases, the base station 105-a may transmit a small size dynamic DCI (e.g., compact DCI) to indicate whether the overlapping channel or nearby channel will be transmitted in the pre-configured resource assignment. In another example, the scheduling DCI may include a flag to indicate whether the conflicting channel (e.g., PUSCH) is transmitted when DCI is used for scheduling, for example scheduling the PDSCH. Whether downlink or uplink data is granted, the DCI may additionally include information to dynamically modify the TDRA and/or FDRA of the pre-configured resource assignment. A UE 115-a or base station 105-a may perform rate matching if data is scheduled (e.g., dynamically or semi-persistently) in the other direction. Otherwise, the UE 115-a or base station 105-a may not perform rate matching. In another example, rate matching may be performed in the second channel 215 based on a rate matching pattern, such that UE 115-a may measure interference from the first channel 210 in the rate matched REs 225 (e.g., rate matched resources).

In some examples, the second channel 215 may be rate matched around REs corresponding to DMRS 220 of the first channel 210. In another example, the second channel 215 may be rate matched around REs corresponding to data or control information of the first channel 210. For instance, REs in the resource block (RB) of the second channel and OFDM symbols where rate matching is performed (e.g., rate matched REs 225) may correspond to DMRS 220, data, or control information in the first channel 210. In some cases, a device may rate match in the entire bandwidth or in a partial bandwidth of the second channel 215 that is rate matched. For instance, a rate matching configuration may apply to RBs and REs in RB where rate matching is performed if rate matching is not performed in full bandwidth of the second channel 215. In some cases, REs to be rate matched around (e.g., rate matched REs 225) do not overlap with the first channel 210. The base station 105-a may configure the rate matching information for UE 115-a to determine the specific resource elements to be rate matched around, or the UE 115-a may report its preferred resources or procedure for the rate matching.

Figure 3:
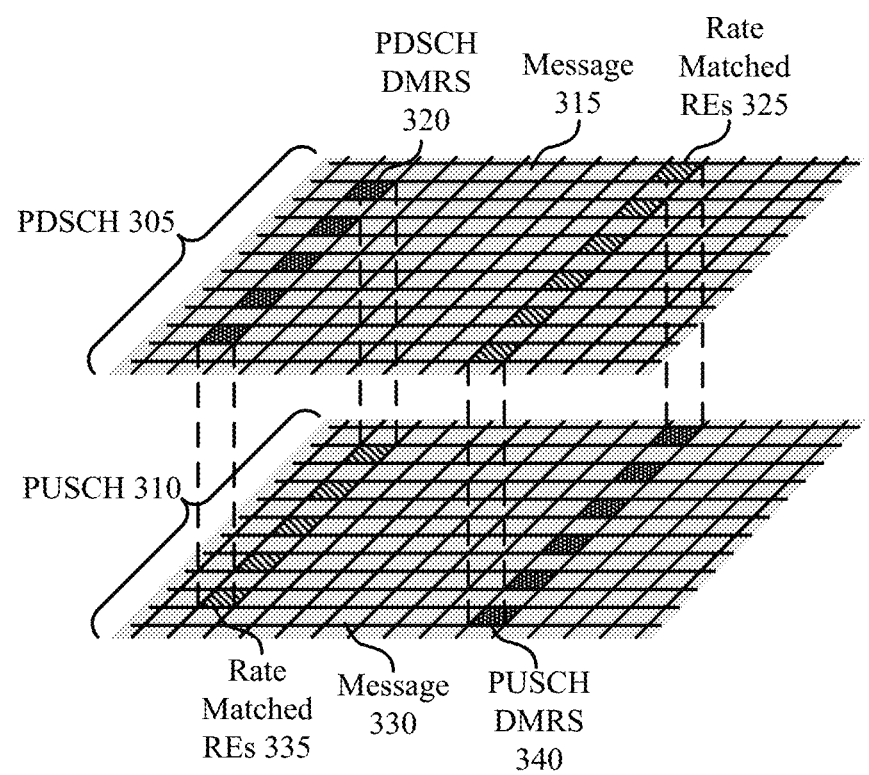
FIG. 3 illustrates an example of a channel configuration in accordance with aspects of the present disclosure.

FIG. 3 illustrates an example of a channel configuration 300 in accordance with aspects of the present disclosure. In some examples, channel configuration 300 may implement aspects of wireless communications system 100 or wireless communications system 200. Channel configuration 300 may include PDSCH 305 and PUSCH 310, which may be examples of the first channel and the second channel in FIG. 2. Channel configuration 300 may apply to a full-duplex system in which PDSCH 305 and PUSCH 310 overlap in time and frequency. In some examples, one or both of a UE or a base station may communicate using full-duplexed communications in accordance with techniques described with reference to channel configuration 300.

The PDSCH 305 may include a message 315 to be transmitted from the base station to the UE. The message 315 may be transmitted with an associated DMRS (e.g., PDSCH DMRS 320). The message 315 may be rate matched around rate matched REs 325. The PUSCH 310 may include a message 330 to be transmitted from the UE to the base station. The message 330 may be transmitted with an associated DMRS 340. The message 330 may be rate matched around rate matched REs 335. The rate matched REs 335 may overlap in time and frequency with the resources used for PDSCH DMRS 320 to allow efficient downlink channel estimation at the UE. The rate matched REs 325 may overlap in time and frequency with the resources used for PUSCH DMRS 340 to allow efficient uplink channel estimation at the base station.

Channel configuration 300 may apply when full-duplexing is enabled at both the UE and the base station, and the configuration may at least rate match PDSCH 305 around PUSCH DMRS 340, which may be a base station preference, and the configuration may rate match PUSCH 310 around PDSCH DMRS 320, which may be a UE preference. Even if a UE or base station is not full-duplexed, there may be another UE or another base station whose uplink or downlink transmission interferes with the half-duplex UE's downlink reception or the half-duplex base station's uplink reception (e.g., cross-link interference between half-duplex devices). Therefore, the described techniques for rate matching around the other channel's DMRS may be used in such cases.

Figure 4A:
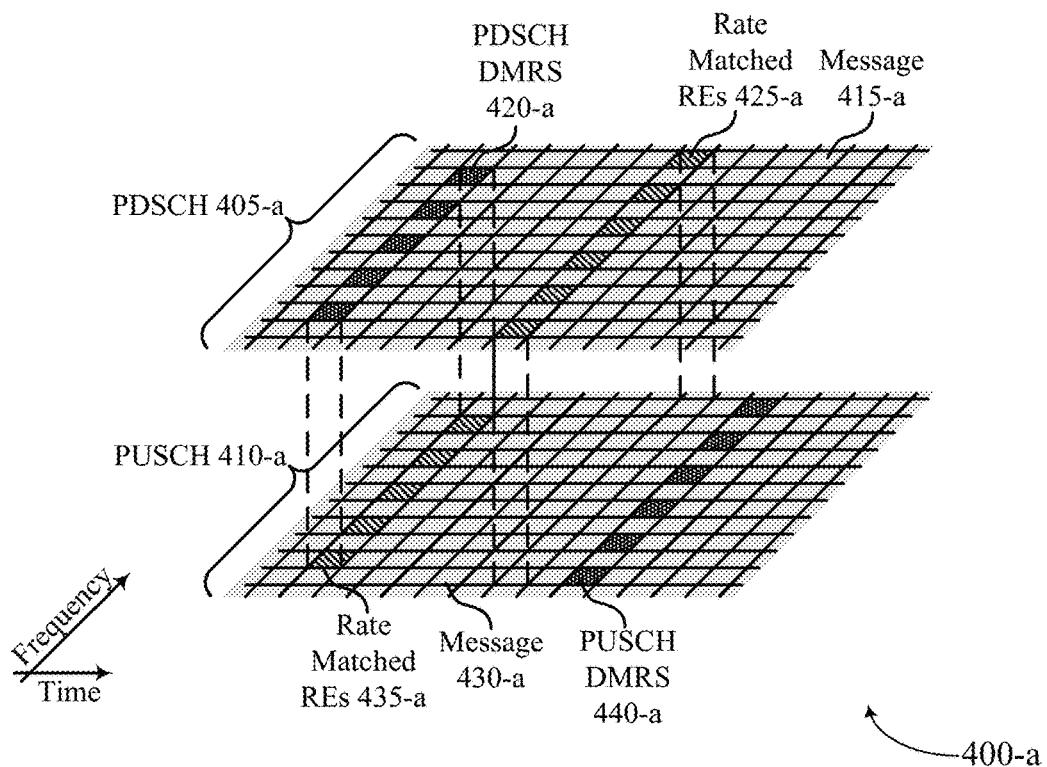
FIGS. 4A and 4B illustrate examples of channel configurations in accordance with aspects of the present disclosure.
Figure 4B:
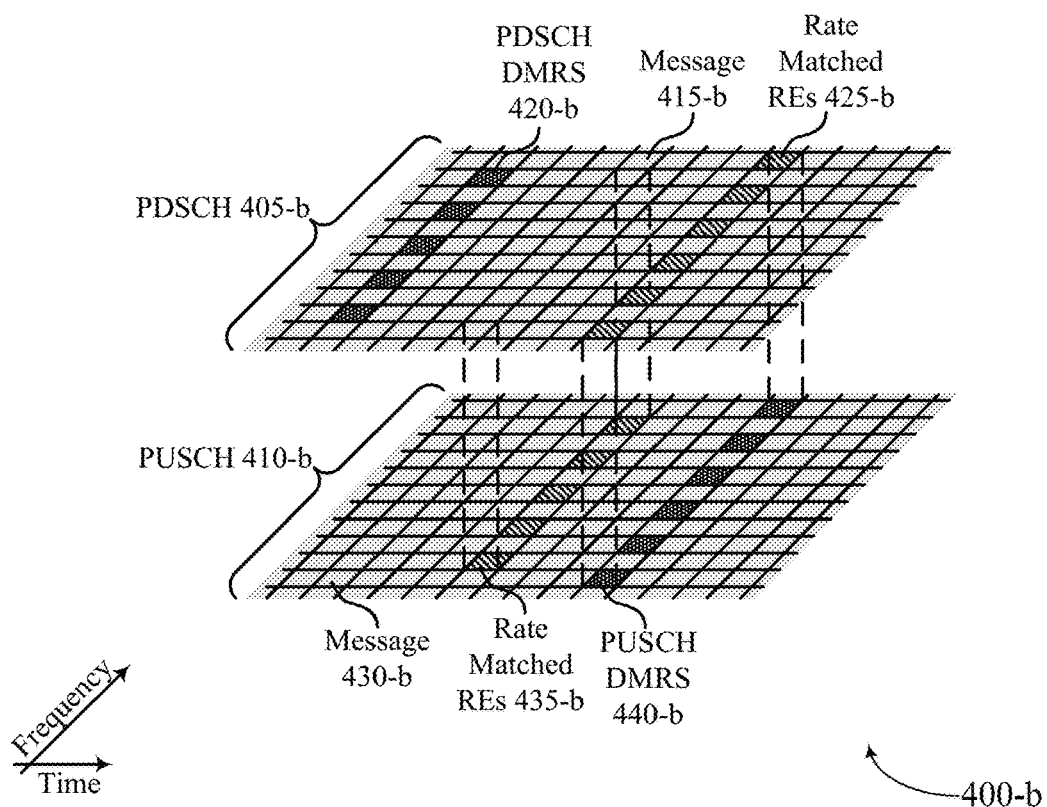

FIGS. 4A and 4B illustrate an example of a channel configuration 400 (e.g., channel configuration 400-*a* and channel configuration 400-*b*) in accordance with aspects of the present disclosure. In some examples, a channel configuration 400 may implement aspects of wireless communications system 100 or wireless communications system 200. A channel configuration 400 may include PDSCH 405 and PUSCH 410, which may be examples of the first channel and the second channel in FIG. 2 as well as the PDSCH and PUSCH in FIG. 3. A channel configuration 400 may apply to a full-duplex system in which PDSCH 405 and PUSCH 410 overlap in time and frequency. In some examples, one or both of a UE or a base station may communicate using full-duplexed communications and in accordance with techniques described with reference to channel configurations 400-*a* and 400-*b*.

In FIG. 4A, a UE may be configured for full-duplex operations. The PDSCH 405-*a* may include a message 415-*a* to be transmitted from the base station to a UE. The message 415-*a* may be transmitted with an associated DMRS (e.g., a PDSCH DMRS 420-*a*). The message 415-*a* may be rate matched around rate matched REs 425-*a*. The PUSCH 410-*a* may include a message 430-*a* to be transmitted from the UE to the base station. The message 430-*a* may be transmitted with an associated DMRS (e.g., PUSCH DMRS 440-*a*). The message 430-*a* may be rate matched around rate matched REs 435-*a*. The rate matched REs 435-*a* may overlap in time and frequency with the resources used for PDSCH DMRS 420-*a* to allow efficient downlink channel estimation at the UE. In some cases, a physical uplink control channel (PUCCH) may not be rate matched.

The rate matched REs 425-*a* may overlap in time and frequency with the resources used for data or control information of message 430-*a* to allow efficient self-interference measurement at the UE. Because UE knows what it has transmitted in the uplink including the PUSCH 410-*a*, to estimate the self-interference channel, PDSCH 405-*a* may be rate matched around any uplink signal or data such as PUSCH 410-*a*. The UE may use the corresponding REs (e.g., PUSCH 410-*a* data REs, PUSCH DMRS 440-*a*, a sounding reference signal (SRS), PUCCH) of uplink signal or data, such as PUSCH 410-*a*, as reference signals for interference measurements.

In FIG. 4B, a base station may be configured for full-duplex operations. The PDSCH 405-*b* may include a message 415-*b* to be transmitted from the base station to a UE. The message 415-*b* may be associated with a DMRS (e.g., PDSCH DMRS 420-*b*). The message 415-*b* may be rate matched around rate matched REs 425-*b*. The PUSCH 410-*b* may include a message 430-*b* to be transmitted from the UE to the base station. The message 430-*b* may be associated with a DMRS (e.g., PUSCH DMRS 440-*b*). The message 430-*b* may be rate matched around rate matched REs 435-*b*. The rate matched REs 425-*b* may overlap in time and frequency with the resources used for PUSCH DMRS 440-*b* to allow efficient uplink channel estimation at the base station. In some cases, a physical downlink control channel (PDCCH) may not be rate matched.

The rate matched REs 435-*b* may overlap in time and frequency with the resources used for data or control information of message 415-*b* to allow efficient self-interference measurement at the base station. Because the base station knows what it has transmitted in the downlink, including PDSCH 405-*b*, to estimate the self-interference channel, PUSCH 410-*b* may be rate matched around any downlink signal or data, such as PDSCH 405-*b*. The base station may use the corresponding REs (e.g., PDSCH 405-*b* data REs, PDSCH DMRS 420-*b*, CSI-RS, PDCCH, or PTRS) of downlink signaling or data, such as PDSCH 405-*b*, as reference signals for interference measurements.

Figure 5:
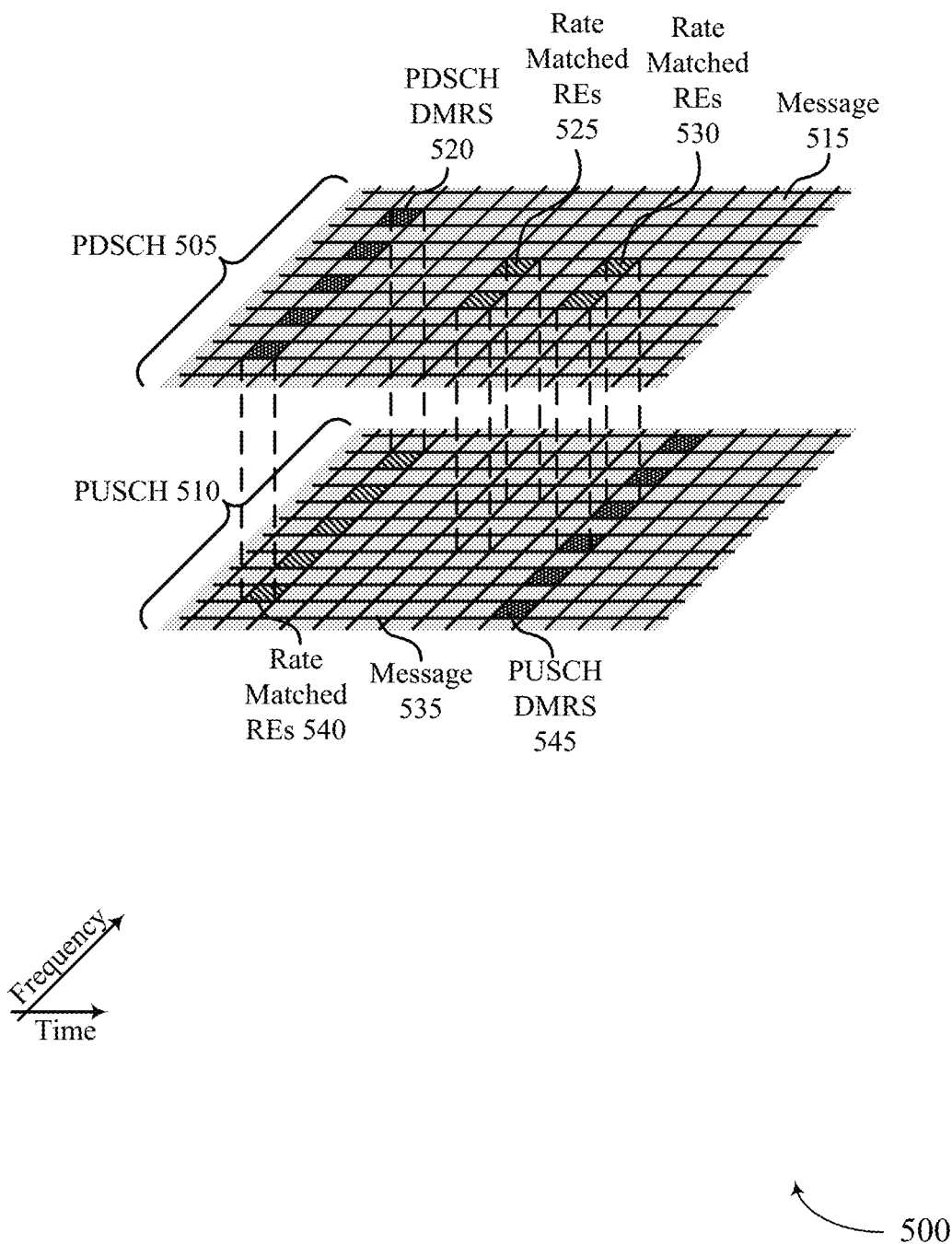
FIG. 5 illustrates an example of a channel configuration in accordance with aspects of the present disclosure.

FIG. 5 illustrates an example of a channel configuration 500 in accordance with aspects of the present disclosure. In some examples, channel configuration 500 may implement aspects of wireless communications system 100 or wireless communications system 200. Channel configuration 500 may include PDSCH 505 and PUSCH 510, which may be examples of the first channel and the second channel in FIG. 2 as well as the PDSCH and PUSCH in FIG. 3. Channel configuration 500 may apply to a full-duplex system in which PDSCH 505 and PUSCH 510 overlap in time and frequency. The channel configuration 500 of FIG. 5 illustrates an example of partial rate matching in PDSCH. It is noted that partial rate matching may also be performed for PUSCH (or other channels) in a similar way. In some examples, one or both of a UE or a base station may communicate using full-duplexed communications and in accordance with techniques described with reference to channel configuration 500.

When PDSCH 505 is rate matched around REs that correspond to data of message 535 or DMRS 545 in PUSCH 510, rate matching may not be performed over an entire bandwidth of PUSCH 510 or an entire bandwidth of PDSCH 505. For example, partial rate matching may be enabled, where partial rate matching may be performed when PUSCH 510 is rate matched around REs that correspond to data of message 515 or DMRS 520 in PDSCH 505 (not shown). In channel configuration 500, PDSCH 505 may be rate matched around at least a portion or subset of PUSCH DMRS 545 (corresponding to rate matched REs 530) and data REs (corresponding to rate matched REs 525) in one or more RBs of the OFDM symbol. In some examples, the network may configure the bitmap or range for RBs and pattern of REs in each RB for the partial rate matching.

Figure 6A:
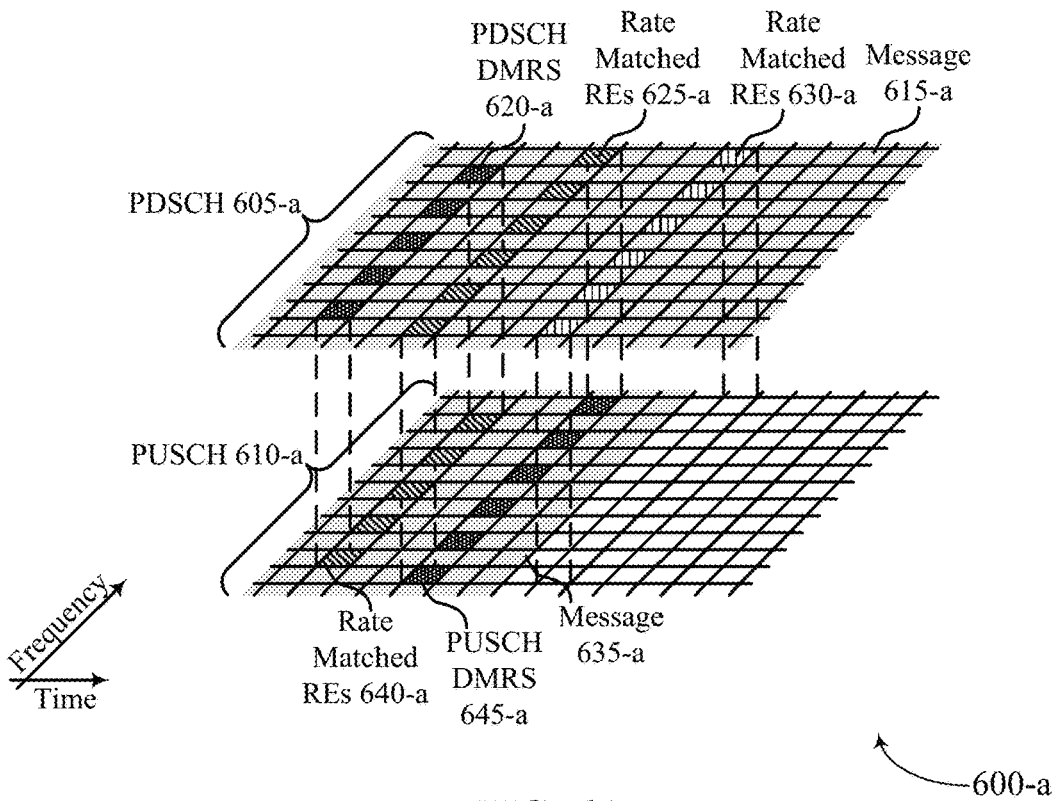
FIGS. 6A and 6B illustrate examples of channel configurations in accordance with aspects of the present disclosure.
Figure 6B:
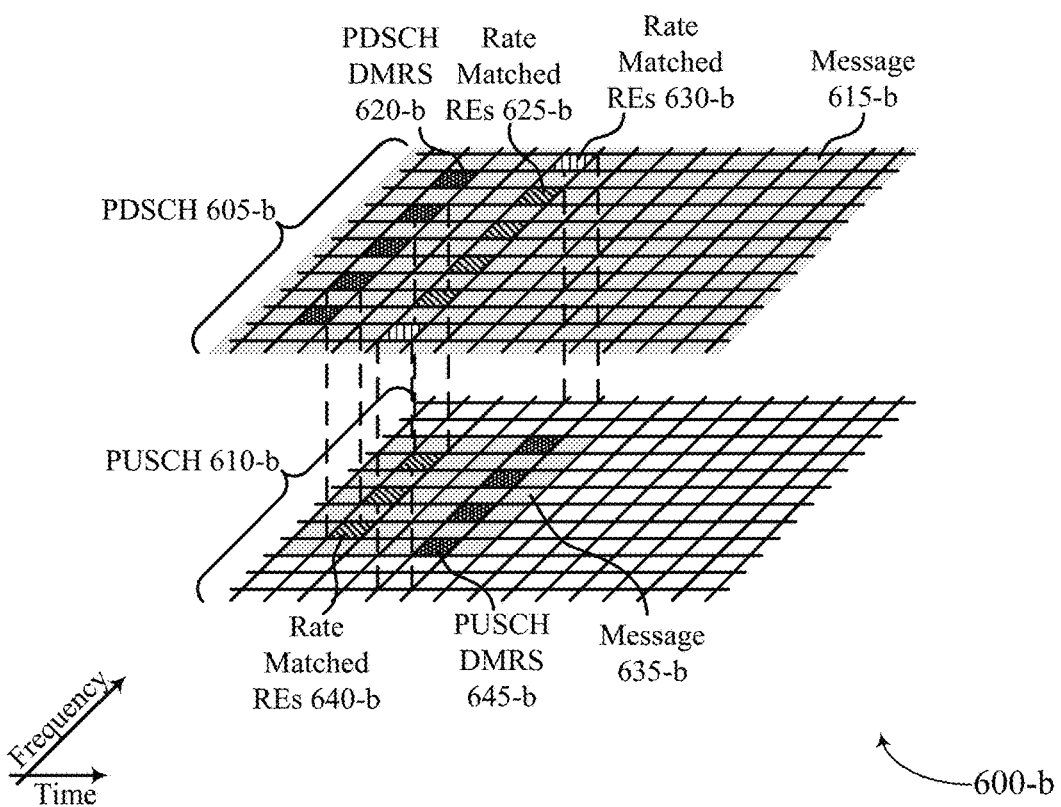

FIGS. 6A and 6B illustrate an example of a channel configuration 600 (e.g., channel configuration 600-*a* and channel configuration 600-*b*) in accordance with aspects of the present disclosure. In some examples, a channel configuration 600 may implement aspects of wireless communications system 100 or wireless communications system 200. A channel configuration 600 may include PDSCH 605 and PUSCH 610, which may be examples of the first channel and the second channel in FIG. 2 as well as the PDSCH and PUSCH in FIG. 3. A channel configuration 600 may apply to a full-duplex system in which PDSCH 605 and PUSCH 610 at least partially overlap in time and frequency. In these examples, the PDSCH 605 includes additional rate matched REs 630, however, the PUSCH 610 may instead or also include additional rate matched REs 630. FIGS. 6A and 6B illustrate examples of additional rate matched REs in PDSCH. However, rate matching around additional rate matched REs may also be performed in PUSCH (or other channels) using similar techniques. In some examples, one or both of a UE or a base station may communicate using full-duplexed communications and using techniques described with reference to channel configurations 600-*a* and 600-*b*.

In FIG. 6A, the PDSCH 605-*a* may include a message 615-*a* to be transmitted from the base station to a UE. The message 615-*a* may be associated with a DMRS (e.g., PDSCH DMRS 620-*a*). The message 615-*a* may be rate matched around rate matched REs 625-*a* and 630-*a*. The PUSCH 610-*a* may include a message 635-*a* to be transmitted from the UE to the base station. The message 635-*a* may be associated with a DMRS (e.g., PUSCH DMRS 645-*a*). The message 635-*a* may be rate matched around rate matched REs 640-*a*. The rate matched REs 640-*a* may overlap in time and frequency with the resources used for PDSCH DMRS 620-*a* to allow efficient downlink channel estimation at the UE. The rate matched REs 625-*a* may overlap in time and frequency with the resources used for PUSCH DMRS 645-*a* to allow efficient uplink channel estimation at the base station.

Additionally, the rate matched REs 630-*a* may be configured to measure interference that may leak into REs of the PDSCH 605-*a* where message 635-*a* is not transmitted in corresponding REs in uplink for PUSCH 610-*a*. For instance, to measure the interference leakage, rate matching may be performed in REs 630-*a* for additional rate matching in the time domain. In another example, the PUSCH 610-*a* may extend in time beyond message 615-*a* of the PDSCH 605-*a* and may include additional rate matching REs to measure leakage from the PDSCH 605-*a*. The location of the additional rate matching REs 630-*a* may depend on the resource assignment for the PUSCH 610-*a*, and their relationship may be pre-determined.

In FIG. 6B, the PDSCH 605-*b* may include a message 615-*b* to be transmitted from the base station to a UE. The message 615-*b* may be associated with a DMRS (e.g., PDSCH DMRS 620-*b*). The message 615-*b* may be rate matched around rate matched REs 625-*b* and 630-*b*. The PUSCH 610-*b* may include a message 635-*b* to be transmitted from the UE to the base station. The message 635-*b* may be associated with a DMRS (e.g., a PUSCH DMRS 645-*b*). The message 635-*b* may be rate matched around rate matched REs 640-*b*. The rate matched REs 640-*b* may overlap in time and frequency with the resources used for at least a portion of the PDSCH DMRS 620-*b* to allow efficient downlink channel estimation at the UE. The rate matched REs 625-*b* may overlap in time and frequency with the resources used for at least a portion of the PUSCH DMRS 645-*b* to allow efficient uplink channel estimation at the base station.

Additionally or alternatively, message 615-*b* may extend in frequency beyond message 635-*b*, and the rate matched REs 630-*b* may be configured to measure interference that may leak into REs of the PDSCH 605-*b* where message 635-*b* is not transmitted in corresponding REs in uplink for PUSCH 610-*b*. For instance, to measure the interference leakage, rate matching may be performed in REs 630-*b* for additional rate matching in the frequency domain. In another example, the PUSCH 610-*b* may extend in frequency beyond message 615-*b* of the PDSCH 605-*b* and may include additional rate matching REs to measure leakage from the PDSCH 605-*b*. The location of the additional rate matching REs 630-*b* may depend on the resource assignment for the PUSCH 610-*b*, and their relationship may be pre-determined.

Figure 7A:
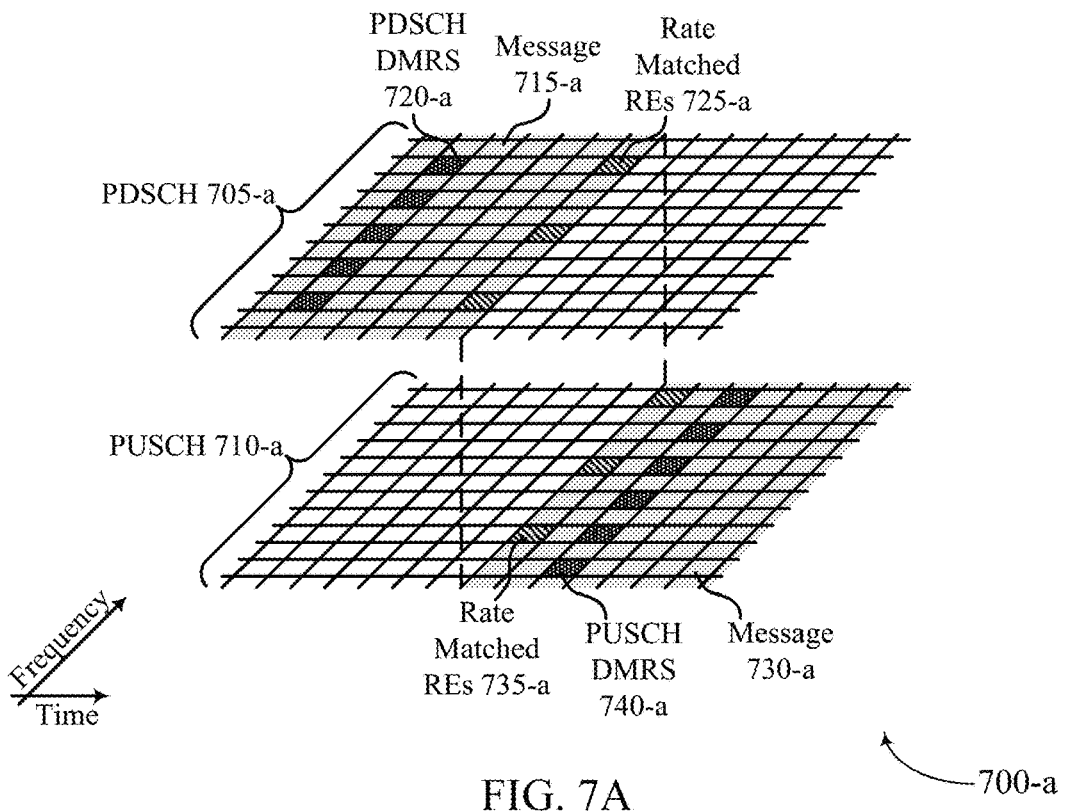
FIGS. 7A and 7B illustrate examples of channel configurations in accordance with aspects of the present disclosure.
Figure 7B:
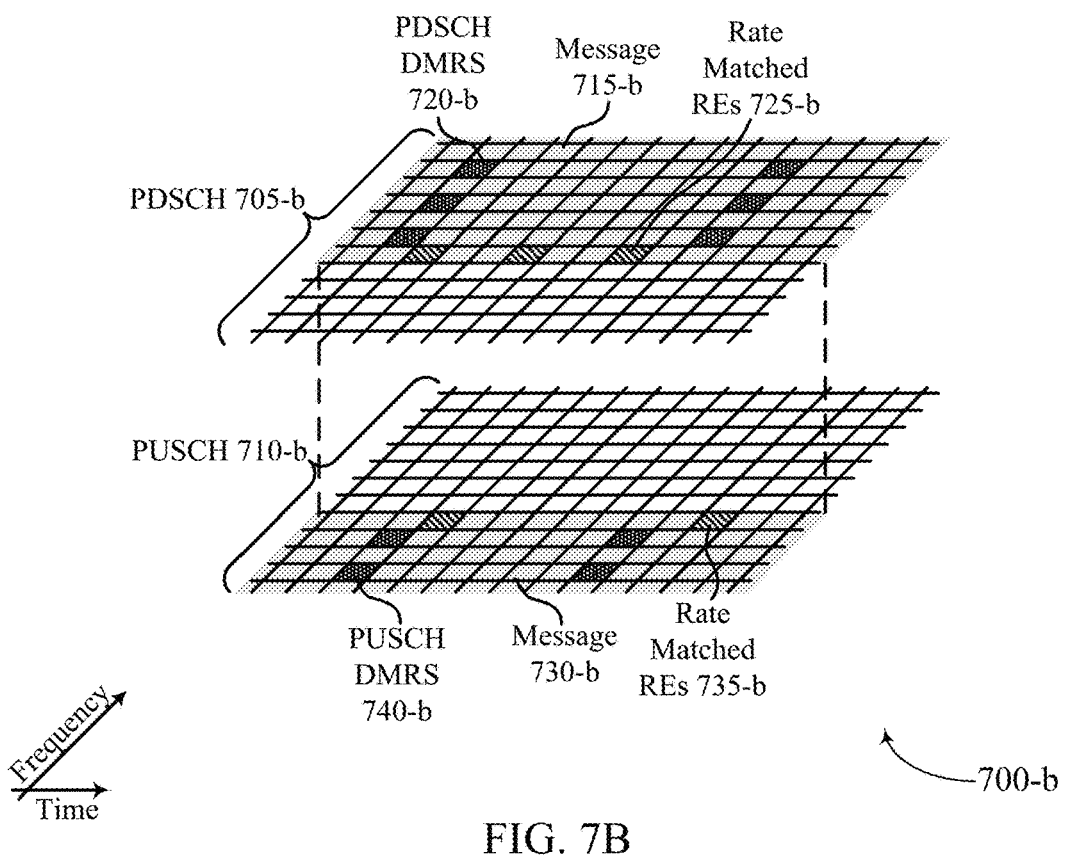

FIGS. 7A and 7B illustrate an example of a channel configuration 700 (e.g., channel configuration 700-*a* and channel configuration 700-*b*) in accordance with aspects of the present disclosure. In some examples, a channel configuration 700 may implement aspects of wireless communications system 100. A channel configuration 700 may include PDSCH 705 and PUSCH 710, which may be examples of the first channel and the second channel in FIG. 2 as well as the PDSCH and PUSCH in FIG. 3. A channel configuration 700 may apply to a full-duplex system or a half-duplex system in which PDSCH 705 and PUSCH 710 are non-overlapping but are within a threshold separation in time and frequency of each other. Even if uplink and downlink are not full-duplexed (e.g., not in overlapping time and frequency resource), rate matching may still be enabled for interference measurement in a first channel, downlink or uplink, for interference from the opposite direction, uplink or downlink. In some cases, rate matching may be done at one or both of the PDSCH 705 and PUSCH 710. In some examples, one or both of a UE or a base station may communicate using techniques described with reference to channel configurations 700-*a* and 700-*b*.

In FIG. 7A, the PDSCH 705-*a* may include a message 715-*a* to be transmitted from the base station to a UE. The message 715-*a* may be associated with a DMRS 720-*a*. The message 715-*a* may be rate matched around rate matched REs 725-*a*. The PUSCH 710-*a* may include a message 730-*a* to be transmitted from the UE to the base station. The message 730-*a* may be associated with a DMRS 740-*a*. The message 730-*a* may be rate matched around rate matched REs 735-*a*. The rate matched REs 735-*a* may be within a threshold separation in time and frequency with the message 715-*a* of PDSCH 705-*a* to allow efficient downlink channel interference leakage measurement at the base station. The rate matched REs 725-*a* may be within a threshold separation in time and frequency with the message 730-*a* of PUSCH 710-*a* to allow efficient uplink channel interference leakage measurement at the UE. This example may apply to channels within a threshold separation in the time domain. For example, the threshold separation in the time domain may include a small gap or no gap (e.g., may be zero).

In FIG. 7B, the PDSCH 705-*b* may include a message 715-*b* to be transmitted from the base station to a UE. The message 715-*b* may be associated with a DMRS 720-*b*. The message 715-*b* may be rate matched around rate matched REs 725-*b*. The PUSCH 710-*b* may include a message 730-*b* to be transmitted from the UE to the base station. The message 730-*b* may be associated with a DMRS 740-*b*. The message 730-*b* may be rate matched around rate matched REs 735-*b*. The rate matched REs 735-*b* may be within a threshold separation in time and frequency with the message 715-*b* of PDSCH 705-*b* to allow efficient downlink channel interference leakage measurement at the base station. The rate matched REs 725-*b* may be within a threshold separation in time and frequency with the message 730-*b* of PUSCH 710-*b* to allow efficient uplink channel interference leakage measurement at the UE. This example may apply to channels within a threshold separation in the frequency domain. For example, the threshold separation in the frequency domain may include a small gap or no gap (e.g., be zero).

Figure 8:
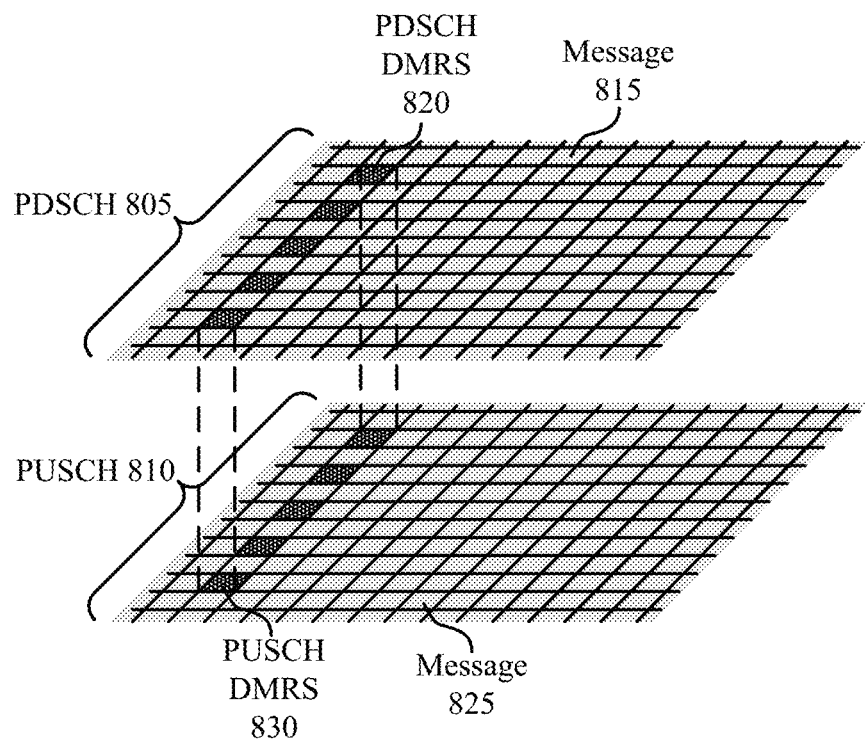
FIG. 8 illustrates an example of a channel configuration in accordance with aspects of the present disclosure.

FIG. 8 illustrates an example of a channel configuration 800 in accordance with aspects of the present disclosure. In some examples, channel configuration 800 may implement aspects of wireless communications system 100 or wireless communications system 200. Channel configuration 800 may include PDSCH 805 and PUSCH 810, which may be examples of the first channel and the second channel in FIG. 2 as well as the PDSCH and PUSCH in FIG. 3. Channel configuration 800 may apply to a full-duplex system in which PDSCH 805 and PUSCH 810 at least partially overlap in time and frequency. In some examples, one or both of a UE or a base station may communicate using full-duplexed communications in accordance with techniques described with reference to channel configuration 800.

The PDSCH 805 may include a message 815 to be transmitted from the base station to a UE. The message 815 may be associated with a DMRS 820. The message 815 may not be rate matched around rate matched REs due to the collision with PUSCH DMRS 830. The PUSCH 810 may include a message 825 to be transmitted from the UE to the base station. The message 825 may be associated with a DMRS (e.g., PUSCH DMRS 830). The message 825 may not be rate matched around rate matched REs due to the collision with PDSCH DMRS 820. In this case when PDSCH DMRS 820 and PUSCH DMRS 830 are configured to be within the same symbol and REs, the network may modify the DMRS resource allocation of one or both of the PDSCH DMRS 820 and the PUSCH DMRS 830 to avoid the collision. Example modifications are described with respect to FIGS. 9A through 9C.

Figure 9A:
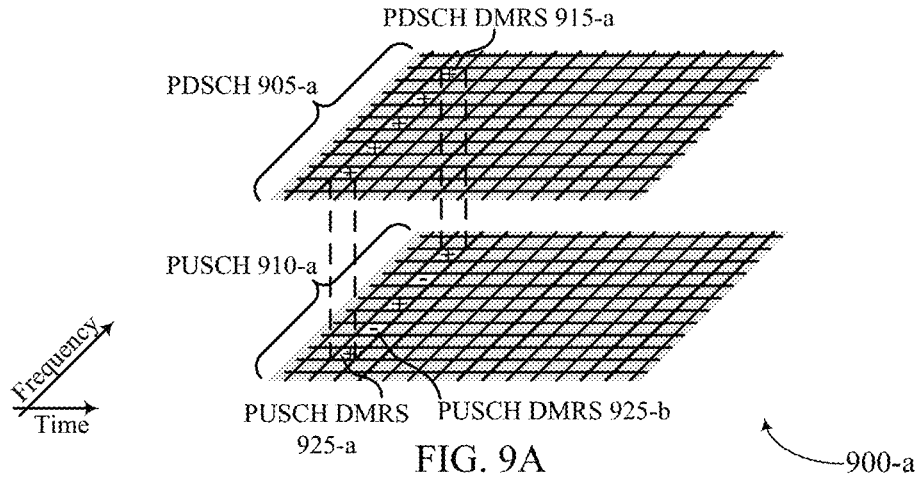
FIGS. 9A, 9B, and 9C illustrate examples of channel configurations in accordance with aspects of the present disclosure.
Figure 9B:
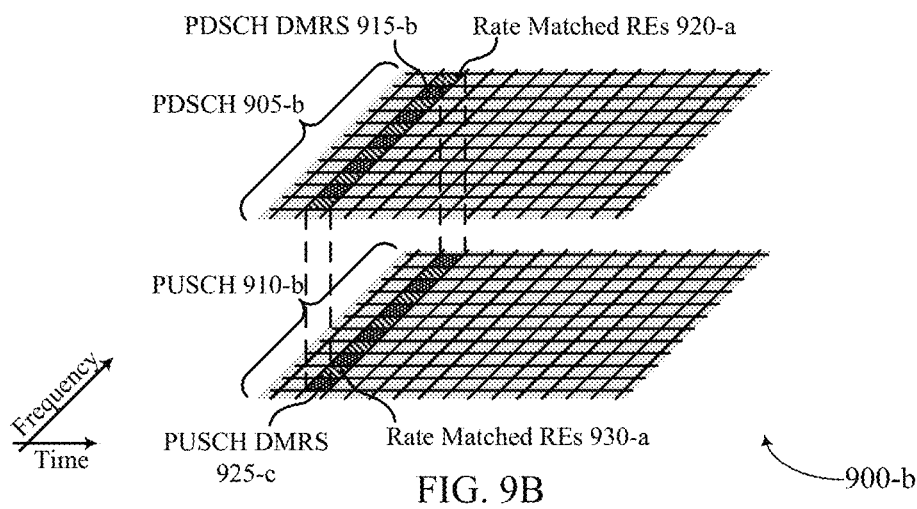
Figure 9C:
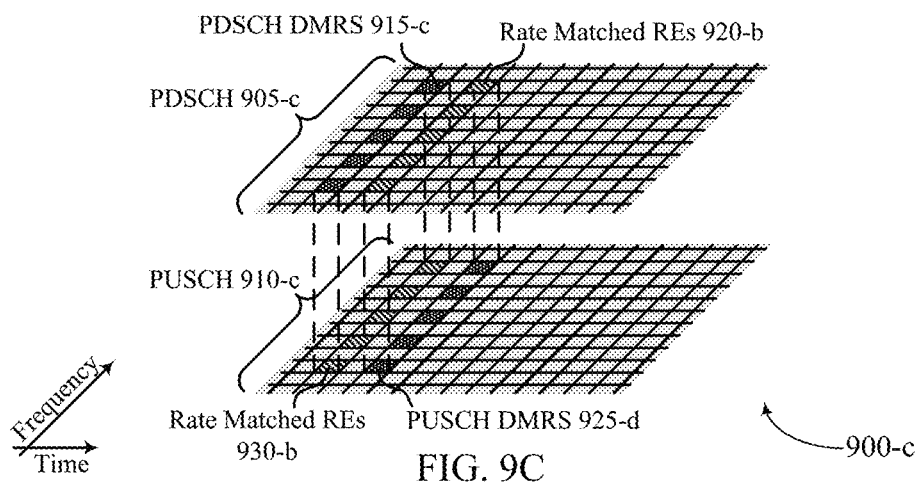

FIGS. 9A, 9B, and 9C illustrate an example of a channel configuration 900 (e.g., channel configuration 900-a, channel configuration 900-b, and channel configuration 900-c) in accordance with aspects of the present disclosure. In some examples, channel configuration 900 may implement aspects of wireless communications system 100 or wireless communications system 200. A channel configuration 900 may include PDSCH 905 and PUSCH 910, which may be examples of the first channel and the second channel in FIG. 2 as well as the PDSCH and PUSCH in FIG. 8. A channel configuration 900 may apply to a full-duplex system in which PDSCH 905 and PUSCH 910 at least partially overlap in time and frequency. In some examples, one or both of a UE or a base station may communicate using full-duplexed communications in accordance with techniques described with reference to channel configuration 900-a, 900-b, or 900-c.

In FIG. 9A, the PDSCH 905-a may include a message and DMRS (e.g., PDSCH DMRS 915-a). The message may not be rate matched around rate matched REs due to the use of the resources overlapping with PUSCH DMRS 925 for PDSCH DMRS 915-a. The PUSCH 910-a may include a message and an associated DMRS 925. The message may not be rate matched around rate matched REs due to the use of the resources overlapping with PDSCH DMRS 915-a for PUSCH DMRS 925. In this case when PDSCH DMRS 915-a and PUSCH DMRS 925 are configured to be within the same symbol and REs, the network may configure the PDSCH DMRS 915-a and PUSCH DMRS 925 to be orthogonal.

For example, PDSCH DMRS 915-a and PUSCH DMRS 925 may be allocated in overlapping resources (e.g., in the same code-division multiplexing (CDM) group) but with orthogonal cover coding (OCC) between them. For instance, the PUSCH DMRS 925 may be coded using OCC such that the PUSCH DMRS 925-a is shifted (e.g., positive shift) from the PUSCH DMRS 925-b (e.g., negative shift), making each pair of PUSCH DMRS 925-a and 925-b orthogonal to each pair of PDSCH DMRS 915-a.

In FIG. 9B, the PDSCH 905-b may include a message and DMRS (e.g., PDSCH DMRS 915-b). The message may be rate matched around rate matched REs 920-a. The PUSCH 910-b may include a message and an associated DMRS (e.g., PUSCH DMRS 925-c). The message may be rate matched around rate matched REs 930-a. In this case when PDSCH DMRS 915-b and PUSCH DMRS 925 were configured to be within the same symbol and REs, the network may adjust the frequency resource allocation of the PDSCH DMRS 915-b or the PUSCH DMRS 925-c, such that PDSCH DMRS 915-b and PUSCH DMRS 925-c are allocated in non-overlapping resources (e.g., in different CDM groups). Thus, the rate matched REs 930-a may overlap in time and frequency with the resources used for at least a portion of the PDSCH DMRS 915-b to allow efficient downlink channel estimation at the UE. The rate matched REs 920-a may overlap in time and frequency with the resources used for at least a portion of the PUSCH DMRS 925-c to allow efficient uplink channel estimation at the base station.

Figure 10:
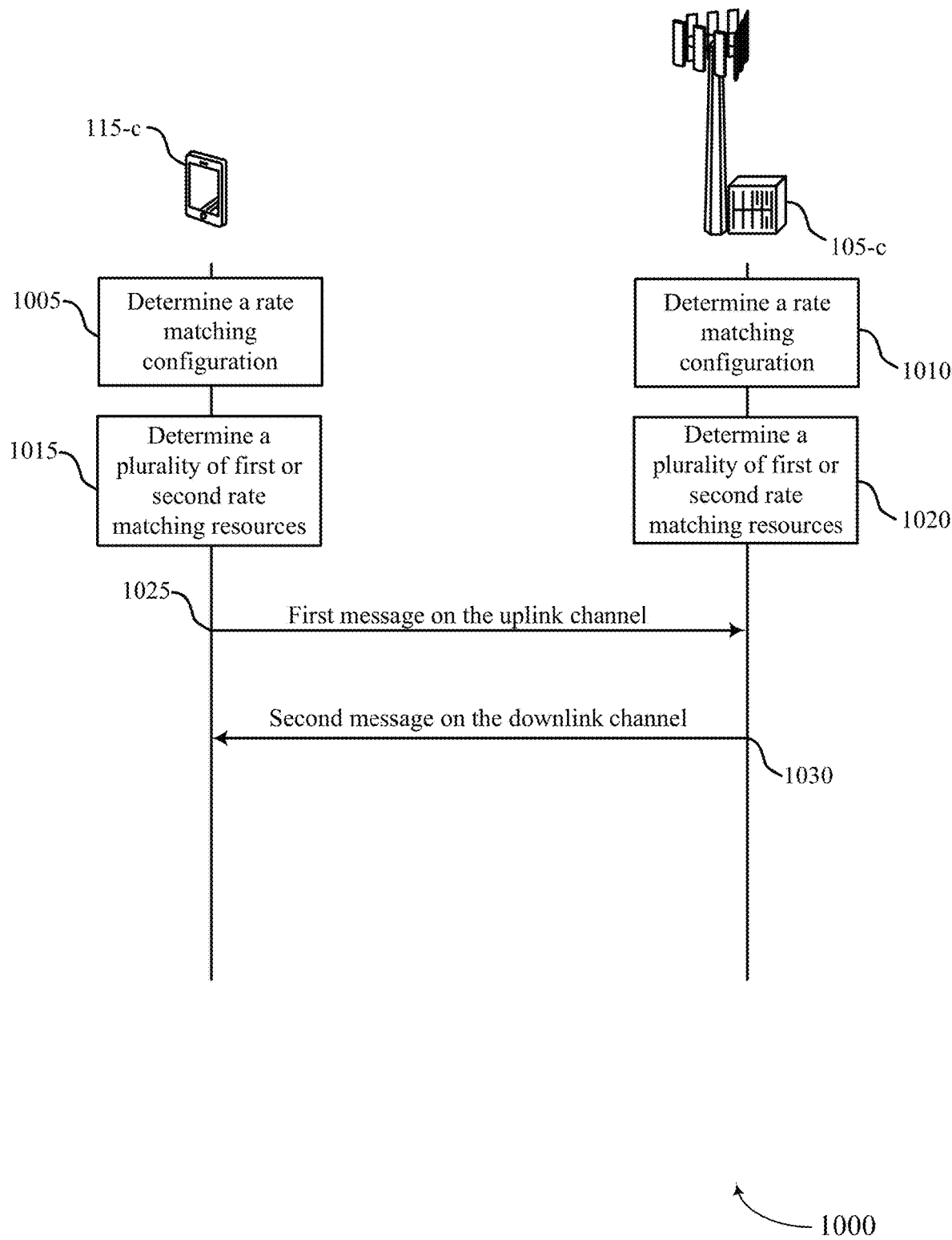
FIG. 10 illustrates an example of a process flow in a system in accordance with aspects of the present disclosure.

In FIG. 9C, the PDSCH 905-c may include a message and DMRS (e.g., PDSCH DMRS 915-c). The message may be rate matched around rate matched REs 920-b. The PUSCH 910-c may include a message and an associated DMRS (e.g., PUSCH DMRS 925-d). The message may be rate matched around rate matched REs 930-b. In this case when PDSCH DMRS 915-c and PUSCH DMRS 925-d were configured to be within the same symbol and REs, the network may adjust the time resource allocation of the PDSCH DMRS 915-c or the PUSCH DMRS 925-d, such that PDSCH DMRS 915-c and PUSCH DMRS 925-d are allocated in non-overlapping resources to avoid the collision with DMRS for the other channel. Thus, the rate matched REs 930-b may overlap in time and frequency with the resources used for at least a portion of the PDSCH DMRS 915-c to allow efficient downlink channel estimation at the UE. The rate matched REs 920-b may overlap in time and frequency with the resources used for at least a portion of the PUSCH DMRS 925-d to allow efficient uplink channel estimation at the base station FIG. 10 illustrates an example of a process flow 1000 in a system in accordance with aspects of the present disclosure. In some examples, process flow 1000 may implement aspects of wireless communications system 100 or wireless communications system 200. Process flow 1000 is shown as being implemented by a UE 115-c, which may be an example of the UEs 115 as described with respect to FIGS. 1 and 2. For example, UE 115-c may be an example of UE 115-a of FIG. 2. Process flow 1000 is also shown as being implemented by base station 105-c, which may be an example of the base stations 105 as described with respect to FIGS. 1 and 2. For example, base station 105-c may be an example of base station 105-a of FIG. 2.

In the following description of the process flow 1000, the operations of UE 115-c and base station 105-c may occur in a different order than the exemplary order shown. Some illustrated operations may also be left out of the process flow 1000, or other operations may be added to the process flow 1000. It is to be understood that while UE 115-c and base station 105-c are shown performing a number of the operations of process flow 1000, any wireless device may perform the operations shown.

At 1005, UE 115-c may determine a rate matching configuration for one or more of an uplink channel (e.g., PUCCH) or a downlink channel (e.g., PDCCH). At 1010, base station 105-c may determine a rate matching configuration for one or more of an uplink channel or a downlink channel. The uplink channel and the downlink channel may be within a threshold separation in time or frequency. In some examples, the threshold separation in time or frequency is zero. UE 115-c may be configured for full-duplex communications.

Determining the rate matching configuration may include UE 115-c receiving an indication of the rate matching configuration and determining the rate matching configuration based on the indication. In some cases, UE 115-c may receive, from base station 105-c, a DCI including the indication of the rate matching configuration, where the DCI dynamically schedules the uplink channel and the downlink channel. In other cases, UE 115-c may receive, from base station 105-c, a DCI including the indication of the rate matching configuration and one or more transmission parameters, where the DCI dynamically schedules the uplink channel or the downlink channel. In some examples, the one or more transmission parameters may be associated with the downlink channel when the DCI schedules the uplink channel. In other examples, the one or more transmission parameters may be associated with the uplink channel when the DCI schedules the downlink channel. In some examples, the indication includes a scheduling indication of whether the downlink channel overlaps with the uplink channel, a number of scheduling DCI, or a combination thereof.

In some examples, the one or more transmission parameters include an FDRA, a TDRA, antenna port information, or a combination thereof. UE 115-c may determine the plurality of first rate matching resources of the uplink channel, or the plurality of second rate matching resources of the downlink channel, or a combination thereof, for a channel bandwidth and over a plurality of antenna ports based on the rate matching configuration, where the one or more transmission parameters include the TDRA. Additionally or alternatively, UE 115-c may determine the plurality of first rate matching resources of the uplink channel, or the plurality of second rate matching resources of the downlink channel, or a combination thereof, for a channel duration and over a plurality of antenna ports based on the rate matching configuration, where the one or more transmission parameters include the FDRA.

In some examples, UE 115-c may identify a preconfigured TDRA and an FDRA of the uplink channel, or the downlink channel, or a combination thereof. UE 115-c may determine the plurality of first rate matching resources of the uplink channel, or the plurality of second rate matching resources of the downlink channel, or a combination thereof based on the preconfigured TDRA and the FDRA, where transmitting the first message on the uplink channel and receiving the second message on the downlink channel is based on the preconfigured TDRA and the FDRA. The preconfigured TDRA and the FDRA may be for configured grant transmissions when the preconfigured TDRA and the FDRA are for the uplink channel. In some cases, the preconfigured TDRA and the FDRA may be for semi-persistently scheduled transmissions when the preconfigured TDRA and the FDRA are for the downlink channel. In some examples, UE 115-c may receive, from base station 105-c, a compact DCI indicating that data is configured to be transmitted on the downlink channel. UE 115-c may receive RRC signaling including the preconfigured TDRA and the FDRA.

At 1015, UE 115-c may determine a plurality of first rate matching resources of the uplink channel, a plurality of second rate matching resources of the downlink channel, or a combination thereof, based on the rate matching configuration. At 1020, base station may determine a plurality of first rate matching resources of the uplink channel, a plurality of second rate matching resources of the downlink channel, or a combination thereof, based on the rate matching configuration. Base station 105-c may transmit, to UE 115-c, an indication of the rate matching configuration.

In some examples, the uplink channel at least partially overlaps in time and frequency with the downlink channel, and the reference signal is received on the one or more resources of the downlink channel that correspond to the plurality of first rate matching resources excluded from the uplink channel.

UE 115-c or base station 105-c may transmit a second reference signal on one or more resources of the uplink channel, where the one or more resources of the uplink channel correspond to the plurality of second rate matching resources excluded from the downlink channel. In some examples, UE 115-c or base station 105-c may transmit control information or data on one or more resources of the uplink channel, where the one or more resources of the uplink channel correspond to the plurality of second rate matching resources excluded from the downlink channel. UE 115-c may transmit, to a network, a rate matching configuration preference.

At 1025, UE 115-c may transmit, to base station 105-c, a first message on the uplink channel, where the uplink channel excludes the plurality of first rate matching resources. In some examples, base station 105-c may transmit RRC signaling including a preconfigured TDRA and an FDRA of the uplink channel, or the downlink channel, or a combination thereof, where receiving the first message on the uplink channel and transmitting the second message on the downlink channel is based on the preconfigured TDRA and the FDRA.

At 1030, UE 115-c may receive, from base station 105-c, a second message on the downlink channel, where the downlink channel excludes the plurality of second rate matching resources, and where a reference signal is received on one or more resources of the downlink channel. In some examples, one or more rate matching resources of the plurality of first rate matching resources of the uplink channel or of the plurality of second rate matching resources of the downlink channel are beyond an overlapping portion of the uplink channel and the downlink channel.

Figure 11:
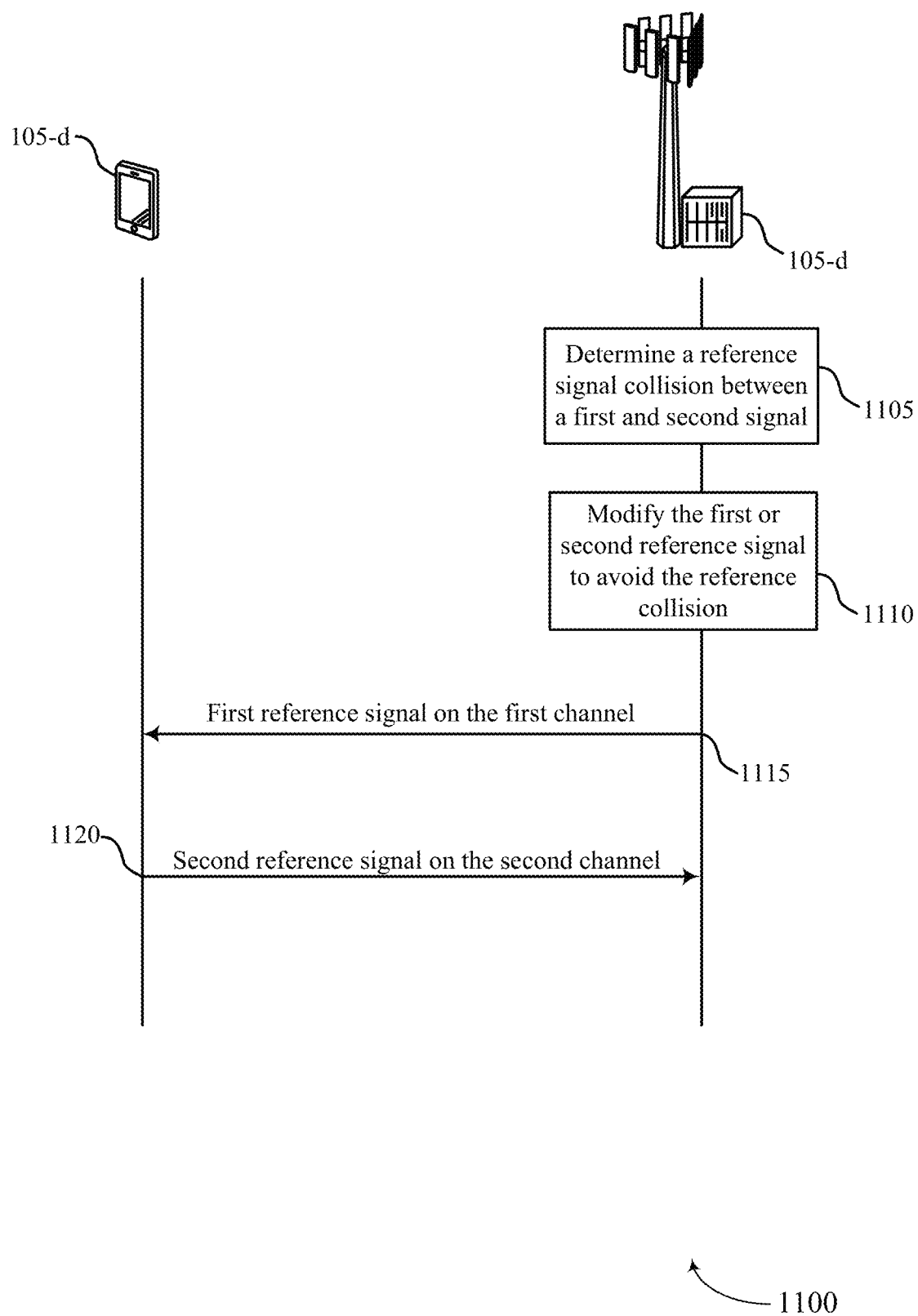
FIG. 11 illustrates an example of a process flow in a system in accordance with aspects of the present disclosure.

FIG. 11 illustrates an example of a process flow 1100 in a system in accordance with aspects of the present disclosure. In some examples, process flow 1100 may implement aspects of wireless communications system 100 or wireless communications system 200. Process flow 1100 is shown as being implemented by a UE 115-d, which may be an example of the UEs 115 as described with respect to FIGS. 1 and 2. For example, UE 115-d may be an example of UE 115-a of FIG. 2. Process flow 1100 is also shown as being implemented by base station 105-d, which may be an example of the base stations 105 as described with respect to FIGS. 1 and 2. For example, base station 105-d may be an example of base station 105-a of FIG. 2.

In the following description of the process flow 1100, the operations of UE 115-d and base station 105-d may occur in a different order than the exemplary order shown. Some illustrated operations may also be left out of the process flow 1100, or other operations may be added to the process flow 1100. It is to be understood that while UE 115-d and base station 105-d are shown performing a number of the operations of process flow 1100, any wireless device may perform the operations shown.

At 1105, base station 105-d may determine a reference signal collision between a first reference signal (e.g., DMRS) on a first channel (e.g., PDSCH, PDCCH) and a second reference signal (e.g., DMRS) on a second channel (e.g., PDSCH, PDCCH), where the first channel is at least partially overlapping in time and frequency with the second channel.

At 1110, base station 105-d may modify at least one of the first reference signal or the second reference signal to avoid the reference signal collision based on determining the reference signal collision. In some cases, base station 105-*d* may allocate the first reference signal or the second reference signal to different frequency resources or different time frequency resources. The first reference signal may be in a first code division multiplexing group and the second reference signal is in a second code division multiplexing group. In other cases, base station 105-*d* may select a first coding scheme for the first reference signal orthogonal to a second coding scheme for the second reference signal. The first reference signal and the second reference signal may be in a same code division multiplexing group.

At 1115, base station 105-*d* may transmit, to UE 115-*d*, the first reference signal on the first channel based on the modifying. At 1120, base station 105-*d* may receive, from UE 115-*d*, the second reference signal on the second channel based on the modifying.

Figure 12:
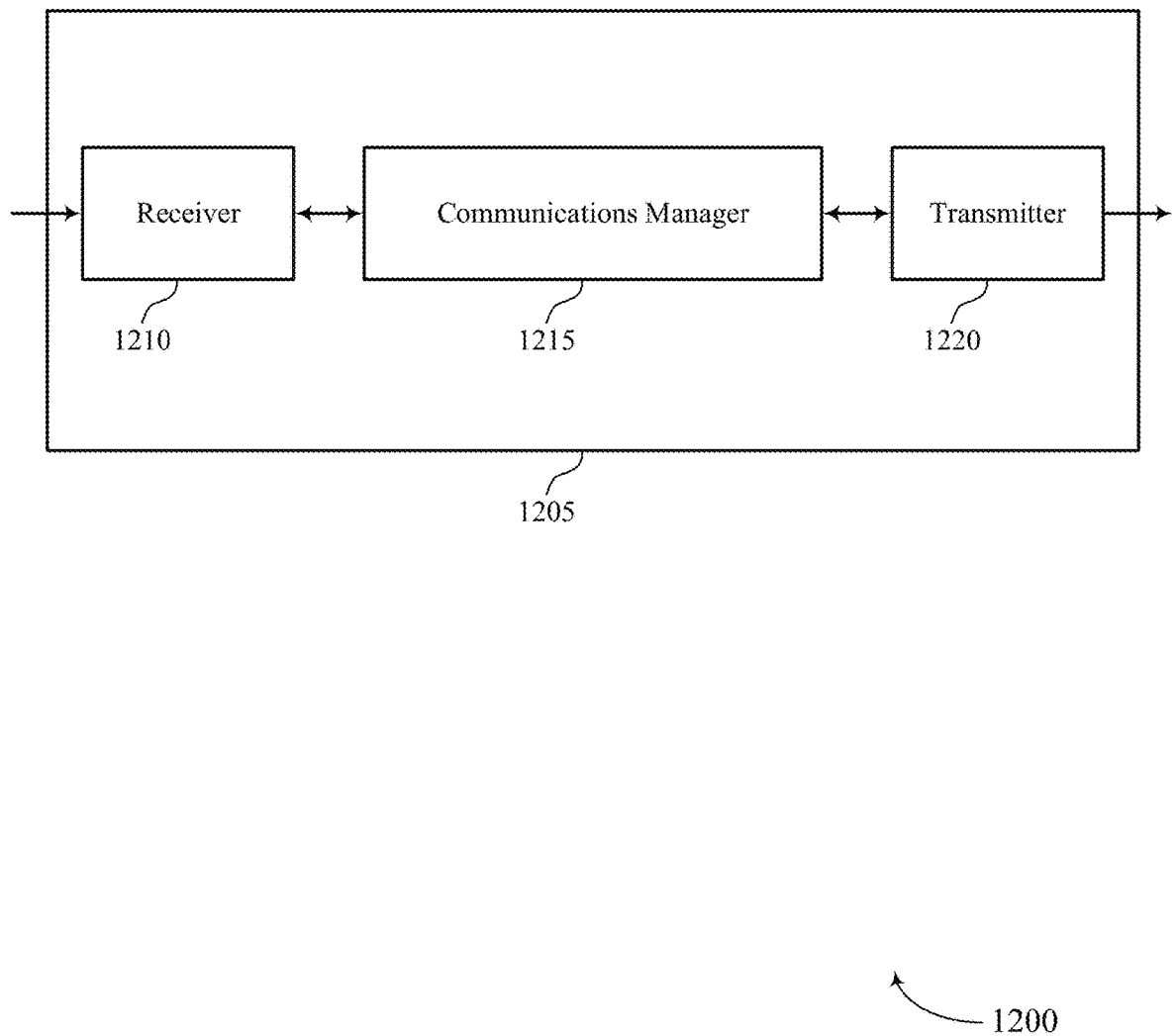
FIGS. 12 and 13 show block diagrams of devices in accordance with aspects of the present disclosure.

FIG. 12 shows a block diagram 1200 of a device 1205 in accordance with aspects of the present disclosure. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to rate matching between uplink and downlink, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may determine a rate matching configuration for one or more of an uplink channel or a downlink channel, determine a set of first rate matching resources of the uplink channel, a set of second rate matching resources of the downlink channel, or a combination thereof, based on the rate matching configuration, transmit a first message on the uplink channel, where the uplink channel excludes the set of first rate matching resources, and receive a second message on the downlink channel, where the downlink channel excludes the second set of rate matching resources, and where a reference signal is received on one or more resources of the downlink channel. The communications manager 1215 may be an example of aspects of the communications manager 1510 described herein.

The actions performed by the communications manager 1215 as described herein may be implemented to realize one or more potential advantages. One implementation may allow a UE 115 to save power and increase battery life through efficient channel estimation and interference measurements. Another implementation may provide improved quality and reliability of service at the UE 115, as latency and the number of separate resources allocated to the UE 115 may be reduced.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
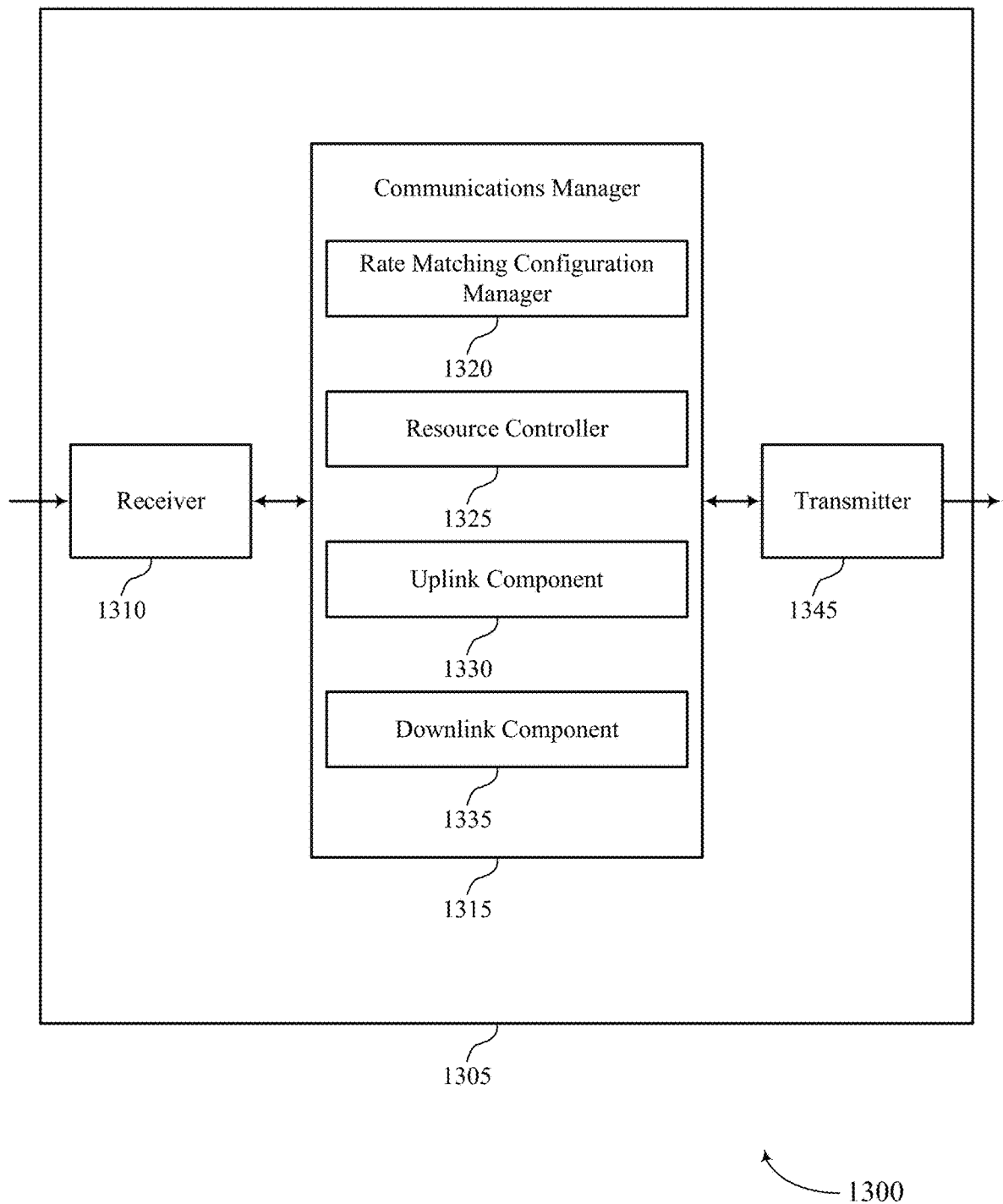

FIG. 13 shows a block diagram 1300 of a device 1305 in accordance with aspects of the present disclosure. The device 1305 may be an example of aspects of a device 1205, or a UE 115 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to rate matching between uplink and downlink, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a rate matching configuration manager 1320, a resource controller 1325, an uplink component 1330, and a downlink component 1335. The communications manager 1315 may be an example of aspects of the communications manager 1510 described herein.

The rate matching configuration manager 1320 may determine a rate matching configuration for one or more of an uplink channel or a downlink channel. The resource controller 1325 may determine a set of first rate matching resources of the uplink channel, a set of second rate matching resources of the downlink channel, or a combination thereof, based on the rate matching configuration. The uplink component 1330 may transmit a first message on the uplink channel, where the uplink channel excludes the set of first rate matching resources.

The downlink component 1335 may receive a second message on the downlink channel, where the downlink channel excludes the second set of rate matching resources, and where a reference signal is received on one or more resources of the downlink channel.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
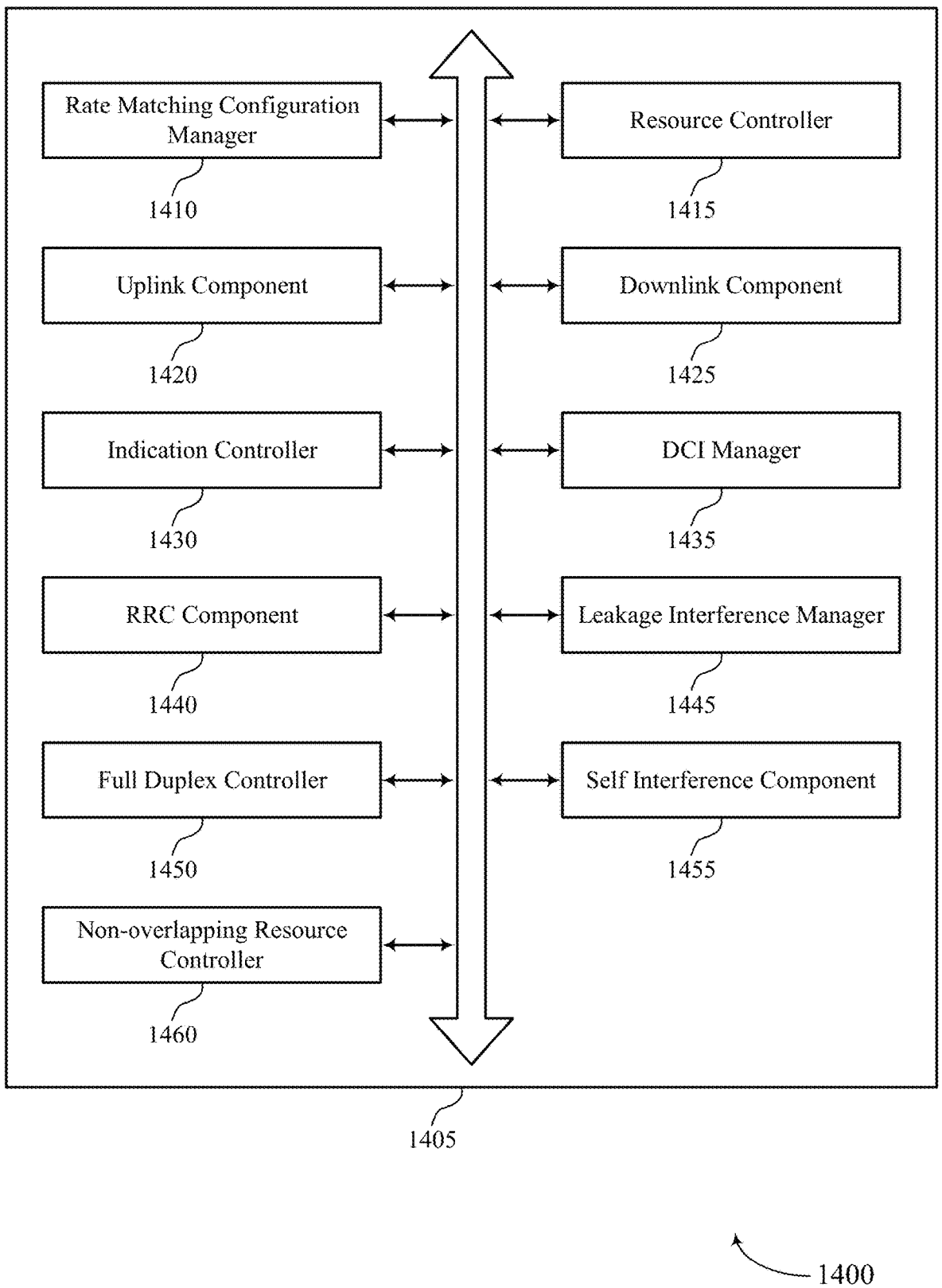
FIG. 14 shows a block diagram of a communications manager in accordance with aspects of the present disclosure.

FIG. 14 shows a block diagram 1400 of a communications manager 1405 in accordance with aspects of the present disclosure. The communications manager 1405 may be an example of aspects of a communications manager 1215, a communications manager 1315, or a communications manager 1510 described herein. The communications manager 1405 may include a rate matching configuration manager 1410, a resource controller 1415, an uplink component 1420, a downlink component 1425, an indication controller 1430, a DCI manager 1435, a RRC component 1440, a leakage interference manager 1445, a full-duplex controller 1450, a self-interference component 1455, and a non-overlapping resource controller 1460. Each of these modules may communicate, directly or indirectly, with one another (e.g., via one or more buses).

The rate matching configuration manager 1410 may determine a rate matching configuration for one or more of an uplink channel or a downlink channel. In some examples, the rate matching configuration manager 1410 may determine the rate matching configuration based on the indication.

In some examples, the rate matching configuration manager 1410 may determine the set of first rate matching resources of the uplink channel, or the set of second rate matching resources of the downlink channel, or a combination thereof, for a channel bandwidth and over a set of antenna ports based on the rate matching configuration, where the one or more transmission parameters include the TDRA.

In some examples, the rate matching configuration manager 1410 may determine the set of first rate matching resources of the uplink channel, or the set of second rate matching resources of the downlink channel, or a combination thereof, for a channel duration and over a set of antenna ports based on the rate matching configuration, where the one or more transmission parameters include the FDRA.

In some examples, the rate matching configuration manager 1410 may determine the set of first rate matching resources of the uplink channel, or the set of second rate matching resources of the downlink channel, or a combination thereof based on the preconfigured TDRA and the FDRA, where transmitting the first message on the uplink channel and receiving the second message on the downlink channel is based on the preconfigured TDRA and the FDRA.

In some examples, the rate matching configuration manager 1410 may transmit, to a network, a rate matching configuration preference. The resource controller 1415 may determine a set of first rate matching resources of the uplink channel, a set of second rate matching resources of the downlink channel, or a combination thereof, based on the rate matching configuration.

The uplink component 1420 may transmit a first message on the uplink channel, where the uplink channel excludes the set of first rate matching resources.

The downlink component 1425 may receive a second message on the downlink channel, where the downlink channel excludes the second set of rate matching resources, and where a reference signal is received on one or more resources of the downlink channel.

The indication controller 1430 may receive an indication of the rate matching configuration. The DCI manager 1435 may receive DCI including the indication of the rate matching configuration, where the DCI dynamically schedules the uplink channel and the downlink channel.

In some examples, the DCI manager 1435 may receive DCI including the indication of the rate matching configuration and one or more transmission parameters. In some cases, the DCI dynamically schedules the uplink channel or the downlink channel. Here, the one or more transmission parameters may be associated with the downlink channel when the DCI schedules the uplink channel. Additionally or alternatively, the one or more transmission parameters may be associated with the uplink channel when the DCI schedules the downlink channel.

In some examples, the DCI manager 1435 may receive a compact DCI indicating that data is configured to be received on the downlink channel based on the preconfigured TDRA and the FDRA for the downlink channel. In other examples, the compact DCI may indicate that data is configured to be transmitted on the uplink channel based on the preconfigured TDRA and the FDRA for the uplink channel. In some cases, the one or more transmission parameters include an FDRA, a TDRA, antenna port information, or a combination thereof.

In some cases, the indication includes a scheduling indication of whether the downlink channel overlaps with the uplink channel, a number of scheduling DCI, or a combination thereof.

The RRC component 1440 may identify a preconfigured TDRA and an FDRA of the uplink channel, or the downlink channel, or a combination thereof. In some examples, the RRC component 1440 may receive radio resource control signaling including the preconfigured TDRA and the FDRA.

In some cases, the preconfigured TDRA and the FDRA are for configured grant transmissions when the preconfigured TDRA and the FDRA are for the uplink channel, and where the preconfigured TDRA and the FDRA are for semi-persistently scheduled transmissions when the preconfigured TDRA and the FDRA are for the downlink channel.

The leakage interference manager 1445 may measure channel interference leaking beyond channel resources. In some cases, one or more rate matching resources of the set of first rate matching resources of the uplink channel or of the set of second rate matching resources of the downlink channel are beyond an overlapping portion of the uplink channel and the downlink channel.

The full-duplex controller 1450 may configure the UE for full duplex communications. In some cases, the uplink channel at least partially overlaps in time and frequency with the downlink channel, and where the reference signal is received on the one or more resources of the downlink channel that correspond to the set of first rate matching resources excluded from the uplink channel.

The self-interference component 1455 may transmit a second reference signal on one or more resources of the uplink channel, where the one or more resources of the uplink channel correspond to the set of second rate matching resources excluded from the downlink channel. In some examples, the self-interference component 1455 may transmit control information or data on one or more resources of the uplink channel, where the one or more resources of the uplink channel correspond to the set of second rate matching resources excluded from the downlink channel.

The non-overlapping resource controller 1460 may configure the UE for half duplex communications and the threshold separation between half duplex communications. In some cases, the uplink channel and the downlink channel are within a threshold separation in time or frequency. In some cases, the threshold separation in time or frequency is zero.

Figure 15:
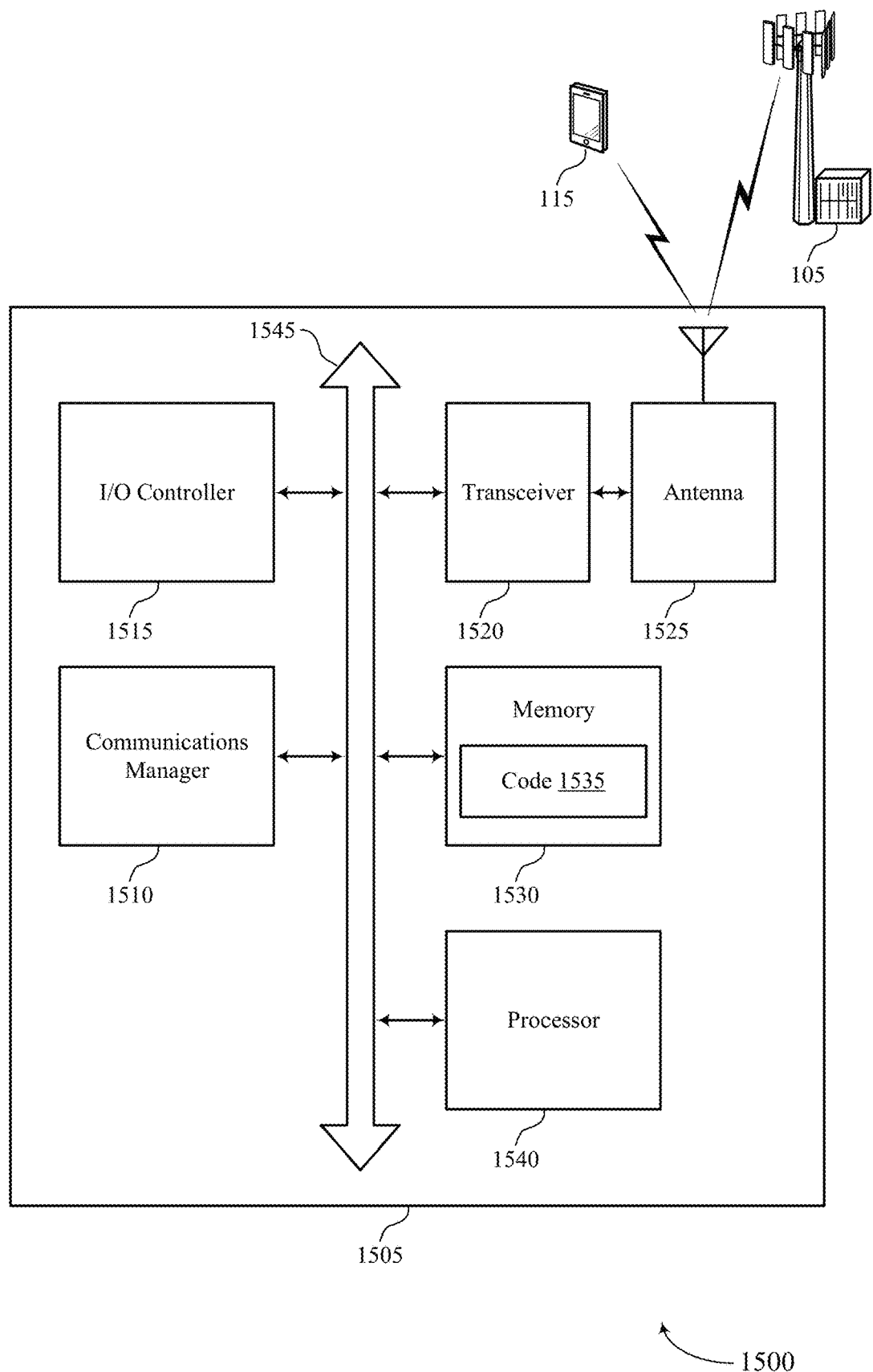
FIG. 15 shows a diagram of a system including a device in accordance with aspects of the present disclosure.

FIG. 15 shows a diagram of a system 1500 including a device 1505 in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may determine a rate matching configuration for one or more of an uplink channel or a downlink channel, determine a set of first rate matching resources of the uplink channel, a set of second rate matching resources of the downlink channel, or a combination thereof, based on the rate matching configuration, transmit a first message on the uplink channel, where the uplink channel excludes the set of first rate matching resources, and receive a second message on the downlink channel, where the downlink channel excludes the second set of rate matching resources, and where a reference signal is received on one or more resources of the downlink channel.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the wireless device may include a single antenna 1525. However, in some cases the device may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code 1535 including instructions that, when executed, cause the processor to perform various functions described herein. In some cases, the memory 1530 may contain, among other things, a basic input/output system (BIOS) which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting rate matching between uplink and downlink).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

The actions performed by the processor 1540, memory 1530, I/O controller 1515, communications manager 1510, transceiver 1520, and antenna 1525 as described herein may be implemented to realize one or more potential advantages. One implementation may allow the device 1505 to save power and increase battery life by transmitting a first message on the uplink channel, where the uplink channel excludes the plurality of first rate matching resources. Another implementation may provide improved data throughput and user experience at the device 1505 through the reduction of signaling overhead.

Figure 16:
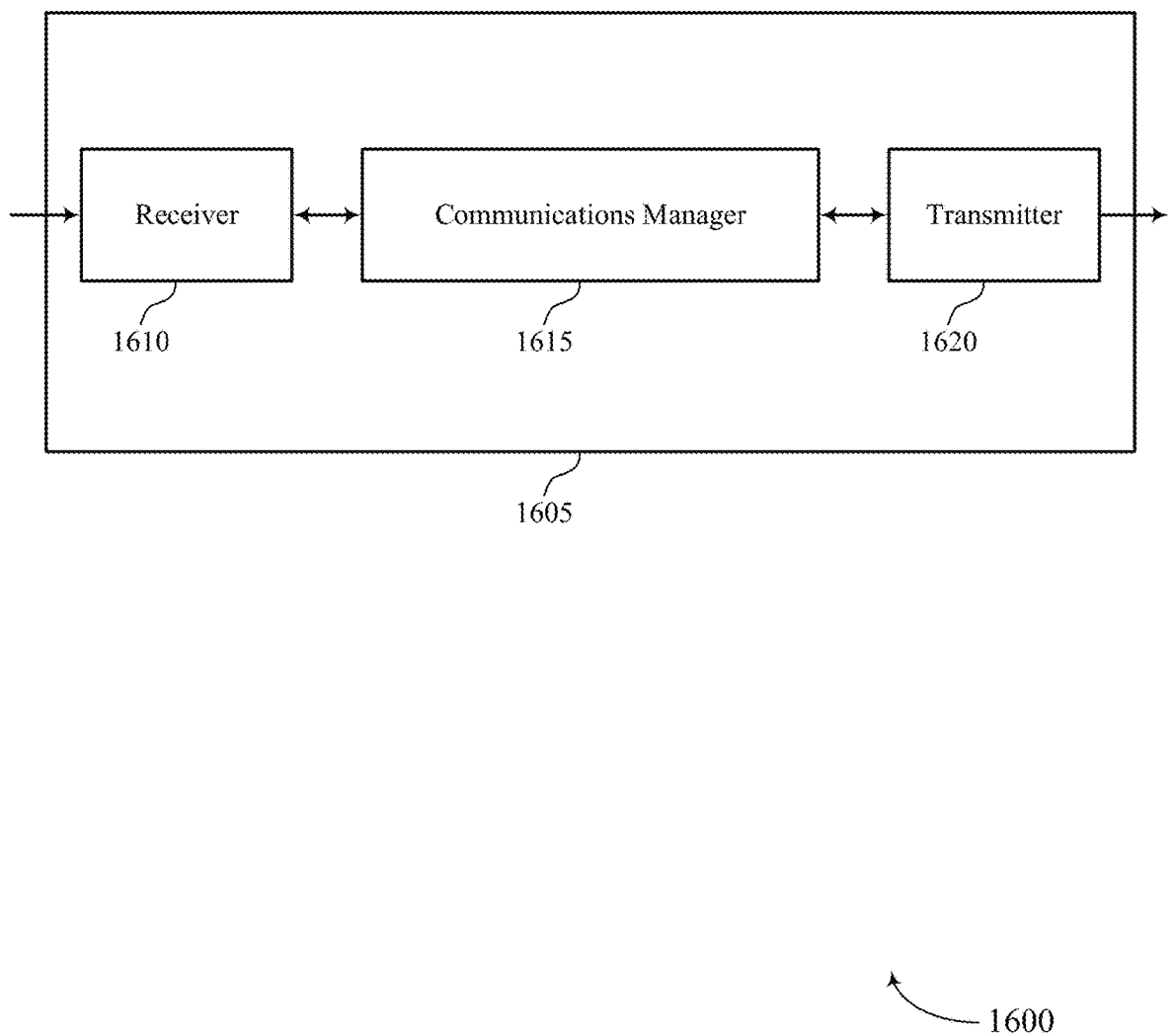
FIGS. 16 and 17 show block diagrams of devices in accordance with aspects of the present disclosure.

FIG. 16 shows a block diagram 1600 of a device 1605 in accordance with aspects of the present disclosure. The device 1605 may be an example of aspects of a UE 115 or base station 105 as described herein. The device 1605 may include a receiver 1610, a communications manager 1615, and a transmitter 1620. The device 1605 may also include a processor. Each of these components may be in communication with one another (e.g., via one or more buses).

Receiver 1610 may receive information such as packets, user data, or control information associated with various information channels (e.g., control channels, data channels, and information related to rate matching between uplink and downlink, etc.). Information may be passed on to other components of the device 1605. The receiver 1610 may be an example of aspects of the transceiver 1920 or 2020 as described with reference to FIGS. 19 and 20. The receiver 1610 may utilize a single antenna or a set of antennas.

The communications manager 1615 may determine a reference signal collision between a first reference signal on a first channel and a second reference signal on a second channel, where the first channel is at least partially overlapping in time and frequency with the second channel, modify at least one of the first reference signal or the second reference signal to avoid the reference signal collision based on determining the reference signal collision, transmit the first reference signal on the first channel based on the modifying, and receive the second reference signal on the second channel based on the modifying. The communications manager 1615 may be an example of aspects of the communications manager 1910 or 2010 as described herein.

The actions performed by the communications manager 1615 as described herein may be implemented to realize one or more potential advantages. One implementation may allow a UE 115 or a base station 105 to save power and increase battery life through efficient channel estimation and interference measurements. Another implementation may provide improved quality and reliability of service at the UE 115, as latency and the number of separate resources allocated to the UE 115 may be reduced.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 or 2020 as described with reference to FIGS. 19 and 20. The transmitter 1620 may utilize a single antenna or a set of antennas.

Figure 17:
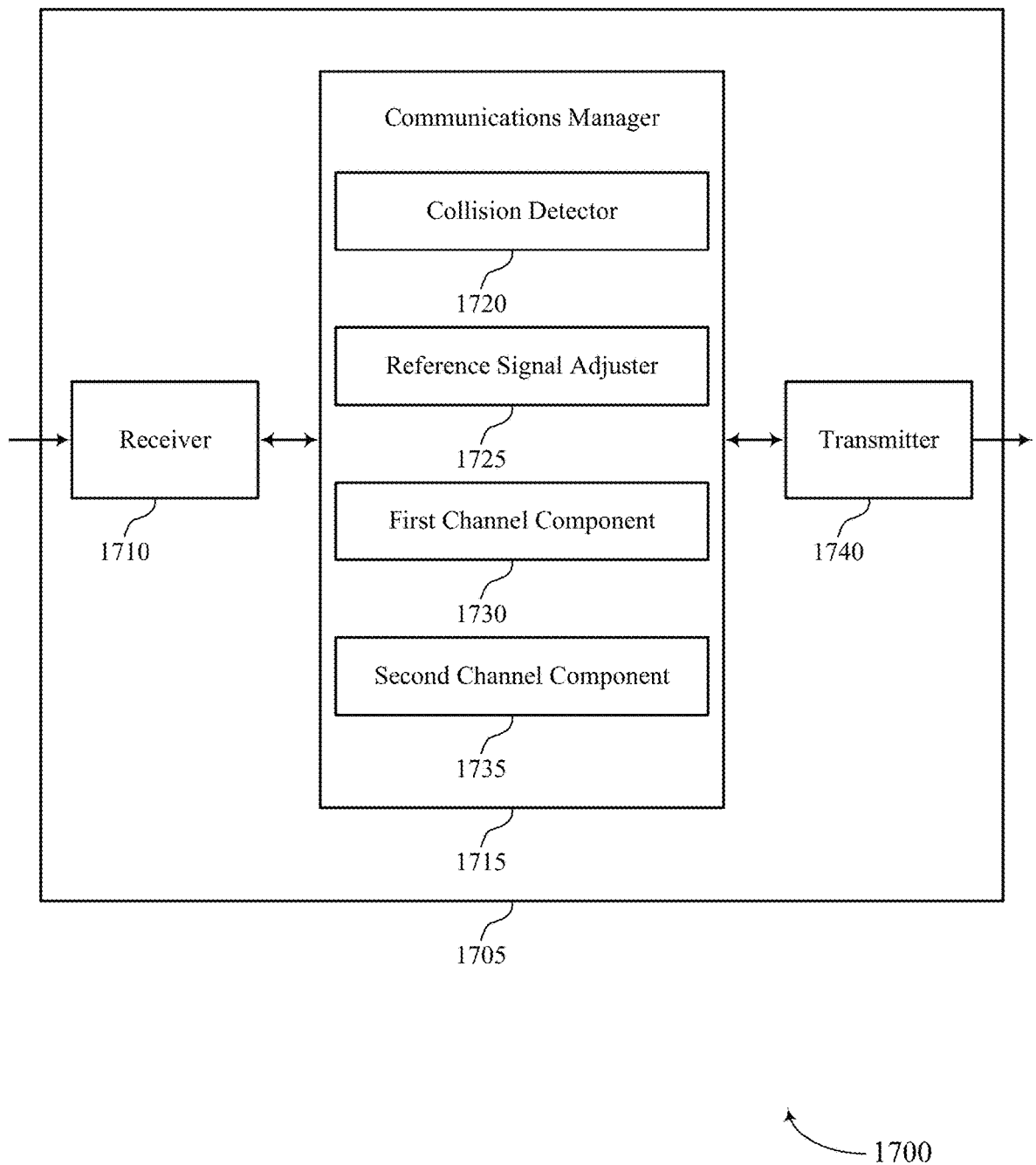

FIG. 17 shows a block diagram 1700 of a device 1705 in accordance with aspects of the present disclosure. The device 1705 may be an example of aspects of a device 1605, a UE 115, or a base station 105 as described herein. The device 1705 may include a receiver 1710, a communications manager 1715, and a transmitter 1740. The device 1705 may also include a processor. Each of these components may be in communication with one another (e.g., via one or more buses).

Receiver 1710 may receive information such as packets, user data, or control information associated with various information channels (e.g., control channels, data channels, and information related to rate matching between uplink and downlink, etc.). Information may be passed on to other components of the device 1705. The receiver 1710 may be an example of aspects of the transceiver 1920 or 2020 as described with reference to FIGS. 19 and 20. The receiver 1710 may utilize a single antenna or a set of antennas.

The communications manager 1715 may be an example of aspects of the communications manager 1615 as described herein. The communications manager 1715 may include a collision detector 1720, a reference signal adjuster 1725, a first channel component 1730, and a second channel component 1735. The communications manager 1715 may be an example of the communications manager 1910 or 2010 as described herein.

The collision detector 1720 may determine a reference signal collision between a first reference signal on a first channel and a second reference signal on a second channel, where the first channel is at least partially overlapping in time and frequency with the second channel.

The reference signal adjuster 1725 may modify at least one of the first reference signal or the second reference signal to avoid the reference signal collision based on determining the reference signal collision.

The first channel component 1730 may transmit the first reference signal on the first channel based on the modifying.

The second channel component 1735 may receive the second reference signal on the second channel based on the modifying.

Transmitter 1740 may transmit signals generated by other components of the device 1705. In some examples, the transmitter 1740 may be collocated with a receiver 1710 in a transceiver module. For example, the transmitter 1740 may be an example of aspects of the transceiver 1920 or 2020 as described with reference to FIGS. 19 and 20. The transmitter 1740 may utilize a single antenna or a set of antennas.

Figure 18:
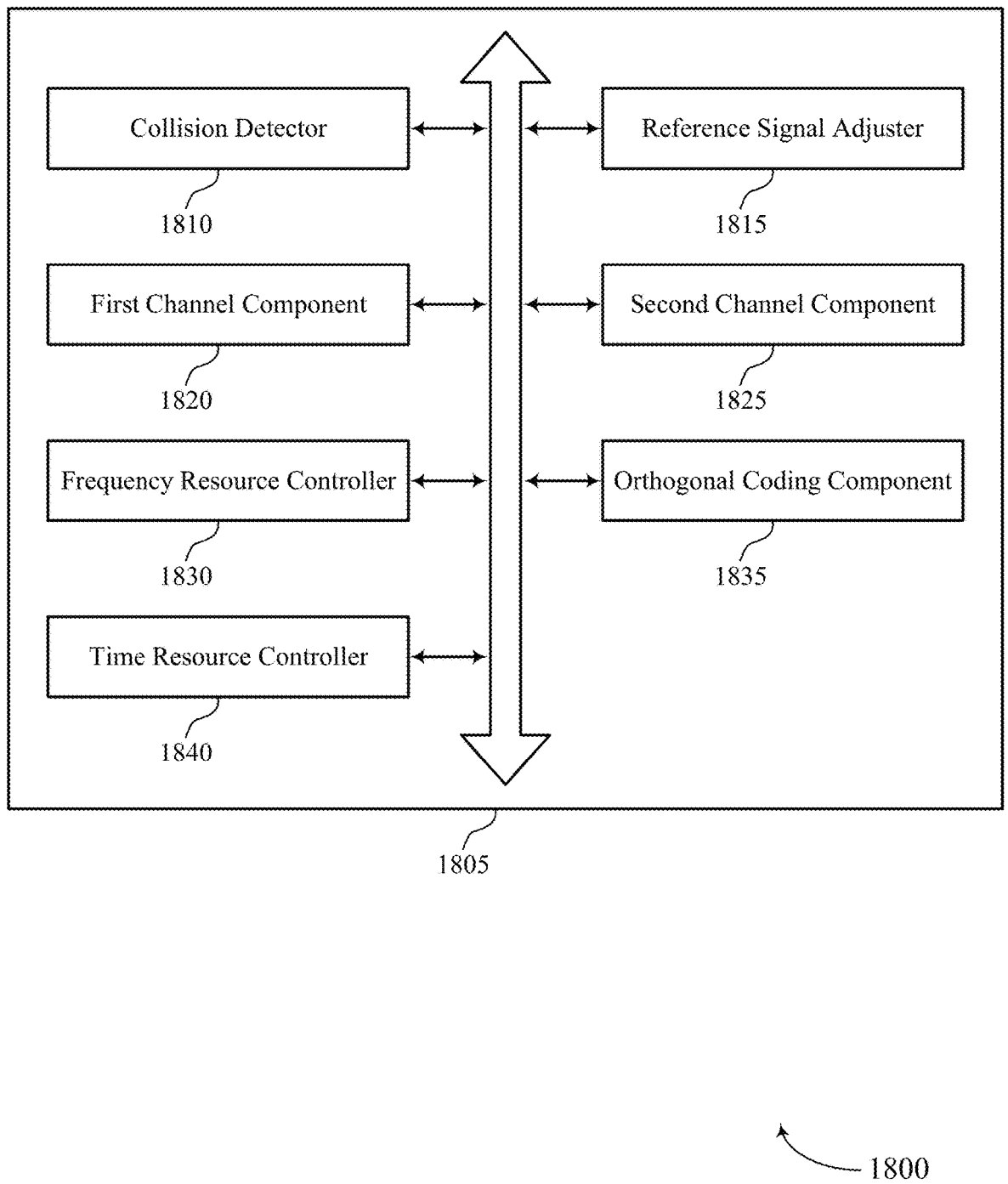
FIG. 18 shows a block diagram of a communications manager in accordance with aspects of the present disclosure.

FIG. 18 shows a block diagram 1800 of a communications manager 1805 in accordance with aspects of the present disclosure. The communications manager 1805 may be an example of aspects of a communications manager 1615, a communications manager 1715, or a communications manager 1910 described herein. The communications manager 1805 may include a collision detector 1810, a reference signal adjuster 1815, a first channel component 1820, a second channel component 1825, a frequency resource adjuster 1830, an orthogonal coding component 1835, and a time resource adjuster 1840. Each of these modules may communicate, directly or indirectly, with one another (e.g., via one or more buses).

The collision detector 1810 may determine a reference signal collision between a first reference signal on a first channel and a second reference signal on a second channel, where the first channel is at least partially overlapping in time and frequency with the second channel.

The reference signal adjuster 1815 may modify at least one of the first reference signal or the second reference signal to avoid the reference signal collision based on determining the reference signal collision.

The first channel component 1820 may transmit the first reference signal on the first channel based on the modifying. The second channel component 1825 may receive the second reference signal on the second channel based on the modifying.

The frequency resource adjuster 1830 may allocate the first reference signal or the second reference signal to different frequency resources. In some cases, the first reference signal is in a first code division multiplexing group and the second reference signal is in a second code division multiplexing group.

The orthogonal coding component 1835 may select a first coding scheme for the first reference signal orthogonal to a second coding scheme for the second reference signal. In some cases, the first reference signal and the second reference signal are in a same code division multiplexing group.

The time resource adjuster 1840 may allocate the first reference signal or the second reference signal to different time resources.

Figure 19:
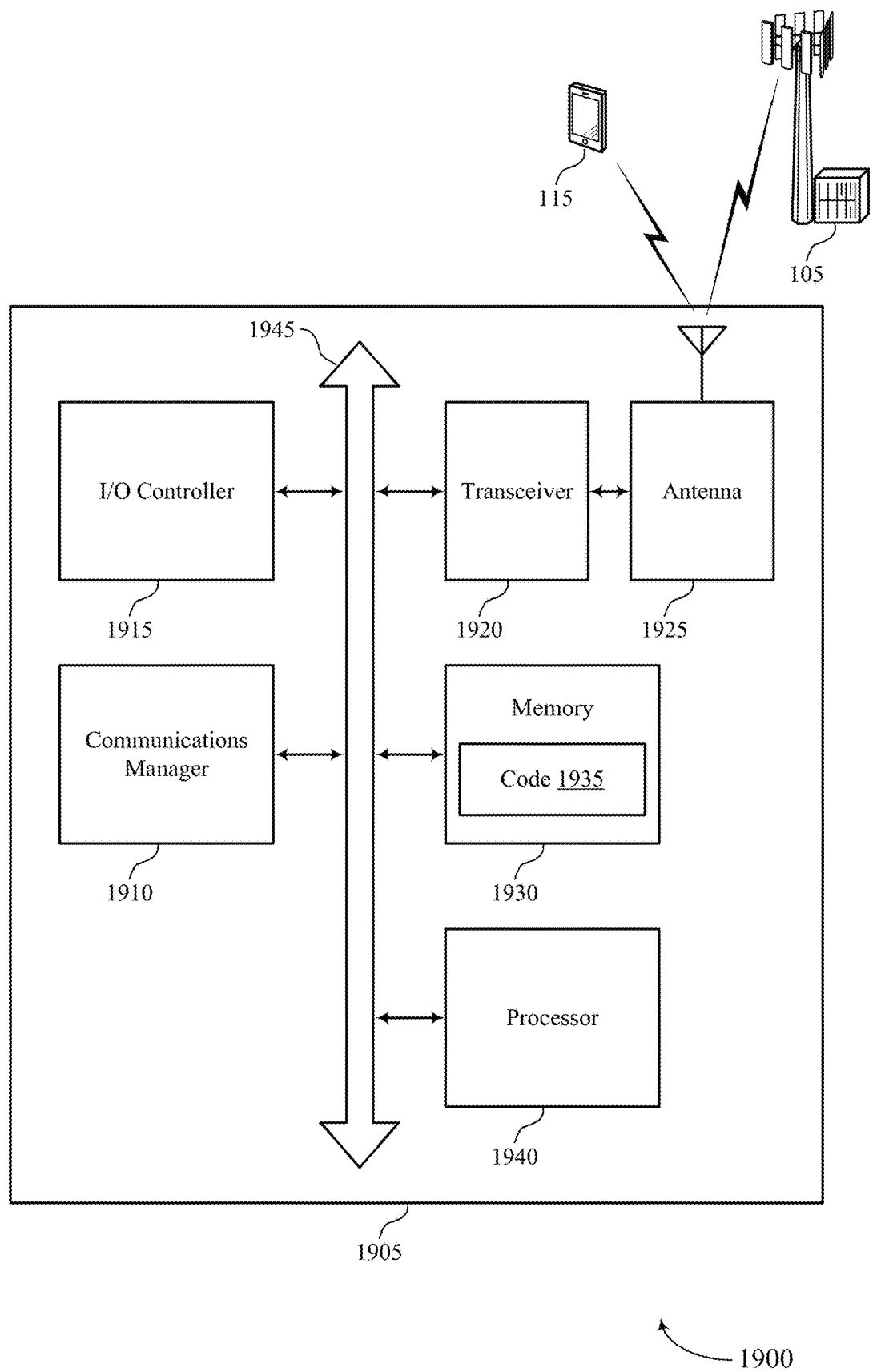
FIG. 19 shows a diagram of a system including a user equipment (UE) in accordance with aspects of the present disclosure.

FIG. 19 shows a diagram of a system 1900 including a device 1905 in accordance with aspects of the present disclosure. The device 1905 may be an example of or include the components of device 1605, device 1705, or a UE 115 as described herein. The device 1905 may include components for bi-directional voice and data communications including components for transmitting and receiving communications, including a communications manager 1910, a transceiver 1920, an antenna 1925, memory 1930, a processor 1940, and an I/O controller 1915. These components may be in electronic communication via one or more buses (e.g., bus 1945).

The communications manager 1910 may determine a reference signal collision between a first reference signal on a first channel and a second reference signal on a second channel, where the first channel is at least partially overlapping in time and frequency with the second channel, modify at least one of the first reference signal or the second reference signal to avoid the reference signal collision based on determining the reference signal collision, transmit the first reference signal on the first channel based on the modifying, and receive the second reference signal on the second channel based on the modifying.

Transceiver 1920 may communicate bi-directionally, via one or more antennas, wired, or wireless links as described herein. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas. In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting rate matching between uplink and downlink).

The I/O controller 1915 may manage input and output signals for the device 1905. The I/O controller 1915 may also manage peripherals not integrated into the device 1905. In some cases, the I/O controller 1915 may represent a physical connection or port to an external peripheral. In some cases, the I/O controller 1915 may utilize an operating system such as iOS®, ANDROID®, MS-DOS®, MS-WINDOWS®, OS/2®, UNIX®, LINUX®, or another known operating system. In other cases, the I/O controller 1915 may represent or interact with a modem, a keyboard, a mouse, a touchscreen, or a similar device. In some cases, the I/O controller 1915 may be implemented as part of a processor. In some cases, a user may interact with the device 1905 via the I/O controller 1915 or via hardware components controlled by the I/O controller 1915.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

The actions performed by the processor 1940, memory 1930, I/O controller 1915, communications manager 1910, transceiver 1920, and antenna 1925 as described herein may be implemented to realize one or more potential advantages. One implementation may allow the device 1905 to save power and increase battery life by determining a reference signal collision between a first reference signal on a first channel and a second reference signal on a second channel, where the first channel is at least partially overlapping in time and frequency with the second channel, and modifying at least one of the first reference signal or the second reference signal to avoid the reference signal collision based on determining the reference signal collision. Another implementation may provide improved data throughput and user experience at the device 1905 through the reduction of signaling overhead.

Figure 20:
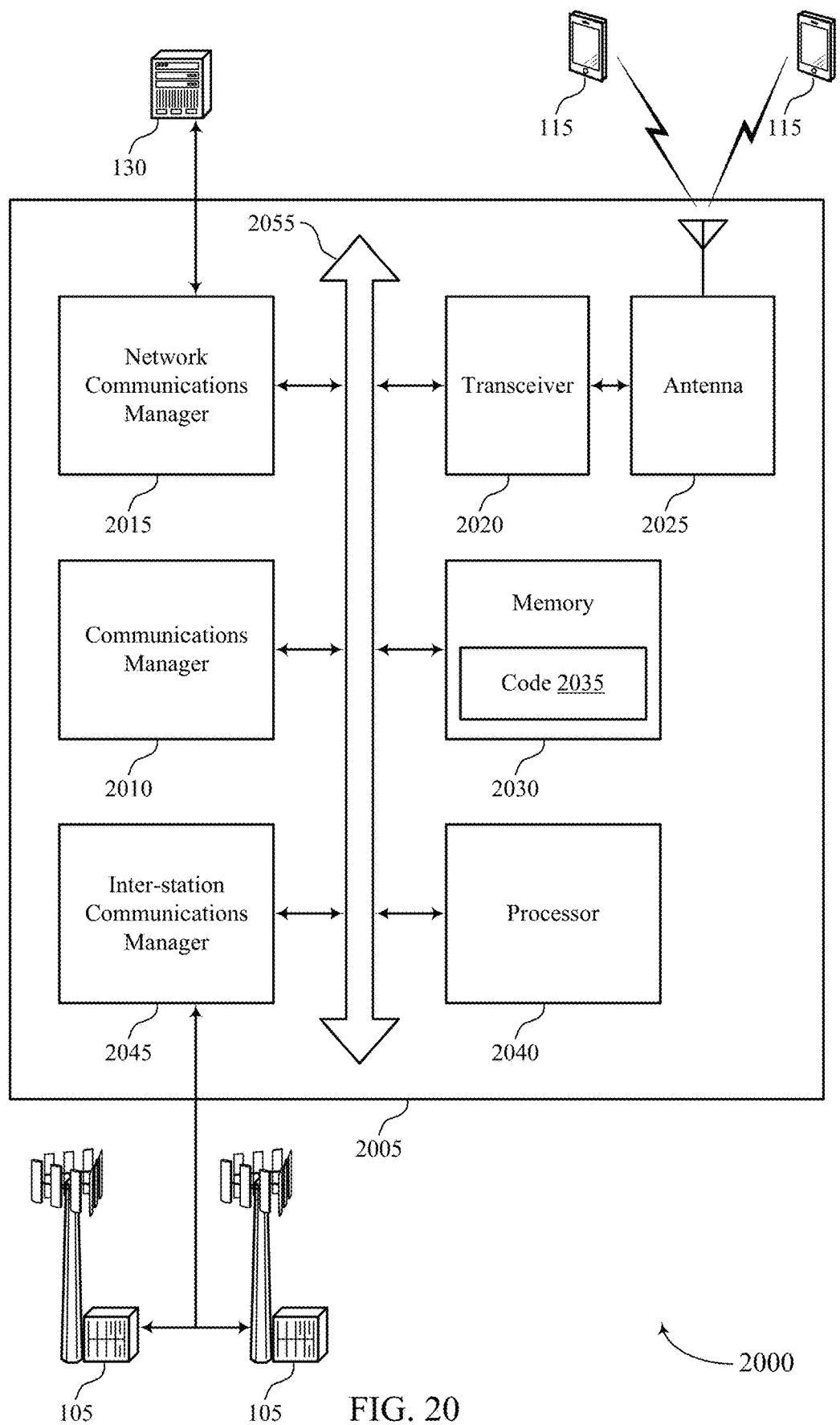
FIG. 20 shows a diagram of a system including a base station in accordance with aspects of the present disclosure.

FIG. 20 shows a diagram of a system 2000 including a device 2005 in accordance with aspects of the present disclosure. The device 2005 may be an example of or include the components of device 1605, device 1705, or a base station 105 as described herein. The device 2005 may include components for bi-directional voice and data communications including components for transmitting and receiving communications, including a communications manager 2010, a network communications manager 2050, a transceiver 2020, an antenna 2025, memory 2030, a processor 2040, and an inter-station communications manager 2055. These components may be in electronic communication via one or more buses (e.g., bus 2045).

The communications manager 2010 may determine a reference signal collision between a first reference signal on a first channel and a second reference signal on a second channel, where the first channel is at least partially overlapping in time and frequency with the second channel, modify at least one of the first reference signal or the second reference signal to avoid the reference signal collision based on determining the reference signal collision, transmit the first reference signal on the first channel based on the modifying, and receive the second reference signal on the second channel based on the modifying.

Network communications manager 2050 may manage communications with the core network (e.g., via one or more wired backhaul links). For example, the network communications manager 2050 may manage the transfer of data communications for client devices, such as one or more UEs 115.

Transceiver 2020 may communicate bi-directionally, via one or more antennas, wired, or wireless links as described herein. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some cases, the wireless device may include a single antenna 2025. However, in some cases the device may have more than one antenna 2025, which may be capable of concurrently transmitting or receiving multiple wireless transmissions.

The memory 2030 may include RAM, ROM, or a combination thereof. The memory 2030 may store computer-readable code 2035 including instructions that, when executed by a processor (e.g., the processor 2040) cause the device to perform various functions described herein. In some cases, the memory 2030 may contain, among other things, a BIOS which may control basic hardware or software operation such as the interaction with peripheral components or devices.

The processor 2040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In other cases, a memory controller may be integrated into the processor 2040. The processor 2040 may be configured to execute computer-readable instructions stored in a memory (e.g., the memory 2030) to cause the device 2005 to perform various functions (e.g., functions or tasks supporting rate matching between uplink and downlink).

Inter-station communications manager 2055 may manage communications with other base station 105, and may include a controller or scheduler for controlling communications with UEs 115 in cooperation with other base stations 105. For example, the inter-station communications manager 2055 may coordinate scheduling for transmissions to UEs 115 for various interference mitigation techniques such as beamforming or joint transmission. In some examples, inter-station communications manager 2055 may provide an X2 interface within an LTE/LTE-A wireless communication network technology to provide communication between base stations 105.

The code 2035 may include instructions to implement aspects of the present disclosure, including instructions to support wireless communications. The code 2035 may be stored in a non-transitory computer-readable medium such as system memory or other type of memory. In some cases, the code 2035 may not be directly executable by the processor 2040 but may cause a computer (e.g., when compiled and executed) to perform functions described herein.

Figure 21:
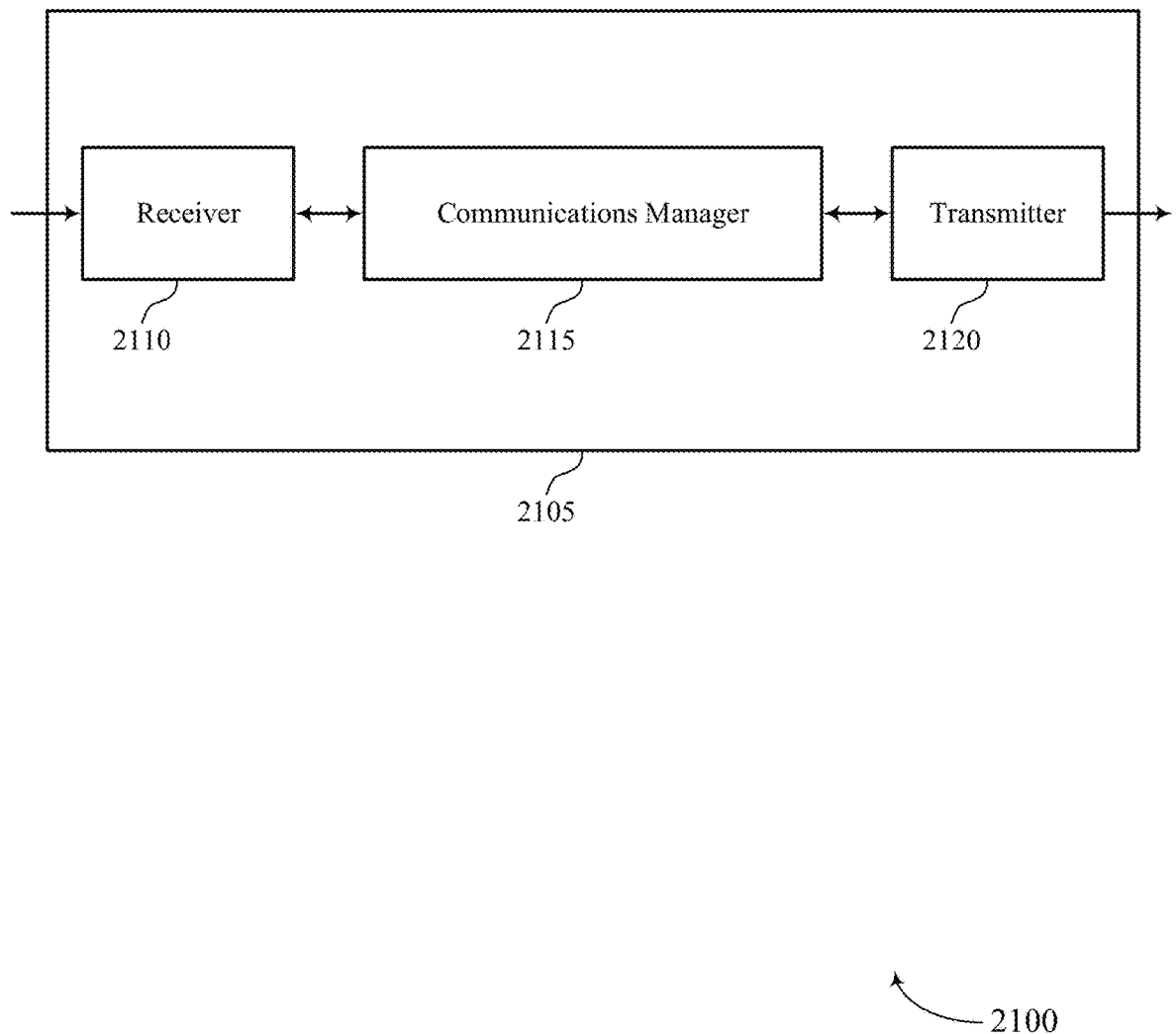
FIGS. 21 and 22 show block diagrams of devices in accordance with aspects of the present disclosure.

FIG. 21 shows a block diagram 2100 of a device 2105 in accordance with aspects of the present disclosure. The device 2105 may be an example of aspects of a base station 105 as described herein. The device 2105 may include a receiver 2110, a communications manager 2115, and a transmitter 2120. The device 2105 may also include a processor. Each of these components may be in communication with one another (e.g., via one or more buses).

The receiver 2110 may receive information such as packets, user data, or control information associated with various information channels (e.g., control channels, data channels, and information related to rate matching between uplink and downlink, etc.). Information may be passed on to other components of the device 2105. The receiver 2110 may be an example of aspects of the transceiver 2420 described with reference to FIG. 24. The receiver 2110 may utilize a single antenna or a set of antennas.

The communications manager 2115 may determine a rate matching configuration for one or more of an uplink channel or a downlink channel, determine a set of first rate matching resources of the uplink channel, a set of second rate matching resources of the downlink channel, or a combination thereof, based on the rate matching configuration, receive a first message on the uplink channel, where the uplink channel excludes the set of first rate matching resources, and transmit a second message on the downlink channel, where the downlink channel excludes the second set of rate matching resources, and where a reference signal is transmitted on one or more resources of the downlink channel. The communications manager 2115 may be an example of aspects of the communications manager 2410 described herein.

The actions performed by the communications manager 2115 as described herein may be implemented to realize one or more potential advantages. One implementation may allow a base station 105 to perform efficient channel estimation and interference measurements. Another implementation may provide improved quality and reliability of service at a UE 115, as latency and the number of separate resources allocated to the UE 115 may be reduced based on the channel estimation and interference measurements.

The communications manager 2115, or its sub-components, may be implemented in hardware, code (e.g., software or firmware) executed by a processor, or any combination thereof. If implemented in code executed by a processor, the functions of the communications manager 2115, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 2115, or its sub-components, may be physically located at various positions, including being distributed such that portions of functions are implemented at different physical locations by one or more physical components. In some examples, the communications manager 2115, or its sub-components, may be a separate and distinct component in accordance with various aspects of the present disclosure. In some examples, the communications manager 2115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2120 may transmit signals generated by other components of the device 2105. In some examples, the transmitter 2120 may be collocated with a receiver 2110 in a transceiver module. For example, the transmitter 2120 may be an example of aspects of the transceiver 2420 described with reference to FIG. 24. The transmitter 2120 may utilize a single antenna or a set of antennas.

Figure 22:
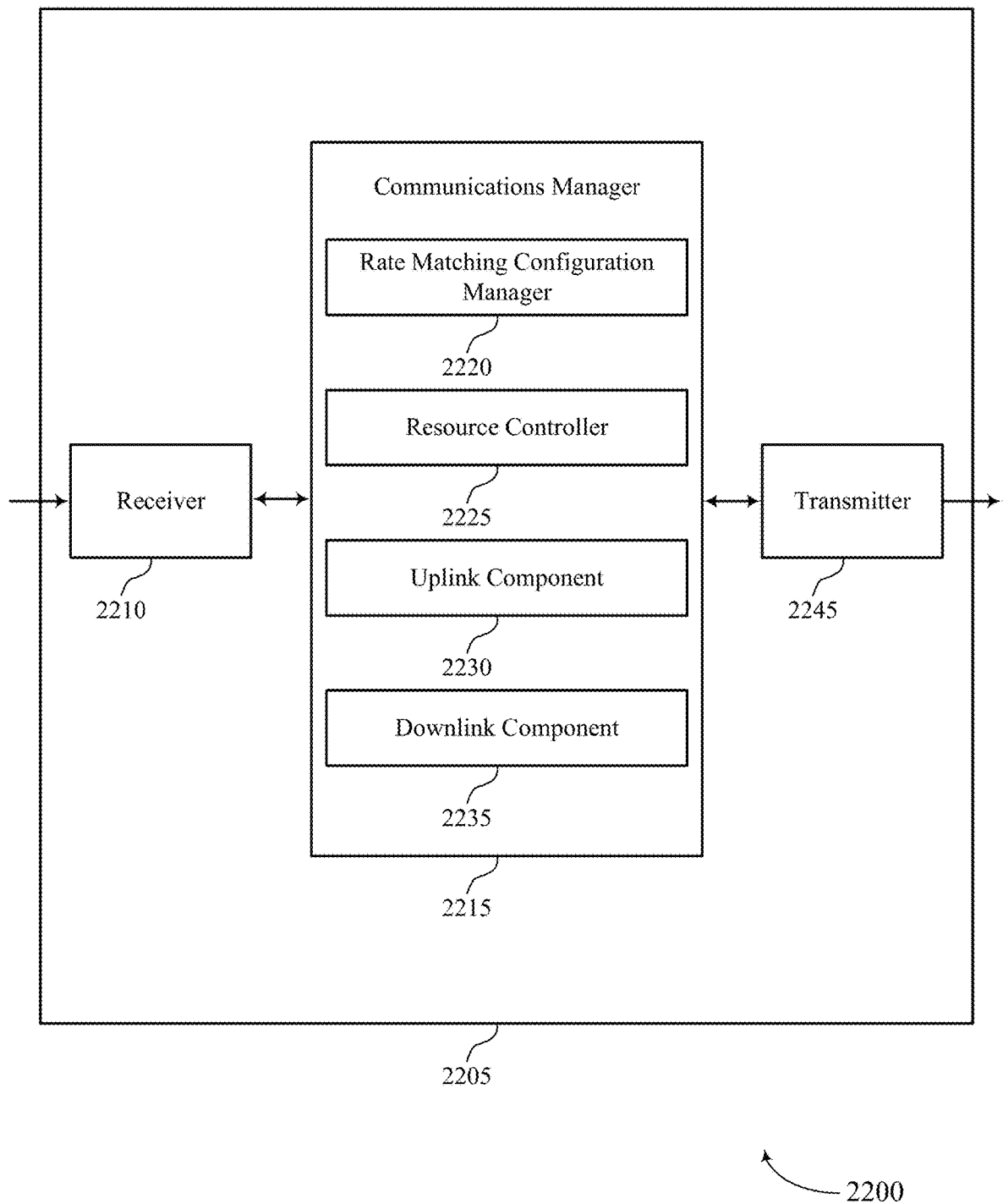

FIG. 22 shows a block diagram 2200 of a device 2205 in accordance with aspects of the present disclosure. The device 2205 may be an example of aspects of a device 2105, or a base station 105 as described herein. The device 2205 may include a receiver 2210, a communications manager 2215, and a transmitter 2240. The device 2205 may also include a processor. Each of these components may be in communication with one another (e.g., via one or more buses).

The receiver 2210 may receive information such as packets, user data, or control information associated with various information channels (e.g., control channels, data channels, and information related to rate matching between uplink and downlink, etc.). Information may be passed on to other components of the device 2205. The receiver 2210 may be an example of aspects of the transceiver 2420 described with reference to FIG. 24. The receiver 2210 may utilize a single antenna or a set of antennas.

The communications manager 2215 may be an example of aspects of the communications manager 2115 as described herein. The communications manager 2215 may include a rate matching configuration manager 2220, a resource controller 2225, an uplink component 2230, and a downlink component 2235. The communications manager 2215 may be an example of aspects of the communications manager 2410 described herein.

The rate matching configuration manager 2220 may determine a rate matching configuration for one or more of an uplink channel or a downlink channel.

The resource controller 2225 may determine a set of first rate matching resources of the uplink channel, a set of second rate matching resources of the downlink channel, or a combination thereof, based on the rate matching configuration. The uplink component 2230 may receive a first message on the uplink channel, where the uplink channel excludes the set of first rate matching resources.

The downlink component 2235 may transmit a second message on the downlink channel, where the downlink channel excludes the second set of rate matching resources, and where a reference signal is transmitted on one or more resources of the downlink channel.

The transmitter 2240 may transmit signals generated by other components of the device 2205. In some examples, the transmitter 2240 may be collocated with a receiver 2210 in a transceiver module. For example, the transmitter 2240 may be an example of aspects of the transceiver 2420 described with reference to FIG. 24. The transmitter 2240 may utilize a single antenna or a set of antennas.

Figure 23:
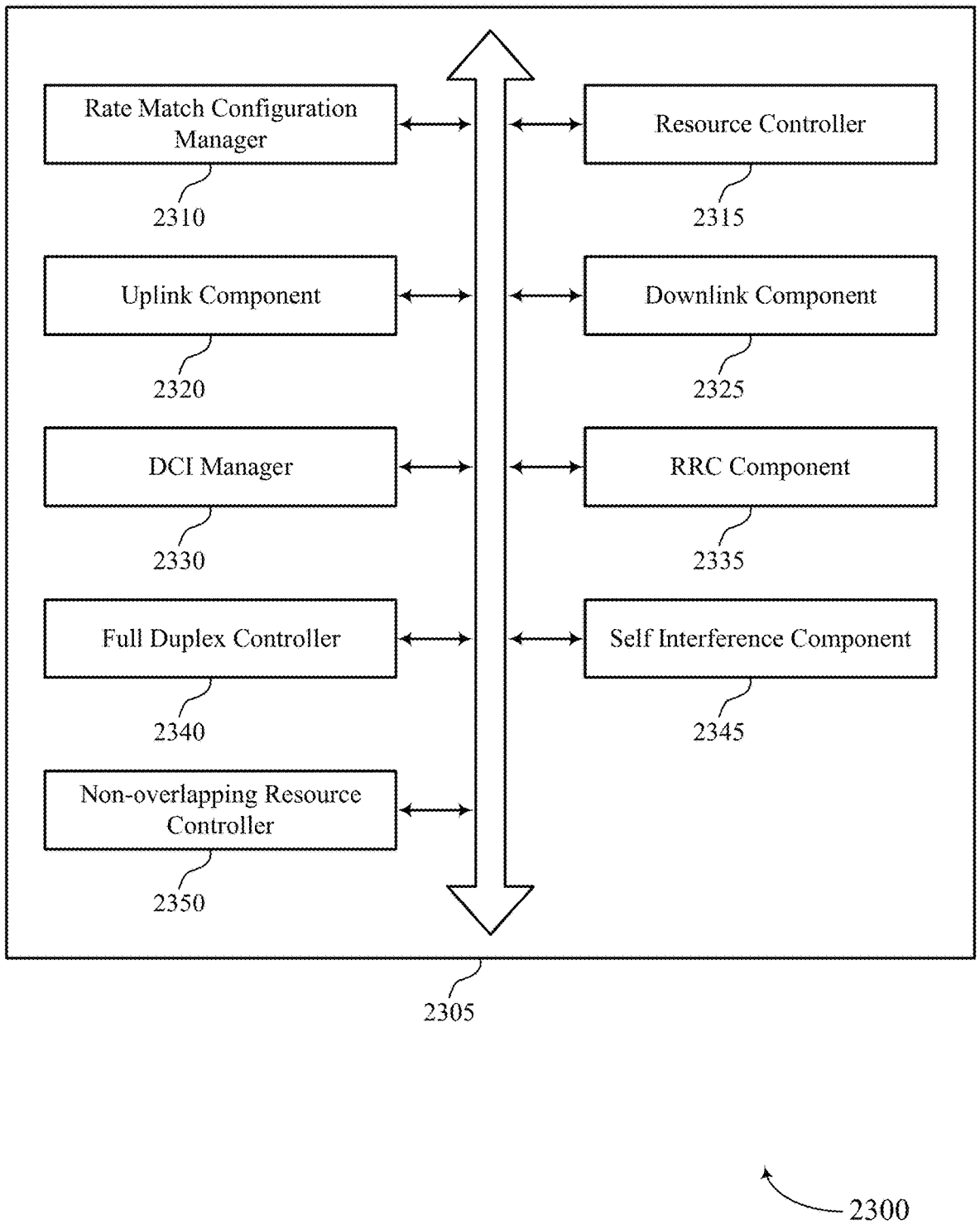
FIG. 23 shows a block diagram of a communications manager in accordance with aspects of the present disclosure.

FIG. 23 shows a block diagram 2300 of a communications manager 2305 in accordance with aspects of the present disclosure. The communications manager 2305 may be an example of aspects of a communications manager 2115, a communications manager 2215, or a communications manager 2410 described herein. The communications manager 2305 may include a rate matching configuration manager 2310, a resource controller 2315, an uplink component 2320, a downlink component 2325, a DCI manager 2330, a RRC component 2335, a full-duplex controller 2340, a self-interference component 2345, and a non-overlapping resource controller 2350. Each of these modules may communicate, directly or indirectly, with one another (e.g., via one or more buses).

The rate matching configuration manager 2310 may determine a rate matching configuration for one or more of an uplink channel or a downlink channel. In some examples, the rate matching configuration manager 2310 may transmit, to a UE, an indication of the rate matching configuration. In some examples, the rate matching configuration manager 2310 may receive, from a UE, a rate matching configuration preference.

The resource controller 2315 may determine a set of first rate matching resources of the uplink channel, a set of second rate matching resources of the downlink channel, or a combination thereof, based on the rate matching configuration.

The uplink component 2320 may receive a first message on the uplink channel, where the uplink channel excludes the set of first rate matching resources.

The downlink component 2325 may transmit a second message on the downlink channel, where the downlink channel excludes the second set of rate matching resources, and where a reference signal is transmitted on one or more resources of the downlink channel.

The DCI manager 2330 may transmit DCI including the indication of the rate matching configuration, where the DCI dynamically schedules the downlink channel and the uplink channel.

In some examples, the DCI manager 2330 may transmit DCI including the indication of the rate matching configuration and one or more transmission parameters, where the DCI dynamically schedules the uplink channel or the downlink channel. In such cases, the one or more transmission parameters may be associated with the downlink channel when the DCI schedules the uplink channel, and the one or more transmission parameters may be associated with the uplink channel when the DCI schedules the downlink channel. In some cases, the one or more transmission parameters include an FDRA, a TDRA, antenna port information, or a combination thereof. In some cases, the indication includes a scheduling indication of whether the downlink channel overlaps with the uplink channel, a number of scheduling DCI, or a combination thereof.

In some examples, the DCI manager 2330 may transmit a compact DCI indicating that data is configured to be transmitted on the downlink channel based on the preconfigured TDRA and the FDRA for the downlink channel. In other examples, the compact DCI may indicate that data is configured to be received on the uplink channel based on the preconfigured TDRA and the FDRA for the uplink channel.

The RRC component 2335 may transmit radio resource control signaling including a preconfigured TDRA and an FDRA of the uplink channel, or the downlink channel, or a combination thereof, where receiving the first message on the uplink channel and transmitting the second message on the downlink channel is based on the preconfigured TDRA and the FDRA.

In some cases, the preconfigured TDRA and the FDRA are for configured grant transmissions when the preconfigured TDRA and the FDRA are for the uplink channel, and where the preconfigured TDRA and the FDRA are for semi-persistently scheduled transmissions when the preconfigured TDRA and the FDRA are for the downlink channel.

The full-duplex controller 2340 may configure the base station for full duplex communications. In some cases, the uplink channel at least partially overlaps in time and frequency with the downlink channel, and where the reference signal is received on the one or more resources of the downlink channel that correspond to the set of first rate matching resources excluded from the uplink channel.

The self-interference component 2345 may transmit a second reference signal on one or more resources of the uplink channel, where the one or more resources of the uplink channel correspond to the set of second rate matching resources excluded from the downlink channel. In some examples, the self-interference component 2345 may transmit control information or data on one or more resources of the uplink channel, where the one or more resources of the uplink channel correspond to the set of second rate matching resources excluded from the downlink channel.

The non-overlapping resource controller 2350 may configure the base station for half duplex communications and the threshold separation between half duplex communications. In some cases, the uplink channel and the downlink channel are within a threshold separation in time or frequency. In some cases, the threshold separation in time or frequency is zero.

Figure 24:
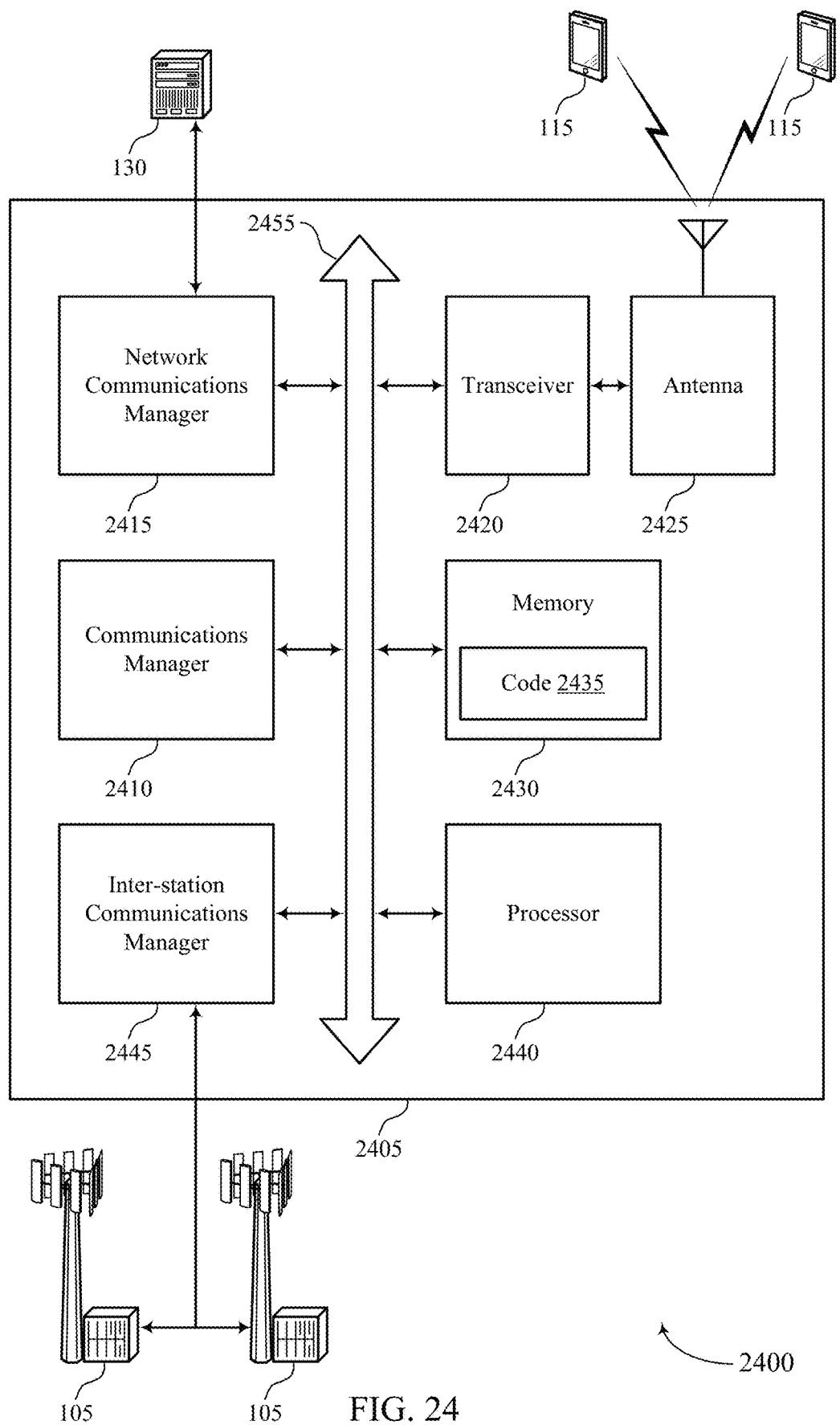
FIG. 24 shows a diagram of a system including a device in accordance with aspects of the present disclosure.

FIG. 24 shows a diagram of a system 2400 including a device 2405 in accordance with aspects of the present disclosure. The device 2405 may be an example of or include the components of device 2105, device 2205, or a base station 105 as described herein. The device 2405 may include components for bi-directional voice and data communications including components for transmitting and receiving communications, including a communications manager 2410, a network communications manager 2415, a transceiver 2420, an antenna 2425, memory 2430, a processor 2440, and an inter-station communications manager 2445. These components may be in electronic communication via one or more buses (e.g., bus 2455).

The communications manager 2410 may determine a rate matching configuration for one or more of an uplink channel or a downlink channel, determine a set of first rate matching resources of the uplink channel, a set of second rate matching resources of the downlink channel, or a combination thereof, based on the rate matching configuration, receive a first message on the uplink channel, where the uplink channel excludes the set of first rate matching resources, and transmit a second message on the downlink channel, where the downlink channel excludes the second set of rate matching resources, and where a reference signal is transmitted on one or more resources of the downlink channel.

The network communications manager 2415 may manage communications with the core network (e.g., via one or more wired backhaul links). For example, the network communications manager 2415 may manage the transfer of data communications for client devices, such as one or more UEs 115.

The transceiver 2420 may communicate bi-directionally, via one or more antennas, wired, or wireless links as described herein. For example, the transceiver 2420 may represent a wireless transceiver and may communicate bi-directionally with another wireless transceiver. The transceiver 2420 may also include a modem to modulate the packets and provide the modulated packets to the antennas for transmission, and to demodulate packets received from the antennas. In some cases, the wireless device may include a single antenna 2425. However, in some cases the device may have more than one antenna 2425, which may be capable of concurrently transmitting or receiving multiple wireless transmissions.

The memory 2430 may include RAM, ROM, or a combination thereof. The memory 2430 may store computer-readable code 2435 including instructions that, when executed by a processor (e.g., the processor 2440) cause the device to perform various functions described herein. In some cases, the memory 2430 may contain, among other things, a BIOS which may control basic hardware or software operation such as the interaction with peripheral components or devices.

The processor 2440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2440 may be configured to operate a memory array using a memory controller. In some cases, a memory controller may be integrated into processor 2440. The processor 2440 may be configured to execute computer-readable instructions stored in a memory (e.g., the memory 2430) to cause the device 2405 to perform various functions (e.g., functions or tasks supporting rate matching between uplink and downlink).

The inter-station communications manager 2445 may manage communications with other base station 105, and may include a controller or scheduler for controlling communications with UEs 115 in cooperation with other base stations 105. For example, the inter-station communications manager 2445 may coordinate scheduling for transmissions to UEs 115 for various interference mitigation techniques such as beamforming or joint transmission. In some examples, the inter-station communications manager 2445 may provide an X2 interface within an LTE/LTE-A wireless communication network technology to provide communication between base stations 105.

The code 2435 may include instructions to implement aspects of the present disclosure, including instructions to support wireless communications. The code 2435 may be stored in a non-transitory computer-readable medium such as system memory or other type of memory. In some cases, the code 2435 may not be directly executable by the processor 2440 but may cause a computer (e.g., when compiled and executed) to perform functions described herein.

The actions performed by the processor 2440, memory 2430, network communications manager 2415, communications manager 2410, transceiver 2420, and antenna 2425 as described herein may be implemented to realize one or more potential advantages. One implementation may allow the device 2405 to save power and increase battery life by transmitting a second message on the downlink channel, where the downlink channel excludes the second set of rate matching resources. Another implementation may provide improved data throughput and user experience at the device 2405 through the reduction of signaling overhead.

Figure 25:
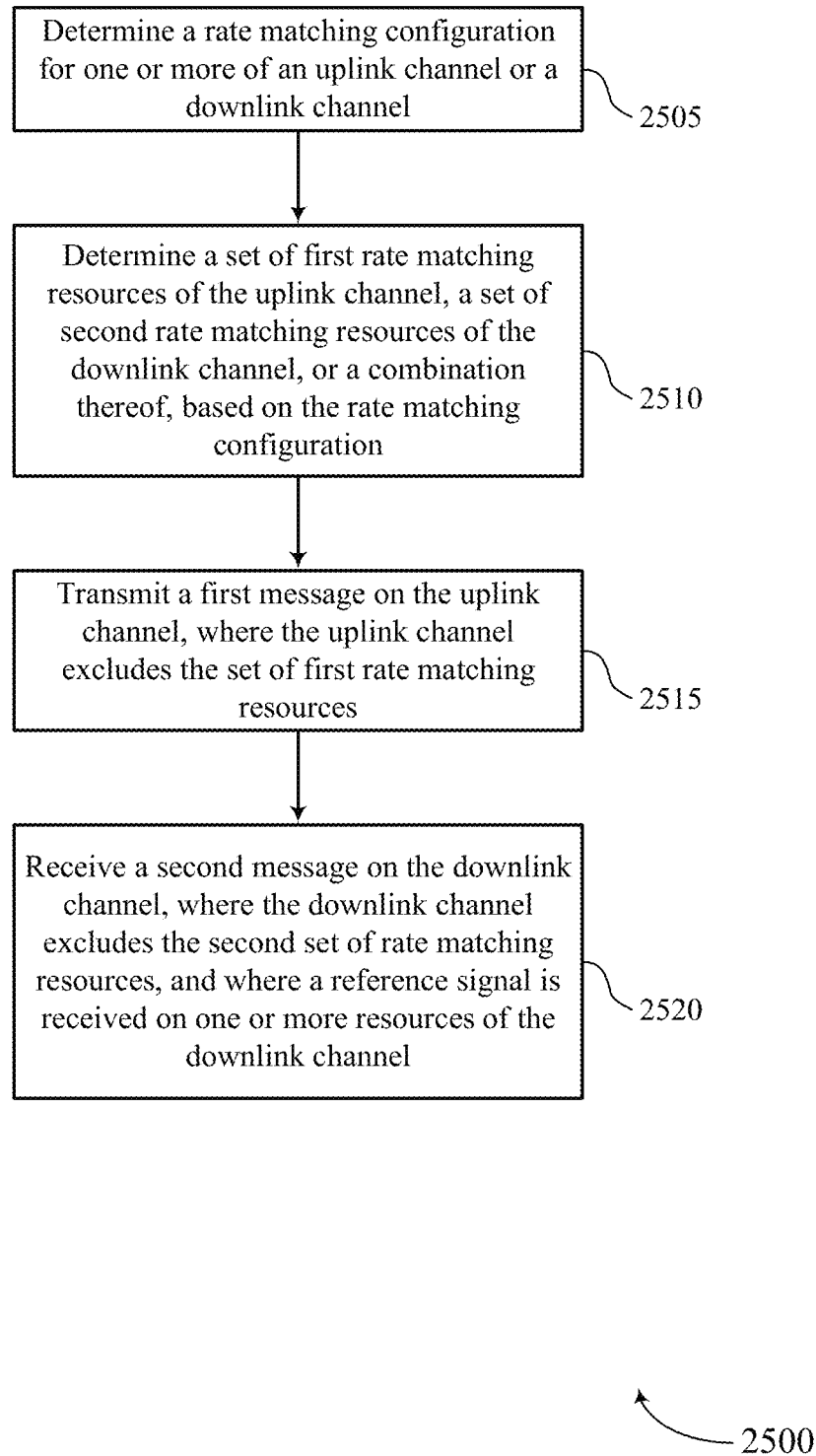
FIGS. 25 through 29 show flowcharts illustrating methods in accordance with aspects of the present disclosure.

FIG. 25 shows a flowchart illustrating a method 2500 in accordance with aspects of the present disclosure. The operations of method 2500 may be implemented by a UE 115 or its components as described herein. For example, the operations of method 2500 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2505, the UE may determine a rate matching configuration for one or more of an uplink channel or a downlink channel. In some examples, the rate matching configuration may be pre-configured. The operations of 2505 may be performed according to the methods described herein. In some examples, aspects of the operations of 2505 may be performed by a rate matching configuration manager as described with reference to FIGS. 12 through 15.

At 2510, the UE may determine a set of first rate matching resources of the uplink channel, a set of second rate matching resources of the downlink channel, or a combination thereof, based on the rate matching configuration. The operations of 2510 may be performed according to the methods described herein. In some examples, aspects of the operations of 2510 may be performed by a resource controller as described with reference to FIGS. 12 through 15.

At 2515, the UE may transmit a first message on the uplink channel, where the uplink channel excludes the set of first rate matching resources. The operations of 2515 may be performed according to the methods described herein. In some examples, aspects of the operations of 2515 may be performed by an uplink component as described with reference to FIGS. 12 through 15.

At 2520, the UE may receive a second message on the downlink channel, where the downlink channel excludes the second set of rate matching resources, and where a reference signal is received on one or more resources of the downlink channel. The operations of 2520 may be performed according to the methods described herein. In some examples, aspects of the operations of 2520 may be performed by a downlink component as described with reference to FIGS. 12 through 15.

Figure 26:
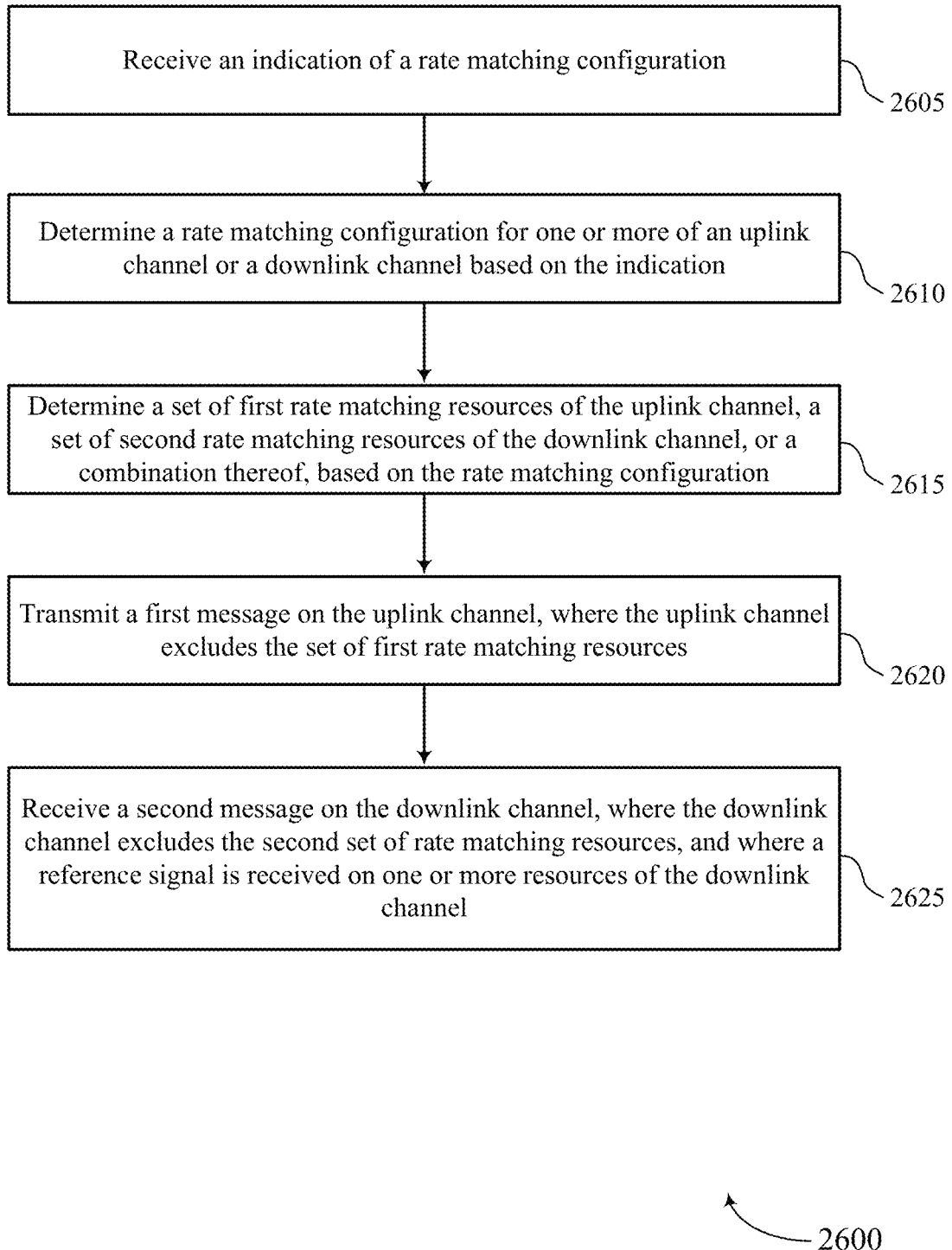

FIG. 26 shows a flowchart illustrating a method 2600 in accordance with aspects of the present disclosure. The operations of method 2600 may be implemented by a UE 115 or its components as described herein. For example, the operations of method 2600 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2605, the UE may receive an indication of a rate matching configuration. For example, the rate matching configuration may be transmitted to the UE by a base station (e.g., via DCI, via RRC messaging, or the like). The operations of 2605 may be performed according to the methods described herein. In some examples, aspects of the operations of 2605 may be performed by an indication controller as described with reference to FIGS. 12 through 15.

At 2610, the UE may determine a rate matching configuration for one or more of an uplink channel or a downlink channel based on the received indication. The operations of 2610 may be performed according to the methods described herein. In some examples, aspects of the operations of 2610 may be performed by a rate matching configuration manager as described with reference to FIGS. 12 through 15.

At 2615, the UE may determine a set of first rate matching resources of the uplink channel, a set of second rate matching resources of the downlink channel, or a combination thereof, based on the rate matching configuration. The operations of 2615 may be performed according to the methods described herein. In some examples, aspects of the operations of 2615 may be performed by a resource controller as described with reference to FIGS. 12 through 15.

At 2620, the UE may transmit a first message on the uplink channel, where the uplink channel excludes the set of first rate matching resources. The operations of 2620 may be performed according to the methods described herein. In some examples, aspects of the operations of 2620 may be performed by an uplink component as described with reference to FIGS. 12 through 15.

At 2625, the UE may receive a second message on the downlink channel, where the downlink channel excludes the second set of rate matching resources, and where a reference signal is received on one or more resources of the downlink channel. The operations of 2625 may be performed according to the methods described herein. In some examples, aspects of the operations of 2625 may be performed by a downlink component as described with reference to FIGS. 12 through 15.

Figure 27:
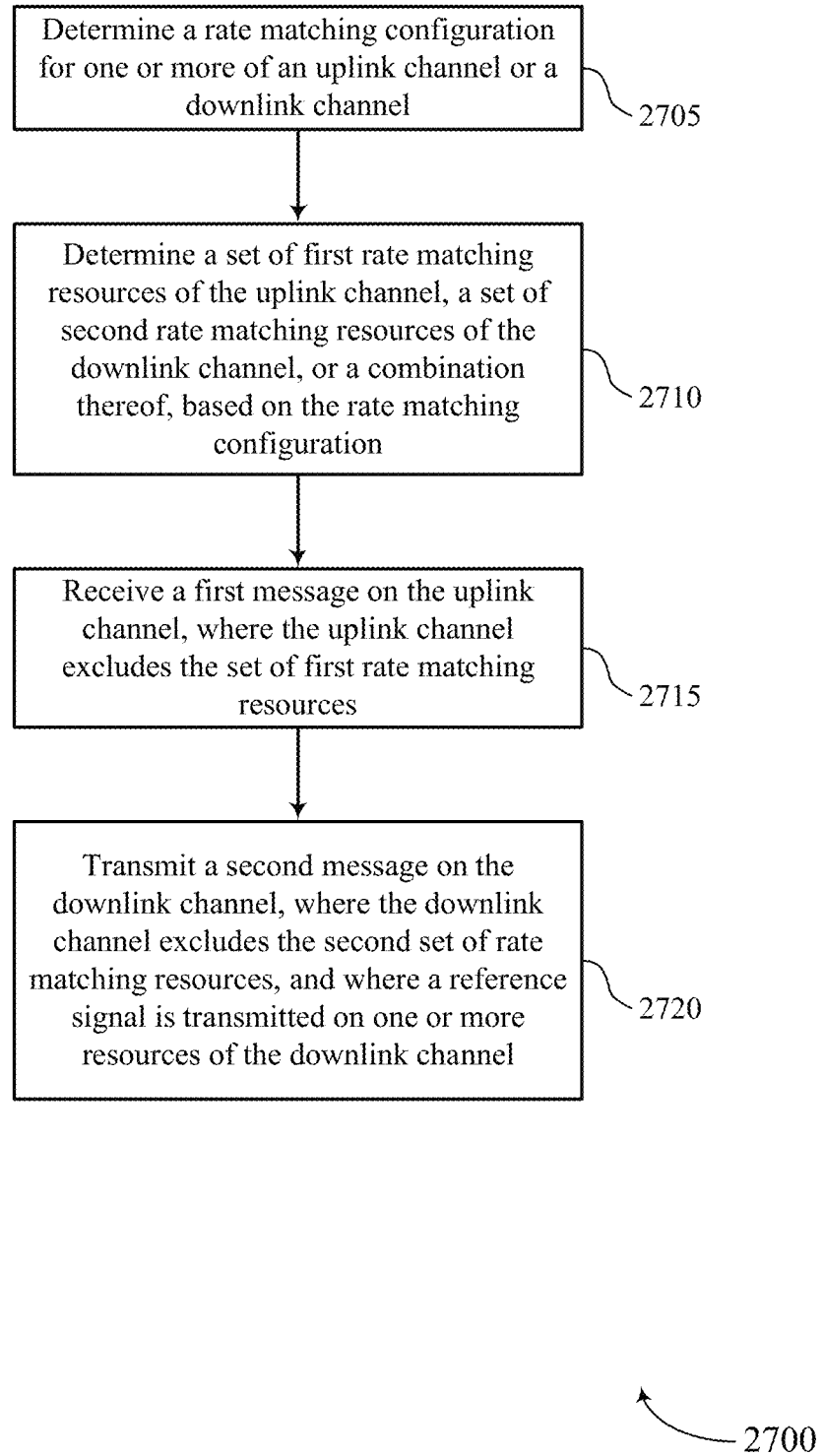

FIG. 27 shows a flowchart illustrating a method 2700 in accordance with aspects of the present disclosure. The operations of method 2700 may be implemented by a base station 105 or its components as described herein. For example, the operations of method 2700 may be performed by a communications manager as described with reference to FIGS. 21 through 24. In some examples, a base station may execute a set of instructions to control the functional elements of the base station to perform the functions described herein. Additionally or alternatively, a base station may perform aspects of the functions described herein using special-purpose hardware.

At 2705, the base station may determine a rate matching configuration for one or more of an uplink channel or a downlink channel. The operations of 2705 may be performed according to the methods described herein. In some examples, aspects of the operations of 2705 may be performed by a rate matching configuration manager as described with reference to FIGS. 21 through 24.

At 2710, the base station may determine a set of first rate matching resources of the uplink channel, a set of second rate matching resources of the downlink channel, or a combination thereof, based on the rate matching configuration. The operations of 2710 may be performed according to the methods described herein. In some examples, aspects of the operations of 2710 may be performed by a resource controller as described with reference to FIGS. 21 through 24.

At 2715, the base station may receive a first message on the uplink channel, where the uplink channel excludes the set of first rate matching resources. The operations of 2715 may be performed according to the methods described herein. In some examples, aspects of the operations of 2715 may be performed by an uplink component as described with reference to FIGS. 21 through 24.

At 2720, the base station may transmit a second message on the downlink channel, where the downlink channel excludes the second set of rate matching resources, and where a reference signal is transmitted on one or more resources of the downlink channel. The operations of 2720 may be performed according to the methods described herein. In some examples, aspects of the operations of 2720 may be performed by a downlink component as described with reference to FIGS. 21 through 24.

Figure 28:
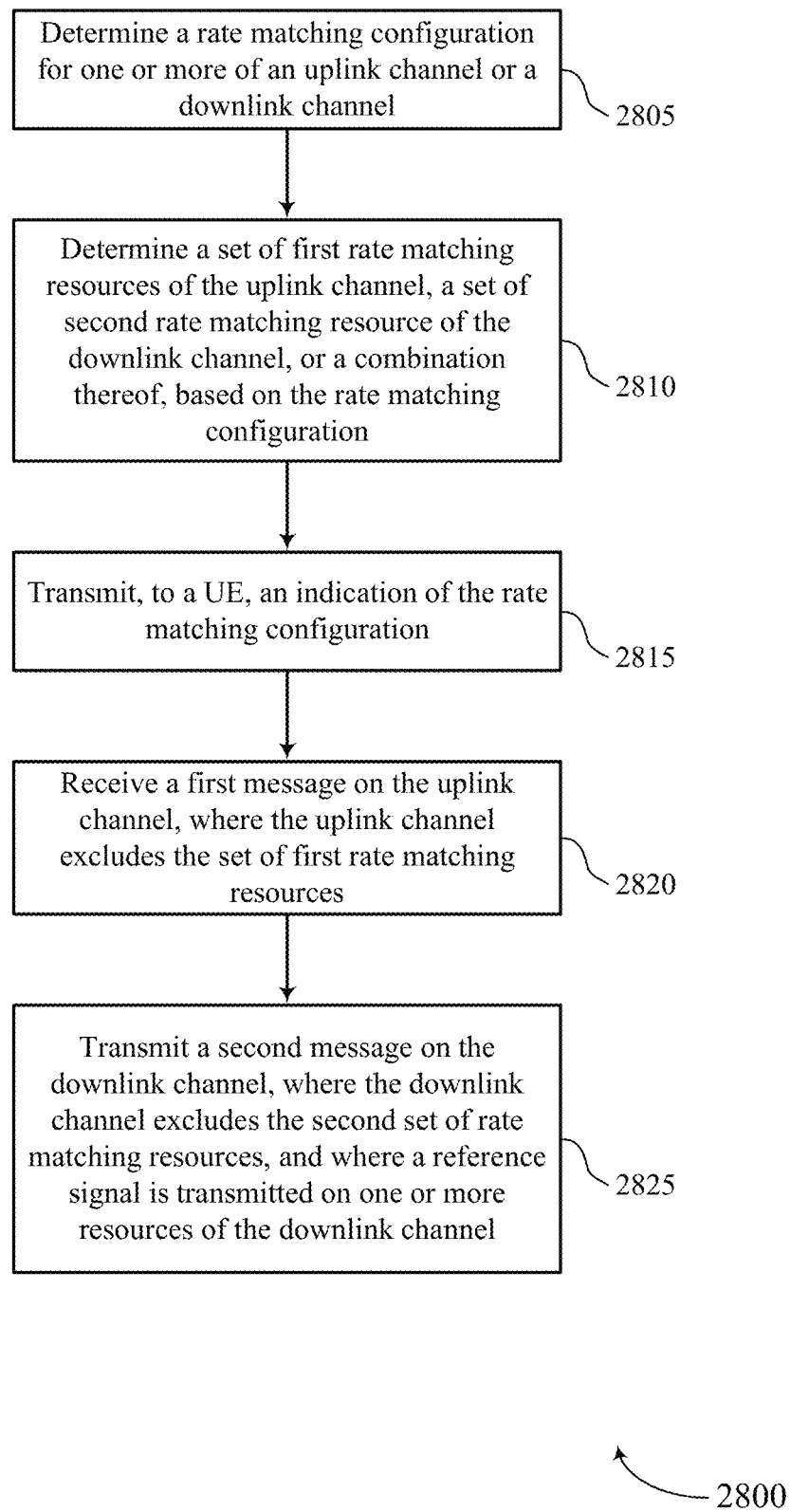

FIG. 28 shows a flowchart illustrating a method 2800 in accordance with aspects of the present disclosure. The operations of method 2800 may be implemented by a base station 105 or its components as described herein. For example, the operations of method 2800 may be performed by a communications manager as described with reference to FIGS. 21 through 24. In some examples, a base station may execute a set of instructions to control the functional elements of the base station to perform the functions described herein. Additionally or alternatively, a base station may perform aspects of the functions described herein using special-purpose hardware.

At 2805, the base station may determine a rate matching configuration for one or more of an uplink channel or a downlink channel. The operations of 2805 may be performed according to the methods described herein. In some examples, aspects of the operations of 2805 may be performed by a rate matching configuration manager as described with reference to FIGS. 21 through 24.

At 2810, the base station may determine a set of first rate matching resources of the uplink channel, a set of second rate matching resources of the downlink channel, or a combination thereof, based on the rate matching configuration. The operations of 2810 may be performed according to the methods described herein. In some examples, aspects of the operations of 2810 may be performed by a resource controller as described with reference to FIGS. 21 through 24.

At 2815, the base station may transmit, to a UE, an indication of the rate matching configuration. The operations of 2815 may be performed according to the methods described herein. In some examples, aspects of the operations of 2815 may be performed by a rate matching configuration manager as described with reference to FIGS. 21 through 24.

At 2820, the base station may receive a first message on the uplink channel, where the uplink channel excludes the set of first rate matching resources. The operations of 2820 may be performed according to the methods described herein. In some examples, aspects of the operations of 2820 may be performed by an uplink component as described with reference to FIGS. 21 through 24.

At 2825, the base station may transmit a second message on the downlink channel, where the downlink channel excludes the second set of rate matching resources, and where a reference signal is transmitted on one or more resources of the downlink channel. The operations of 2825 may be performed according to the methods described herein. In some examples, aspects of the operations of 2825 may be performed by a downlink component as described with reference to FIGS. 21 through 24.

Figure 29:
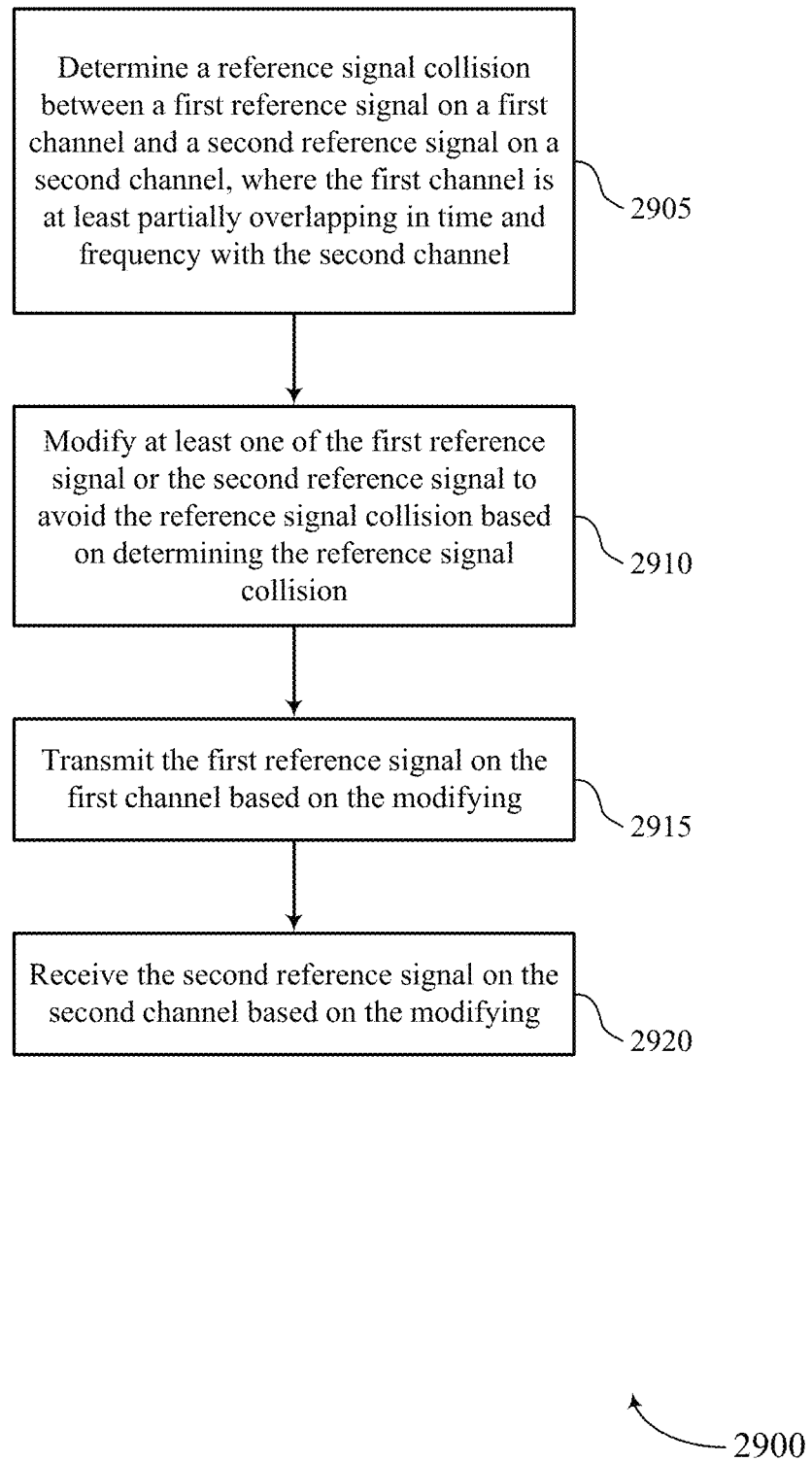

FIG. 29 shows a flowchart illustrating a method 2900 in accordance with aspects of the present disclosure. The operations of method 2900 may be implemented by a UE 115 or base station 105 or its components as described herein. For example, the operations of method 2900 may be performed by a communications manager as described with reference to FIGS. 16 through 20. In some examples, a UE or base station may execute a set of instructions to control the functional elements of the UE or base station to perform the functions described herein. Additionally or alternatively, a UE or base station may perform aspects of the functions described herein using special-purpose hardware.

At 2905, the UE or base station may determine a reference signal collision between a first reference signal on a first channel and a second reference signal on a second channel, where the first channel is at least partially overlapping in time and frequency with the second channel. The operations of 2905 may be performed according to the methods described herein. In some examples, aspects of the operations of 2905 may be performed by a collision detector as described with reference to FIGS. 16 through 20.

At 2910, the UE or base station may modify at least one of the first reference signal or the second reference signal to avoid the reference signal collision based on determining the reference signal collision. The operations of 2910 may be performed according to the methods described herein. In some examples, aspects of the operations of 2910 may be performed by a reference signal adjuster as described with reference to FIGS. 16 through 20.

At 2915, the UE or base station may transmit the first reference signal on the first channel based on the modifying. The operations of 2915 may be performed according to the methods described herein. In some examples, aspects of the operations of 2915 may be performed by a first channel component as described with reference to FIGS. 16 through 20.

At 2920, the UE or base station may receive the second reference signal on the second channel based on the modifying. The operations of 2920 may be performed according to the methods described herein. In some examples, aspects of the operations of 2920 may be performed by a second channel component as described with reference to FIGS. 16 through 20.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: determining a rate matching configuration for one or more of an uplink channel or a downlink channel; determining a plurality of first rate matching resources of the uplink channel, a plurality of second rate matching resources of the downlink channel, or a combination thereof, based at least in part on the rate matching configuration; transmitting a first message on the uplink channel, wherein the uplink channel excludes the plurality of first rate matching resources; and receiving a second message on the downlink channel, wherein the downlink channel excludes the plurality of second rate matching resources, and wherein a reference signal is received on one or more resources of the downlink channel.

Aspect 2: The method of aspect 1, wherein determining the rate matching configuration comprises: receiving an indication of the rate matching configuration; and determining the rate matching configuration based at least in part on the indication.

Aspect 3: The method of aspect 2, further comprising: receiving downlink control information comprising the indication of the rate matching configuration, wherein the downlink control information dynamically schedules the uplink channel and the downlink channel.

Aspect 4: The method of aspect 2, wherein determining the rate matching configuration comprises: receiving downlink control information comprising the indication of the rate matching configuration and one or more transmission parameters, wherein the downlink control information dynamically schedules the uplink channel or the downlink channel, wherein: the one or more transmission parameters are associated with the downlink channel when the downlink control information schedules the uplink channel; and the one or more transmission parameters are associated with the uplink channel when the downlink control information schedules the downlink channel.

Aspect 5: The method of aspect 4, wherein the one or more transmission parameters comprise a frequency domain resource assignment, a time domain resource assignment, antenna port information, or a combination thereof.

Aspect 6: The method of aspect 5, further comprising: determining the plurality of first rate matching resources of the uplink channel, or the plurality of second rate matching resources of the downlink channel, or a combination thereof, for a channel bandwidth and over a plurality of antenna ports based at least in part on the rate matching configuration, wherein the one or more transmission parameters comprise the time domain resource assignment.

Aspect 7: The method of any of aspects 5 through 6, further comprising: determining the plurality of first rate matching resources of the uplink channel, or the plurality of second rate matching resources of the downlink channel, or a combination thereof, for a channel duration and over a plurality of antenna ports based at least in part on the rate matching configuration, wherein the one or more transmission parameters comprise the frequency domain resource assignment.

Aspect 8: The method of any of aspects 4 through 7, wherein the indication comprises a scheduling indication of whether the downlink channel overlaps with the uplink channel, a number of scheduling downlink control information, or a combination thereof.

Aspect 9: The method of any of aspects 1 through 8, further comprising: identifying a preconfigured time domain resource assignment and a frequency domain resource assignment of the uplink channel, or the downlink channel, or a combination thereof; and determining the plurality of first rate matching resources of the uplink channel, or the plurality of second rate matching resources of the downlink channel, or a combination thereof based at least in part on the preconfigured time domain resource assignment and the frequency domain resource assignment, wherein transmitting the first message on the uplink channel and receiving the second message on the downlink channel is based at least in part on the preconfigured time domain resource assignment and the frequency domain resource assignment.

Aspect 10: The method of aspect 9, wherein the preconfigured time domain resource assignment and the frequency domain resource assignment are for configured grant transmissions when the preconfigured time domain resource assignment and the frequency domain resource assignment are for the uplink channel, and the preconfigured time domain resource assignment and the frequency domain resource assignment are for semi-persistently scheduled transmissions when the preconfigured time domain resource assignment and the frequency domain resource assignment are for the downlink channel.

Aspect 11: The method of any of aspects 9 through 10, further comprising: receiving a compact downlink control information indicating that data is configured to be received on the downlink channel based at least in part on the preconfigured time domain resource assignment and the frequency domain resource assignment for the downlink channel or indicating that data is configured to be transmitted on the uplink channel based at least in part on the preconfigured time domain resource assignment and the frequency domain resource assignment for the uplink channel.

Aspect 12: The method of any of aspects 9 through 11, further comprising: receiving radio resource control signaling comprising the preconfigured time domain resource assignment and the frequency domain resource assignment.

Aspect 13: The method of any of aspects 1 through 12, wherein one or more rate matching resources of the plurality of first rate matching resources of the uplink channel or of the plurality of second rate matching resources of the downlink channel are beyond an overlapping portion of the uplink channel and the downlink channel.

Aspect 14: The method of any of aspects 1 through 13, wherein the uplink channel at least partially overlaps in time and frequency with the downlink channel, and the reference signal is received on the one or more resources of the downlink channel that correspond to the plurality of first rate matching resources excluded from the uplink channel.

Aspect 15: The method of aspect 14, further comprising: transmitting a second reference signal on one or more resources of the uplink channel, wherein the one or more resources of the uplink channel correspond to the plurality of second rate matching resources excluded from the downlink channel.

Aspect 16: The method of any of aspects 14 through 15, further comprising: transmitting control information or data on one or more resources of the uplink channel, wherein the one or more resources of the uplink channel correspond to the plurality of second rate matching resources excluded from the downlink channel.

Aspect 17: The method of any of aspects 1 through 16, wherein the uplink channel and the downlink channel are within a threshold separation in time or frequency.

Aspect 18: The method of aspect 17, wherein the threshold separation in time or frequency is zero.

Aspect 19: The method of any of aspects 1 through 18, further comprising: transmitting, to a network, a rate matching configuration preference.

Aspect 20: The method of any of aspects 1 through 19, wherein the UE is configured for full-duplex communications.

Aspect 21: A method for wireless communications at a base station, comprising: determining a rate matching configuration for one or more of an uplink channel or a downlink channel; determining a plurality of first rate matching resources of the uplink channel, a plurality of second rate matching resources of the downlink channel, or a combination thereof, based at least in part on the rate matching configuration; receiving a first message on the uplink channel, wherein the uplink channel excludes the plurality of first rate matching resources; and transmitting a second message on the downlink channel, wherein the downlink channel excludes the plurality of second rate matching resources, and wherein a reference signal is transmitted on one or more resources of the downlink channel.

Aspect 22: The method of aspect 21, further comprising: transmitting, to a UE, an indication of the rate matching configuration.

Aspect 23: The method of aspect 22, wherein transmitting the indication comprises: transmitting downlink control information comprising the indication of the rate matching configuration, wherein the downlink control information dynamically schedules the downlink channel and the uplink channel.

Aspect 24: The method of aspect 22, wherein transmitting the indication comprises: transmitting downlink control information comprising the indication of the rate matching configuration and one or more transmission parameters, wherein the downlink control information dynamically schedules the uplink channel or the downlink channel, wherein: the one or more transmission parameters are associated with the downlink channel when the downlink control information schedules the uplink channel; and the one or more transmission parameters are associated with the uplink channel when the downlink control information schedules the downlink channel.

Aspect 25: The method of aspect 24, wherein the one or more transmission parameters comprise a frequency domain resource assignment, a time domain resource assignment, antenna port information, or a combination thereof.

Aspect 26: The method of any of aspects 24 through 25, wherein the indication comprises a scheduling indication of whether the downlink channel overlaps with the uplink channel, a number of scheduling downlink control information, or a combination thereof.

Aspect 27: The method of any of aspects 21 through 26, further comprising: transmitting radio resource control signaling comprising a preconfigured time domain resource assignment and a frequency domain resource assignment of the uplink channel, or the downlink channel, or a combination thereof, wherein receiving the first message on the uplink channel and transmitting the second message on the downlink channel is based at least in part on the preconfigured time domain resource assignment and the frequency domain resource assignment.

Aspect 28: The method of aspect 27, further comprising: transmitting a compact downlink control information indicating that data is configured to be transmitted on the downlink channel based at least in part on the preconfigured time domain resource assignment and the frequency domain resource assignment for the downlink channel or indicating that data is configured to be received on the uplink channel based at least in part on the preconfigured time domain resource assignment and the frequency domain resource assignment for the uplink channel.

Aspect 29: The method of any of aspects 27 through 28, wherein the preconfigured time domain resource assignment and the frequency domain resource assignment are for configured grant transmissions when the preconfigured time domain resource assignment and the frequency domain resource assignment are for the uplink channel, and the preconfigured time domain resource assignment and the frequency domain resource assignment are for semi-persistently scheduled transmissions when the preconfigured time domain resource assignment and the frequency domain resource assignment are for the downlink channel.

Aspect 30: The method of any of aspects 21 through 29, wherein the uplink channel at least partially overlaps in time and frequency with the downlink channel, and the reference signal is received on the one or more resources of the downlink channel that correspond to the plurality of first rate matching resources excluded from the uplink channel.

Aspect 31: The method of aspect 30, further comprising: transmitting a second reference signal on one or more resources of the uplink channel, wherein the one or more resources of the uplink channel correspond to the plurality of second rate matching resources excluded from the downlink channel.

Aspect 32: The method of any of aspects 30 through 31, further comprising: transmitting control information or data on one or more resources of the uplink channel, wherein the one or more resources of the uplink channel correspond to the plurality of second rate matching resources excluded from the downlink channel.

Aspect 33: The method of any of aspects 21 through 32, wherein the uplink channel and the downlink channel are within a threshold separation in time or frequency.

Aspect 34: The method of aspect 33, wherein the threshold separation in time or frequency is zero.

Aspect 35: The method of any of aspects 21 through 34, further comprising: receiving, from a UE, a rate matching configuration preference.

Aspect 36: A method for wireless communications, comprising: determining a reference signal collision between a first reference signal on a first channel and a second reference signal on a second channel, wherein the first channel is at least partially overlapping in time and frequency with the second channel; modifying at least one of the first reference signal or the second reference signal to avoid the reference signal collision based at least in part on determining the reference signal collision; transmitting the first reference signal on the first channel based at least in part on the modifying; and receiving the second reference signal on the second channel based at least in part on the modifying.

Aspect 37: The method of aspect 36, wherein modifying at least one of the first reference signal or the second reference signal further comprises: allocating the first reference signal or the second reference signal to different frequency resources.

Aspect 38: The method of aspect 37, wherein the first reference signal is in a first code division multiplexing group and the second reference signal is in a second code division multiplexing group.

Aspect 39: The method of any of aspects 36 through 38, wherein modifying at least one of the first reference signal or the second reference signal further comprises: selecting a first coding scheme for the first reference signal orthogonal to a second coding scheme for the second reference signal.

Aspect 40: The method of aspect 39, wherein the first reference signal and the second reference signal are in a same code division multiplexing group.

Aspect 41: The method of any of aspects 36 through 40, wherein modifying at least one of the first reference signal or the second reference signal further comprises: allocating the first reference signal or the second reference signal to different time resources.

Aspect 42: An apparatus for wireless communications at a UE, comprising a processor; memory coupled with the processor; and instructions stored in the memory and executable by the processor to cause the apparatus to perform a method of any of aspects 1 through 20.

Aspect 43: An apparatus for wireless communications at a UE, comprising at least one means for performing a method of any of aspects 1 through 20.

Aspect 44: A non-transitory computer-readable medium storing code for wireless communications at a UE, the code comprising instructions executable by a processor to perform a method of any of aspects 1 through 20.

Aspect 45: An apparatus for wireless communications at a base station, comprising a processor; memory coupled with the processor; and instructions stored in the memory and executable by the processor to cause the apparatus to perform a method of any of aspects 21 through 35.

Aspect 46: An apparatus for wireless communications at a base station, comprising at least one means for performing a method of any of aspects 21 through 35.

Aspect 47: A non-transitory computer-readable medium storing code for wireless communications at a base station, the code comprising instructions executable by a processor to perform a method of any of aspects 21 through 35.

Aspect 48: An apparatus for wireless communications, comprising a processor; memory coupled with the processor; and instructions stored in the memory and executable by the processor to cause the apparatus to perform a method of any of aspects 36 through 41.

Aspect 49: An apparatus for wireless communications, comprising at least one means for performing a method of any of aspects 36 through 41.

Aspect 50: A non-transitory computer-readable medium storing code for wireless communications, the code comprising instructions executable by a processor to perform a method of any of aspects 36 through 41.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   determining a rate matching configuration for one or more of an uplink channel or a downlink channel, wherein the uplink channel at least partially overlaps in time and frequency with the downlink channel;
   determining a plurality of first rate matching resources of the uplink channel, a plurality of second rate matching resources of the downlink channel, or a combination thereof, based at least in part on the rate matching configuration;
   transmitting a first message on the uplink channel, wherein the uplink channel excludes the plurality of first rate matching resources; and
   receiving a second message on the downlink channel, wherein the downlink channel excludes the plurality of second rate matching resources, and wherein a reference signal is received on one or more resources of the downlink channel that correspond to the plurality of first rate matching resources excluded from the uplink channel.

2. The method of claim 1, wherein determining the rate matching configuration comprises:
   receiving an indication of the rate matching configuration; and
   determining the rate matching configuration based at least in part on the indication.

3. The method of claim 2, further comprising:
   receiving downlink control information comprising the indication of the rate matching configuration, wherein the downlink control information dynamically schedules the uplink channel and the downlink channel.

4. The method of claim 2, wherein determining the rate matching configuration comprises:
   receiving downlink control information comprising the indication of the rate matching configuration and one or more transmission parameters, wherein the downlink control information dynamically schedules the uplink channel or the downlink channel, wherein:

the one or more transmission parameters are associated with the downlink channel when the downlink control information schedules the uplink channel; and the one or more transmission parameters are associated with the uplink channel when the downlink control information schedules the downlink channel.

5. The method of claim 4, wherein the one or more transmission parameters comprise a frequency domain resource assignment, a time domain resource assignment, antenna port information, or a combination thereof.

6. The method of claim 5, further comprising:

determining the plurality of first rate matching resources of the uplink channel, or the plurality of second rate matching resources of the downlink channel, or a combination thereof, for a channel bandwidth and over a plurality of antenna ports based at least in part on the rate matching configuration, wherein the one or more transmission parameters comprise the time domain resource assignment.

7. The method of claim 5, further comprising:

determining the plurality of first rate matching resources of the uplink channel, or the plurality of second rate matching resources of the downlink channel, or a combination thereof, for a channel duration and over a plurality of antenna ports based at least in part on the rate matching configuration, wherein the one or more transmission parameters comprise the frequency domain resource assignment.

8. The method of claim 4, wherein the indication comprises a scheduling indication of whether the downlink channel overlaps with the uplink channel, a number of scheduling downlink control information, or a combination thereof.

9. The method of claim 1, further comprising:

identifying a preconfigured time domain resource assignment and a frequency domain resource assignment of the uplink channel, or the downlink channel, or a combination thereof; and determining the plurality of first rate matching resources of the uplink channel, or the plurality of second rate matching resources of the downlink channel, or a combination thereof based at least in part on the preconfigured time domain resource assignment and the frequency domain resource assignment, wherein transmitting the first message on the uplink channel and receiving the second message on the downlink channel is based at least in part on the preconfigured time domain resource assignment and the frequency domain resource assignment.

10. The method of claim 9, wherein the preconfigured time domain resource assignment and the frequency domain resource assignment are for configured grant transmissions when the preconfigured time domain resource assignment and the frequency domain resource assignment are for the uplink channel, and wherein the preconfigured time domain resource assignment and the frequency domain resource assignment are for semi-persistently scheduled transmissions when the preconfigured time domain resource assignment and the frequency domain resource assignment are for the downlink channel.

11. The method of claim 9, further comprising:

receiving a compact downlink control information indicating that data is configured to be received on the downlink channel based at least in part on the preconfigured time domain resource assignment and the frequency domain resource assignment for the downlink channel or indicating that data is configured to be transmitted on the uplink channel based at least in part on the preconfigured time domain resource assignment and the frequency domain resource assignment for the uplink channel.

12. The method of claim 9, further comprising:

receiving radio resource control signaling comprising the preconfigured time domain resource assignment and the frequency domain resource assignment.

13. The method of claim 1, wherein one or more rate matching resources of the plurality of first rate matching resources of the uplink channel or of the plurality of second rate matching resources of the downlink channel are beyond an overlapping portion of the uplink channel and the downlink channel.

14. The method of claim 1, further comprising:

transmitting a second reference signal on one or more resources of the uplink channel, wherein the one or more resources of the uplink channel correspond to the plurality of second rate matching resources excluded from the downlink channel.

15. The method of claim 1, further comprising:

Transmitting control information or data on one or more resources of the uplink channel, wherein the one or more resources of the uplink channel correspond to the plurality of second rate matching resources excluded from the downlink channel.

16. The method of claim 1, wherein the uplink channel and the downlink channel are within a threshold separation in time or frequency.

17. The method of claim 16, wherein the threshold separation in time or frequency is zero.

18. The method of claim 1, further comprising:

transmitting, to a network, a rate matching configuration preference.

19. The method of claim 1, wherein the UE is configured for full-duplex communications.

20. A method for wireless communications at a network device:

determining a rate matching configuration for one or more of an uplink channel or a downlink channel, wherein the uplink channel at least partially overlaps in time and frequency with the downlink channel;

determining a plurality of first rate matching resources of the uplink channel, a plurality of second rate matching resources of the downlink channel, or a combination thereof, based at least in part on the rate matching configuration;

receiving a first message on the uplink channel, wherein the uplink channel excludes the plurality of first rate matching resources; and transmitting a second message on the downlink channel, wherein the downlink channel excludes the plurality of second rate matching resources, and wherein a reference signal is transmitted on one or more resources of the downlink channel that correspond to the plurality of first rate matching resources excluded from the uplink channel.

21. The method of claim 20, further comprising:

transmitting, to a user equipment (UE), an indication of the rate matching configuration.

22. The method of claim 21, wherein transmitting the indication comprises:

transmitting downlink control information comprising the indication of the rate matching configuration, wherein the downlink control information dynamically schedules the downlink channel and the uplink channel.

23. The method of claim 21, wherein transmitting the indication comprises:
transmitting downlink control information comprising the indication of the rate matching configuration and one or more transmission parameters, wherein the downlink control information dynamically schedules the uplink channel or the downlink channel, wherein:
the one or more transmission parameters are associated with the downlink channel when the downlink control information schedules the uplink channel; and
the one or more transmission parameters are associated with the uplink channel when the downlink control information schedules the downlink channel.

24. The method of claim 23, wherein the one or more transmission parameters comprise a frequency domain resource assignment, a time domain resource assignment, antenna port information, or a combination thereof.

25. The method of claim 23, wherein the indication comprises a scheduling indication of whether the downlink channel overlaps with the uplink channel, a number of scheduling downlink control information, or a combination thereof.

26. The method of claim 20, further comprising:
transmitting radio resource control signaling comprising a preconfigured time domain resource assignment and a frequency domain resource assignment of the uplink channel, or the downlink channel, or a combination thereof, wherein receiving the first message on the uplink channel and transmitting the second message on the downlink channel is based at least in part on the preconfigured time domain resource assignment and the frequency domain resource assignment.

27. The method of claim 26, further comprising:
transmitting a compact downlink control information indicating that data is configured to be transmitted on the downlink channel based at least in part on the preconfigured time domain resource assignment and the frequency domain resource assignment for the downlink channel or indicating that data is configured to be received on the uplink channel based at least in part on the preconfigured time domain resource assignment and the frequency domain resource assignment for the uplink channel.

28. The method of claim 26, wherein the preconfigured time domain resource assignment and the frequency domain resource assignment are for configured grant transmissions when the preconfigured time domain resource assignment and the frequency domain resource assignment are for the uplink channel, and wherein the preconfigured time domain resource assignment and the frequency domain resource assignment are for semi-persistently scheduled transmissions when the preconfigured time domain resource assignment and the frequency domain resource assignment are for the downlink channel.

29. The method of claim 20, further comprising:
transmitting a second reference signal on one or more resources of the uplink channel, wherein the one or more resources of the uplink channel correspond to the plurality of second rate matching resources excluded from the downlink channel.

30. The method of claim 20, further comprising:
transmitting control information or data on one or more resources of the uplink channel, wherein the one or more resources of the uplink channel correspond to the plurality of second rate matching resources excluded from the downlink channel.

31. The method of claim 20, wherein the uplink channel and the downlink channel are within a threshold separation in time or frequency.

32. The method of claim 31, wherein the threshold separation in time or frequency is zero.

33. The method of claim 20, further comprising:
receiving, from a user equipment (UE), a rate matching configuration preference.

34. An apparatus for wireless communications at a user equipment (UE), comprising:
a processor,
memory coupled with the processor;
instructions stored in the memory and executable by the processor to cause the apparatus to:
determine a rate matching configuration for one or more of an uplink channel or a downlink channel, wherein the uplink channel at least partially overlaps in time and frequency with the downlink channel; and
determine a plurality of first rate matching resources of the uplink channel, a plurality of second rate matching resources of the downlink channel, or a combination thereof, based at least in part on the rate matching configuration;
a transmitter configured to transmit a first message on the uplink channel, wherein the uplink channel excludes the plurality of first rate matching resources; and
a receiver configured to receive a second message on the downlink channel, wherein the downlink channel excludes the plurality of second rate matching resources, and wherein a reference signal is received on one or more resources of the downlink channel that correspond to the plurality of first rate matching resources excluded from the uplink channel.

35. The apparatus of claim 34, further comprising:
an antenna, wherein the instructions to determine the rate matching configuration are executable by the processor to cause the apparatus to:
receive, via the receiver, an indication of the rate matching configuration; and
determine the rate matching configuration based at least in part on the indication.

36. The apparatus of claim 35, wherein the instructions are further executable by the processor to cause the apparatus to:
receive, via the receiver, downlink control information comprising the indication of the rate matching configuration, wherein the downlink control information dynamically schedules the uplink channel and the downlink channel.

37. The apparatus of claim 35, wherein the instructions to determine the rate matching configuration are executable by the processor to cause the apparatus to:
receive, via the receiver, downlink control information comprising the indication of the rate matching configuration and one or more transmission parameters, wherein the downlink control information dynamically schedules the uplink channel or the downlink channel, wherein:
the one or more transmission parameters are associated with the downlink channel when the downlink control information schedules the uplink channel; and
the one or more transmission parameters are associated with the uplink channel when the downlink control information schedules the downlink channel.

38. The apparatus of claim 37, wherein the one or more transmission parameters comprise a frequency domain resource assignment, a time domain resource assignment, antenna port information, or a combination thereof.

39. The apparatus of claim 38, wherein the instructions are further executable by the processor to cause the apparatus to:
determine the plurality of first rate matching resources of the uplink channel, or the plurality of second rate matching resources of the downlink channel, or a combination thereof, for a channel bandwidth and over a plurality of antenna ports based at least in part on the rate matching configuration, wherein the one or more transmission parameters comprise the time domain resource assignment.

40. The apparatus of claim 38, wherein the instructions are further executable by the processor to cause the apparatus to:
determine the plurality of first rate matching resources of the uplink channel, or the plurality of second rate matching resources of the downlink channel, or a combination thereof, for a channel duration and over a plurality of antenna ports based at least in part on the rate matching configuration, wherein the one or more transmission parameters comprise the frequency domain resource assignment.

41. The apparatus of claim 37, wherein the indication comprises a scheduling indication of whether the downlink channel overlaps with the uplink channel, a number of scheduling downlink control information, or a combination thereof.

42. The apparatus of claim 34, wherein the instructions are further executable by the processor to cause the apparatus to:
identify a preconfigured time domain resource assignment and a frequency domain resource assignment of the uplink channel, or the downlink channel, or a combination thereof; and
determine the plurality of first rate matching resources of the uplink channel, or the plurality of second rate matching resources of the downlink channel, or a combination thereof based at least in part on the preconfigured time domain resource assignment and the frequency domain resource assignment, wherein transmitting the first message on the uplink channel and receiving the second message on the downlink channel is based at least in part on the preconfigured time domain resource assignment and the frequency domain resource assignment.

43. The apparatus of claim 42, wherein the preconfigured time domain resource assignment and the frequency domain resource assignment are for configured grant transmissions when the preconfigured time domain resource assignment and the frequency domain resource assignment are for the uplink channel, and wherein the preconfigured time domain resource assignment and the frequency domain resource assignment are for semi-persistently scheduled transmissions when the preconfigured time domain resource assignment and the frequency domain resource assignment are for the downlink channel.

44. The apparatus of claim 42, wherein the instructions are further executable by the processor to cause the apparatus to:
receive, via the receiver, a compact downlink control information indicating that data is configured to be received on the downlink channel based at least in part on the preconfigured time domain resource assignment and the frequency domain resource assignment for the downlink channel or indicating that data is configured to be transmitted on the uplink channel based at least in part on the preconfigured time domain resource assignment and the frequency domain resource assignment for the uplink channel.

45. The apparatus of claim 42, wherein the instructions are further executable by the processor to cause the apparatus to:
receive, via the receiver, radio resource control signaling comprising the preconfigured time domain resource assignment and the frequency domain resource assignment.

46. The apparatus of claim 34, wherein one or more rate matching resources of the plurality of first rate matching resources of the uplink channel or of the plurality of second rate matching resources of the downlink channel are beyond an overlapping portion of the uplink channel and the downlink channel.

47. The apparatus of claim 34, wherein the instructions are further executable by the processor to cause the apparatus to:
transmit, via the transmitter, a second reference signal on one or more resources of the uplink channel, wherein the one or more resources of the uplink channel correspond to the plurality of second rate matching resources excluded from the downlink channel.

48. The apparatus of claim 34, wherein the instructions are further executable by the processor to cause the apparatus to:
transmit, via the transmitter, control information or data on one or more resources of the uplink channel, wherein the one or more resources of the uplink channel correspond to the plurality of second rate matching resources excluded from the downlink channel.

49. The apparatus of claim 34, wherein the uplink channel and the downlink channel are within a threshold separation in time or frequency.

50. The apparatus of claim 49, wherein the threshold separation in time or frequency is zero.

51. The apparatus of claim 34, wherein the instructions are further executable by the processor to cause the apparatus to:
transmit, via the transmitter, a rate matching configuration preference.

52. The apparatus of claim 34, wherein the UE is configured for full-duplex communications.

53. An apparatus for wireless communications at a network device, comprising:
a processor,
memory coupled with the processor;
instructions stored in the memory and executable by the processor to cause the apparatus to:
determine a rate matching configuration for one or more of an uplink channel or a downlink channel, wherein the uplink channel at least partially overlaps in time and frequency with the downlink channel; and
determine a plurality of first rate matching resources of the uplink channel, a plurality of second rate matching resources of the downlink channel, or a combination thereof, based at least in part on the rate matching configuration;
a receiver configured to receive a first message on the uplink channel, wherein the uplink channel excludes the plurality of first rate matching resources; and
a transmitter configured to transmit a second message on the downlink channel, wherein the downlink channel excludes the plurality of second rate matching resources, and wherein a reference signal is transmitted on one or more resources of the downlink channel that correspond to the plurality of first rate matching resources excluded from the uplink channel.

54. The apparatus of claim 53, wherein the instructions are further executable by the processor to cause the apparatus to:
transmit, via the transmitter, an indication of the rate matching configuration.

55. The apparatus of claim 54, wherein the instructions to transmit the indication are executable by the processor to cause the apparatus to:
transmit, via the transmitter, downlink control information comprising the indication of the rate matching configuration, wherein the downlink control information dynamically schedules the downlink channel and the uplink channel.

56. The apparatus of claim 54, wherein the instructions to transmit the indication are executable by the processor to cause the apparatus to:
transmit, via the transmitter, downlink control information comprising the indication of the rate matching configuration and one or more transmission parameters, wherein the downlink control information dynamically schedules the uplink channel or the downlink channel, wherein:
the one or more transmission parameters are associated with the downlink channel when the downlink control information schedules the uplink channel; and
the one or more transmission parameters are associated with the uplink channel when the downlink control information schedules the downlink channel.

57. The apparatus of claim 56, wherein the one or more transmission parameters comprise a frequency domain resource assignment, a time domain resource assignment, antenna port information, or a combination thereof.

58. The apparatus of claim 56, wherein the indication comprises a scheduling indication of whether the downlink channel overlaps with the uplink channel, a number of scheduling downlink control information, or a combination thereof.

59. The apparatus of claim 53, wherein the instructions are further executable by the processor to cause the apparatus to:
transmit, via the transmitter, radio resource control signaling comprising a preconfigured time domain resource assignment and a frequency domain resource assignment of the uplink channel, or the downlink channel, or a combination thereof, wherein receiving the first message on the uplink channel and transmitting the second message on the downlink channel is based at least in part on the preconfigured time domain resource assignment and the frequency domain resource assignment.

60. The apparatus of claim 59, wherein the instructions are further executable by the processor to cause the apparatus to:
transmit, via the transmitter, a compact downlink control information indicating that data is configured to be transmitted on the downlink channel based at least in part on the preconfigured time domain resource assignment and the frequency domain resource assignment for the downlink channel or indicating that data is configured to be received on the uplink channel based at least in part on the preconfigured time domain resource assignment and the frequency domain resource assignment for the uplink channel.

61. The apparatus of claim 59, wherein the preconfigured time domain resource assignment and the frequency domain resource assignment are for configured grant transmissions when the preconfigured time domain resource assignment and the frequency domain resource assignment are for the uplink channel, and wherein the preconfigured time domain resource assignment and the frequency domain resource assignment are for semi-persistently scheduled transmissions when the preconfigured time domain resource assignment and the frequency domain resource assignment are for the downlink channel.

62. The apparatus of claim 53, wherein the instructions are further executable by the processor to cause the apparatus to:
transmit, via the transmitter, a second reference signal on one or more resources of the uplink channel, wherein the one or more resources of the uplink channel correspond to the plurality of second rate matching resources excluded from the downlink channel.

63. The apparatus of claim 53, wherein the instructions are further executable by the processor to cause the apparatus to:
transmit, via the transmitter, control information or data on one or more resources of the uplink channel, wherein the one or more resources of the uplink channel correspond to the plurality of second rate matching resources excluded from the downlink channel.

64. The apparatus of claim 53, wherein the uplink channel and the downlink channel are within a threshold separation in time or frequency.

65. The apparatus of claim 64, wherein the threshold separation in time or frequency is zero.

66. The apparatus of claim 53, wherein the instructions are further executable by the processor to cause the apparatus to:
receive, via the receiver, a rate matching configuration preference.

67. An apparatus for wireless communications at a user equipment (UE), comprising:
means for determining a rate matching configuration for one or more of an uplink channel or a downlink channel, wherein the uplink channel at least partially overlaps in time and frequency with the downlink channel;
means for determining a plurality of first rate matching resources of the uplink channel, a plurality of second rate matching resources of the downlink channel, or a combination thereof, based at least in part on the rate matching configuration;
means for transmitting a first message on the uplink channel, wherein the uplink channel excludes the plurality of first rate matching resources; and
means for receiving a second message on the downlink channel, wherein the downlink channel excludes the plurality of second rate matching resources, and wherein a reference signal is received on one or more resources of the downlink channel that correspond to the plurality of first rate matching resources excluded from the uplink channel.

68. An apparatus for wireless communications at a network device, comprising:
means for determining a rate matching configuration for one or more of an uplink channel or a downlink channel, wherein the uplink channel at least partially overlaps in time and frequency with the downlink channel;

means for determining a plurality of first rate matching resources of the uplink channel, a plurality of second rate matching resources of the downlink channel, or a combination thereof, based at least in part on the rate matching configuration;

means for receiving a first message on the uplink channel, wherein the uplink channel excludes the plurality of first rate matching resources; and means for transmitting a second message on the downlink channel, wherein the downlink channel excludes the plurality of second rate matching resources, and wherein a reference signal is transmitted on one or more resources of the downlink channel that correspond to the plurality of first rate matching resources excluded from the uplink channel.

* * * * *